United States Patent
Harada et al.

(10) Patent No.: US 11,128,120 B2
(45) Date of Patent: Sep. 21, 2021

(54) INDUCTIVE LOAD CONTROL DEVICE

(71) Applicant: DENSO CORPORATION, Kariya (JP)

(72) Inventors: Yasuhiko Harada, Kariya (JP);
Mitsuru Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/889,951

(22) Filed: Jun. 2, 2020

(65) Prior Publication Data
US 2020/0381913 A1  Dec. 3, 2020

(30) Foreign Application Priority Data

Jun. 3, 2019  (JP) .............................. JP2019-103673

(51) Int. Cl.
*H02H 3/16* (2006.01)
*H01F 7/06* (2006.01)
*H02H 1/00* (2006.01)

(52) U.S. Cl.
CPC .............. *H02H 3/16* (2013.01); *H01F 7/064* (2013.01); *H02H 1/0007* (2013.01)

(58) Field of Classification Search
CPC ...... H01F 7/064; H02H 1/0007; H02H 3/087; H02H 3/16; H02P 29/027; H02P 8/36
See application file for complete search history.

(56) References Cited

U.S. PATENT DOCUMENTS

| 4,283,783 | A | * | 8/1981 | Nakajima | ............... | G04C 3/143 |
| | | | | | | 318/696 |
| 7,262,588 | B2 | * | 8/2007 | Matsuo | ............... | H02M 3/1584 |
| | | | | | | 323/282 |
| 10,447,139 | B2 | * | 10/2019 | Harada | ..................... | H02P 8/12 |
| 2009/0079373 | A1 | * | 3/2009 | Nagase | ................. | H02P 29/027 |
| | | | | | | 318/400.22 |
| 2018/0076703 | A1 | * | 3/2018 | Harada | ................. | H02M 3/156 |
| 2020/0295685 | A1 | * | 9/2020 | Imamiya | ................... | H02P 8/38 |

FOREIGN PATENT DOCUMENTS

| JP | 2017-127079 | A | | 7/2017 |
| JP | 2017127079 | A | * | 7/2017 |

* cited by examiner

*Primary Examiner* — Jared Fureman
*Assistant Examiner* — Nicolas Bellido
(74) *Attorney, Agent, or Firm* — Posz Law Group, PLC

(57) ABSTRACT

In an inductive load control device, an energization controller controls an operation of an H-bridge circuit to switch from an energized state to a regenerative state when a load current value is equal to or greater than a first threshold value at a time after a mask time has elapsed from a start time of a reference cycle, and a short-circuit determination processor determines whether the short-circuit abnormality has occurred based on whether the load current value is equal to or greater than a second threshold value greater than the first threshold value. The short-circuit determination processor further determines whether the short-circuit abnormality has occurred based on the regenerative current value in the regenerative state when the load current value does not reach the second threshold value within the mask time.

9 Claims, 44 Drawing Sheets

FIG. 2 <FIRST DETERMINATION METHOD>

FIG. 3 <SECOND DETERMINATION METHOD>

INDUCTIVE LOAD CONTROL DEVICE

CROSS REFERENCE TO RELATED APPLICATION

The present application claims the benefit of priority from Japanese Patent Application No. 2019-103673 filed on Jun. 3, 2019. The entire disclosure of the above application is incorporated herein by reference.

TECHNICAL FIELD

The present disclosure relates to an inductive load control device.

BACKGROUND

As a method of constant current control for an inductive load such as a stepping motor, there has been a method in which an average current is kept constant by switching from energization to non-energization based on a predetermined current threshold and switching from non-energization to energization every predetermined reference cycle.

SUMMARY

The present disclosure provides an inductive load control device that determines whether a short-circuit abnormality has occurred based on not only a load current value but also a regenerative current value.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
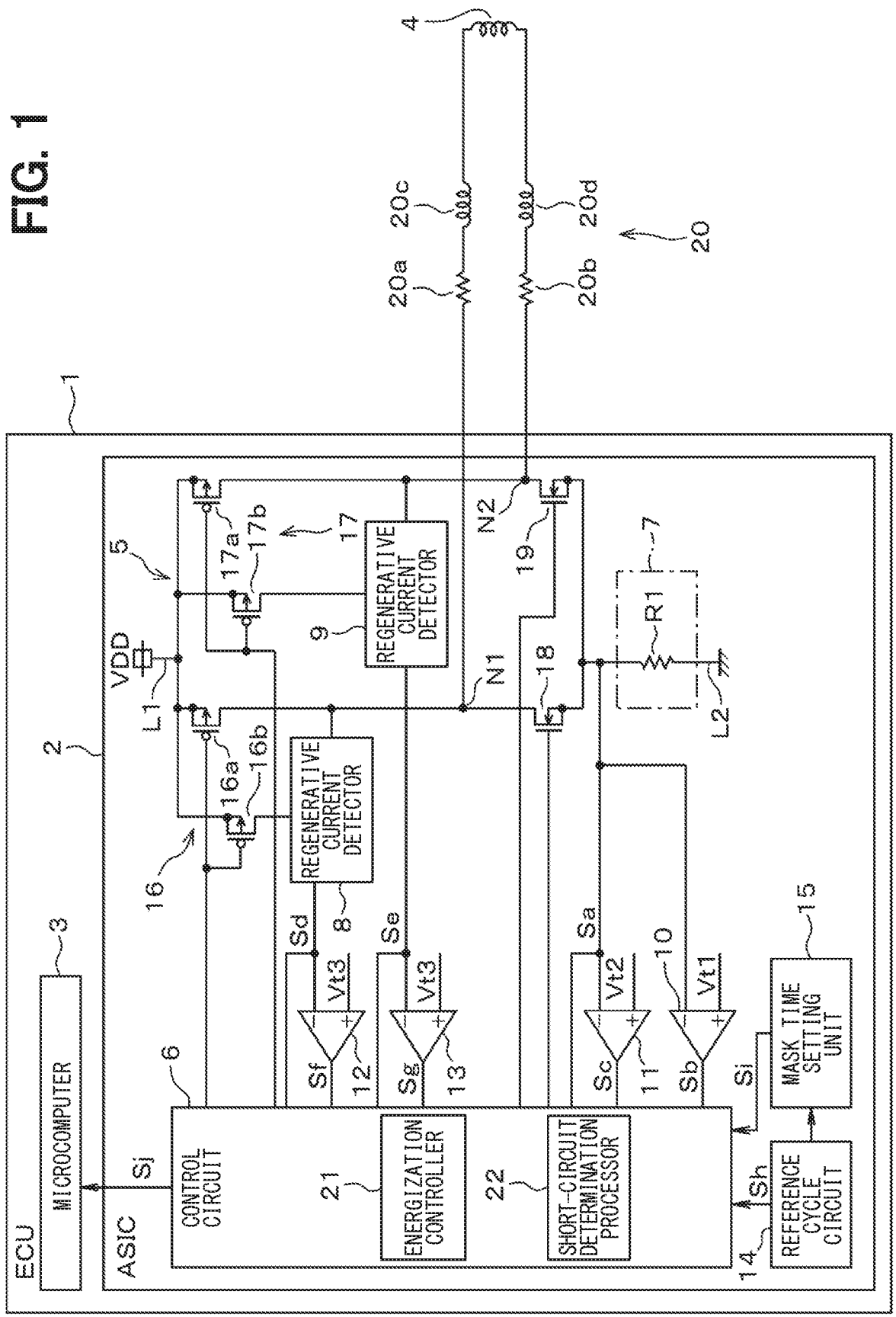
FIG. 1 is a diagram schematically showing a configuration of an inductive load control device according to a first embodiment.

In a certain method of constant current control for an inductive load, an average current is kept constant by switching from energization to non-energization based on a predetermined current threshold and switching from non-energization to energization every predetermined reference cycle. In an inductive load control device adopting the above-described method, since a current value and a cycle of the load current can be kept constant, an operation of a motor can be stabilized and a possibility of step-out can be reduced.

In one configuration adopting the above-described method, it is possible to detect an overcurrent at which the load current becomes an excessive value and to protect the load and the inductive load control device from the overcurrent, that is, it is possible to realize overcurrent protection. However, in the above configuration, when a short circuit occurs between a wiring from the device to the load and the power supply system, a short-circuit abnormality may not be detected depending on a resistance value, an inductance value, and the like of the wiring.

An inductive load control device according to an aspect of the present disclosure includes an H-bridge circuit, an energization controller, a load current detector, a regenerative current detector, and a short-circuit determination processor. The H-bright circuit includes a plurality of switching elements and is configured to drive a load that is an inductive load. The energization controller is configured to control an operation of the H-bridge circuit to switch from a regenerative state to an energized state at every predetermined reference cycle. The regenerative state is a state during which energization from a direct-current (DC) power supply to the load is stopped, and the energized state is a state during which energization from the DC power supply to the load is performed. The load current detector is configured to detect a load current flowing through a switching element that is turned on in the energized state among the plurality of switching elements included in the H-bridge circuit. The regenerative current detector is configured to detect a regenerative current flowing through a switching element that is turned on in the regenerative state among the plurality of switching elements included in the H-bridge circuit. The short-circuit determination processor is configured to detect whether a short-circuit abnormality has occurred in a wiring from the H-bridge circuit to the load based on a load current value that is a detection value by the load current detector and a regenerative current value that is a detection value by the regenerative current detector.

In the above configuration, when the load current value becomes equal to or greater than a predetermined first threshold value after a predetermined mask time has elapsed from a start time of a reference cycle, the energization controller controls the operation of the H-bridge circuit so as to switch from the energized state to the regenerative state. Then, the short-circuit determination processor determines whether a short-circuit abnormality has occurred based on whether the load current value is equal to or greater than a second threshold value that is set to a value greater than the first threshold value. Further, when the load current value does not reach the second threshold value within the mask time, the short-circuit determination processor determines whether the short-circuit abnormality has occurred based on the regenerative current value in the regenerative state.

When the wiring in the above configuration is short-circuited to a vehicle power supply system or the like, a current path at an occurrence of a short circuit varies depending on a short-circuited location. Therefore, when a short-circuit abnormality occurs, a resistance value, an inductance value, and the like of the path may have various values, and a current flowing through the path may have various modes. The short-circuit determination processor is configured to determine a short-circuit abnormality based on not only the load current value but also the regenerative current value. Therefore, when a short-circuit abnormality occurs, regardless of the mode of current flowing through the path, the occurrence of the short-circuit abnormality can be detected. Therefore, according to the above configuration, a short-circuit abnormality of the wiring from the device to the load can be accurately detected.

Hereinafter, a plurality of embodiments of the present disclosure will be described with reference to the drawings. In the following embodiments, substantially identical elements have the same numerals, and description of the identical elements will not be repeated.

First Embodiment

Hereinafter, a first embodiment will be described with reference to FIG. 1 to FIG. 28.

As shown in FIG. 1, an inductive load control device 1 according to the present embodiment is configured as an electronic control device (ECU) mounted on a vehicle. The inductive load control device 1 as the ECU includes an application specific integrated circuit (ASIC) 2 and a microcomputer 3 which are mounted on a circuit board. The ASIC 2 is configured to be communicable with the microcomputer 3.

The inductive load control device 1 performs a constant-current control of the driving of an inductive load 4 mounted on the vehicle. In the present case, the load 4 is a winding of a stepping motor. The inductive load control device 1 includes an H-bridge circuit 5, a control circuit 6, a load current detector 7, regenerative current detectors 8, 9, comparators 10 to 13, a reference cycle circuit 14, and a mask time setting unit 15, for example. The H-bridge circuit 5 drives the load 4 using a power supply voltage VDD supplied from a direct current (DC) power supply (not shown). The H-bridge circuit 5 is configured to supply a positive or negative current to the load 4.

Specifically, the H-bridge circuit 5 includes four switching elements 16 to 19 connected so as to form an H-bridge circuit configuration. The switching element 16 is a P-channel MOSFET and includes a main cell 16a and a sense cell 16b. The switching element 17 is a P-channel MOSFET and includes a main cell 17a and a sense cell 17b. Sources of the main cells 16a and 17a are commonly connected and are connected to a power supply line L1 to which the power supply voltage VDD is applied.

Drains of the main cells 16a and 17a are connected to nodes N1 and N2, respectively. The nodes N1 and N2 correspond to output nodes of the H-bridge circuit 5, and are connected to terminals of the load 4 via terminals of the ECU (not shown) and a wiring 20 provided in the vehicle. The wiring 20 includes wiring resistances 20a and 20b as resistance components and wiring inductances 20c and 20d as inductance components. In the present embodiment, inductance values of the wiring inductances 20c and 20d are, for example, several µH, which is much smaller than a inductance value of the load 4 (for example, several mH).

The sense cell 16b is for detecting a current flowing through the main cell 16a. A source of the sense cell 16b is commonly connected to the source of the main cell 16a, and a gate of the sense cell 16b is commonly connected to a gate of the main cell 16a. As a result, a current corresponding to the current flowing through the main cell 16a flows through the sense cell 16b at a predetermined shunt ratio. The sense cell 17b is for detecting a current flowing through the main cell 17a. A source of the sense cell 17b is commonly connected to the source of the main cell 17a, and a gate of the sense cell 17b is commonly connected to a gate of the main cell 17a. As a result, a current corresponding to the current flowing through the main cell 17a flows through the sense cell 17b at a predetermined shunt ratio. The shunt ratios are determined, for example, by a size ratio of the main cell 16a and the sense cell 16b, and a size ratio of the main cell 17a and the sense cell 17b.

The switching elements 18 and 19 are both N-channel MOSFETs, and drains of the switching elements 18, 19 are connected to the nodes N1 and N2, respectively. Sources of the switching elements 18 and 19 are commonly connected and are connected to a ground line L2 via the load current detector 7. The ground line L2 is applied with a ground potential, which is a reference potential of a circuit. A drive signal output from the control circuit 6 is applied to each gate of the switching elements 16 to 19. Accordingly, the operation of the switching elements 16 to 19 and, consequently, the operation of the H-bridge circuit 5 are controlled by the control circuit 6.

The H-bridge circuit 5 is controlled to be in one of a regenerative state in which energization from the DC power supply to the load 4 is stopped and an energized state in which energization from the DC power supply to the load 4 is performed. In the regenerative state, both the switching elements 16 and 17 on a high side are turned on, and both the switching elements 18 and 19 on a low side are turned off, so that a regenerative current flows through a path formed thereby.

The energized state includes a first energized state and a second energized state. In the first energized state, a load current flows through a path formed by turning on the switching elements 16 and 19 and turning off the switching elements 17 and 18, specifically, a path from the node N1 to the node N2 via the load 4. In the second energized state, a load current flows through a path formed by turning on the switching elements 17 and 18 and turning off the switching elements 16 and 19, specifically, a path from the node N2 to the node N1 via the load 4. Here, if a state in which the load 4 is energized in a positive direction is the first energized state, the second energized state is a state in which the load 4 is energized in a negative direction.

The load current detector 7 detects the load current that is a current flowing through switching elements that are turned on in the energized state among the switching elements 16 to 19 included in the H-bridge circuit 5. The load current detector 7 includes a resistor R1 provided in series with the path through which the load current flows. In this case, a voltage between terminals of the resistor R1, that is, a voltage of a high-potential side terminal of the resistor R1 with reference to the ground potential represents a load current value that is a value detected by the load current detector 7. Then, the load current detector 7 outputs the voltage of the high-potential terminal of the resistor R1 as a detection signal Sa that is a voltage signal indicating the load current value.

The detection signal Sa is applied to the control circuit 6 and is also input to each of inverting input terminals of the comparators 10 and 11. A non-inverting input terminal of the comparator 10 is applied with a first threshold voltage Vt1. The first threshold voltage Vt1 is a voltage corresponding to a first threshold It1 of the load current described later. A non-inverting input terminal of the comparator 11 is applied with a second threshold voltage Vt2. The second threshold voltage Vt2 is a voltage corresponding to a second threshold value It2 of the load current described later. In this case, the first threshold voltage Vt1 and the second threshold voltage Vt2 are generated by, for example, dividing a threshold reference voltage based on the ground potential by a resistor. Output signals Sb and Sc of the comparators 10 and 11 are applied to the control circuit 6.

The regenerative current detectors 8 and 9 detect a regenerative current that is a current flowing through the switching elements 16 and 17 that are turned on in the regenerative state among the switching elements 16 to 19 included in the H-bridge circuit 5. The drains of the main cell 16a and the sense cell 16b are connected to an input terminal of the regenerative current detector 8. The drains of the main cell 17a and the sense cell 17b are connected to an input terminal of the regenerative current detector 9. Although not shown, each of the regenerative current detectors 8 and 9 is configured as an I-V conversion circuit including a resistor, an operational amplifier, and the like, and converts the current flowing through the sense cells 16b and 17b into a voltage signal.

A detection signal Sd, which is a voltage signal representing the regenerative current value detected by the regenerative current detector 8, is applied to the control circuit 6 and is input to an inverting input terminal of the comparator 12. A detection signal Se, which is a voltage signal representing the regenerative current value detected by the regenerative current detector 9, is applied to the control circuit 6 and is input to an inverting input terminal of the comparator 13. Each non-inverting input terminal of the comparators 12, 13 is applied with a third threshold voltage Vt3. The third threshold voltage Vt3 is a voltage corresponding to a third threshold value It3 of the regenerative current described later. In this case, the third threshold voltage Vt3 is generated by, for example, dividing a threshold reference voltage based on the ground potential by a resistor. Output signals Sf and Sg of the comparators 12 and 13 are applied to the control circuit 6.

The reference cycle circuit 14 generates a clock signal Sh having a cycle corresponding to a reference cycle described later. The clock signal Sh is applied to the control circuit 6. The mask time setting unit 15 is configured as a logic circuit, and generates a mask signal Si having a predetermined level (for example, a high level) during a period corresponding to a mask time described later. Note that the mask signal Si is a signal synchronized with the clock signal Sh. The mask signal Si is applied to the control circuit 6. The control circuit 6 is configured as a logic circuit, and includes an energization controller 21 and a short-circuit determination processor 22 as functional blocks.

The energization controller 21 controls the operation of the H-bridge circuit 5 by generating a drive signal for driving the switching elements 16 to 19. The energization controller 21 controls the operation of the H-bridge circuit 5 based on the clock signal Sh such that the H-bridge circuit 5 switches from the regenerative state to the energized state at every predetermined reference cycle. Based on the clock signal Sh, the mask signal Si, and the output signal Sb of the comparator 10, the energization controller 21 controls the operation of the H-bridge circuit 5 so as to change from the energized state to the regenerative state when the load current value becomes equal to or greater than to the predetermined first threshold value It1 after the predetermined mask time has elapsed from a start of the reference cycle.

The short-circuit determination processor 22 can acquire the load current value based on the detection signal Sa, and can acquire the regenerative current value based on the detection signals Sd and Se. The short-circuit determination processor 22 can determine a timing of switching from the energized state to the regenerative state based on the clock signal Sh, the mask signal Si, and the output signal Sb of the comparator 10. The short-circuit determination processor 22 can determine whether the load current value is equal to or greater than the second threshold value It2 based on the output signal Sc of the comparator 11. The second threshold value It2 is set to any value greater than the first threshold value It1.

Further, the short-circuit determination processor 22 can determine whether the regenerative current value is equal to or less than the predetermined third threshold value It3 based on the output signals Sf and Sg of the comparators 12 and 13. Note that the third threshold value It3 is set to any value lower than the regenerative current value in the normal state. Further, the short-circuit determination processor 22 can determine a timing of switching from the regenerative state to the energized state based on the clock signal Sh, and can determine the mask time based on the mask signal Si.

The short-circuit determination processor 22 determines whether a short-circuit abnormality has occurred in the wiring 20 from the H-bridge circuit 5 to the load 4 based on the load current value and the regenerative current value. In this case, the short-circuit determination processor 22 determines whether a short-circuit abnormality has occurred based on whether the load current value is equal to or greater than the second threshold value It2. Further, in this case, when the load current value does not reach the second threshold value It2 within the mask time, the short-circuit determination processor 22 determines whether a short-circuit abnormality has occurred based on the regenerative current value in the regenerative state. Specific methods for such determination include the following determination methods.

First Determination Method

In a first determination method, the short-circuit determination processor 22 determines a short-circuit abnormality as follows. That is, the short-circuit determination processor 22 determines that a short-circuit abnormality has occurred in a case where the regenerative current value in the regenerative state, specifically, the regenerative current value at the timing of switching from the regenerative state to the energized state is less than the third threshold value It3 when the load current value does not reach the second threshold value It2 within the mask time.

Figure 2:
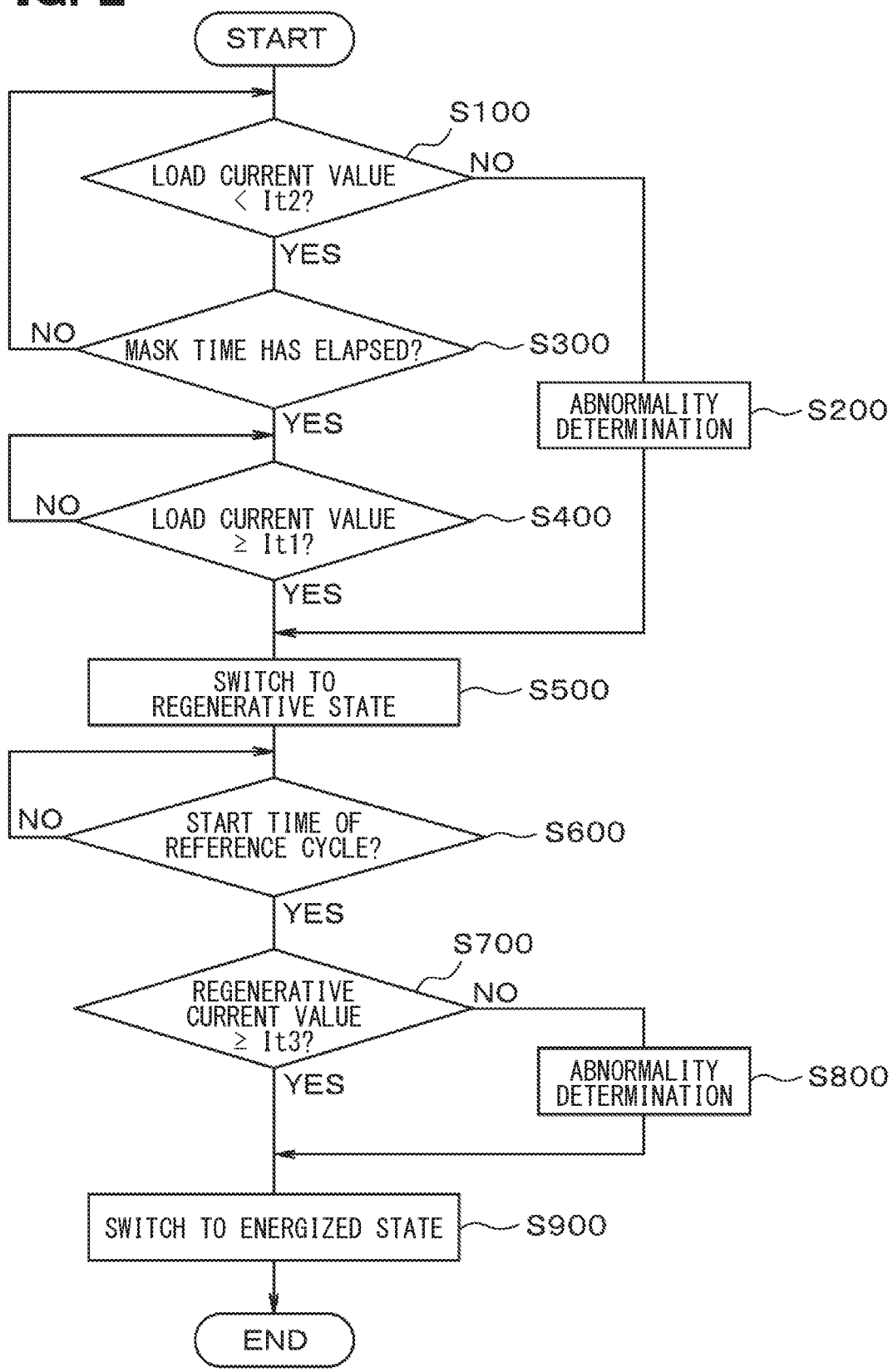
FIG. 2 is a diagram showing an example of a specific processing procedure of a first determination method according to the first embodiment.

As a specific processing procedure for realizing the first determination method, for example, the contents shown in FIG. 2 can be adopted. In S100, which is executed first after the processing shown in FIG. 2 is started, the short-circuit determination processor 22 determines whether the load current value is less than the second threshold value It2. When the load current value is equal to or greater than the second threshold value It2, a determination of "NO" is made in S100, and the process proceeds to S200. In S200, the short-circuit determination processor 22 determines that a short-circuit abnormality has occurred. After execution of S200, the process proceeds to S500.

On the other hand, when the load current value is less than the second threshold value It2, a determination of "YES" is made in S100, and the process proceeds to S300. In S300, the short-circuit determination processor 22 determines whether the mask time has elapsed from the start of the reference cycle. When the mask time has not elapsed, a determination of "NO" is made in S300, and the processing returns to S100. On the other hand, when the mask time has elapsed, a determination of "YES" is made in S300, and the process proceeds to S400.

In S400, the short-circuit determination processor 22 determines whether the load current value is equal to or greater than the first threshold value It1. When the load current value is less than the first threshold value It1, a determination of "NO" is made in S400, and S400 is executed again. On the other hand, when the load current value is equal to or greater than the first threshold value It1, a determination of "YES" made in S400, and the process proceeds to S500. In S500, the operation of the H-bridge circuit 5 is controlled so as to switch from the energized state to the regenerative state, that is, to switch to the regenerative state. After execution of S500, the process proceeds to S600.

In S600, the short-circuit determination processor 22 determines whether it is a start time of the reference cycle. In the present embodiment, the start time of the reference cycle is a rising timing of the clock signal Sh. Thus, in S600, the short-circuit determination processor 22 detects a rising edge of the clock signal Sh and determines whether it is the start time of the reference cycle based on the presence or absence of the edge detection. When it is not the start time of the reference cycle, a determination of "NO" is made in S600, and S600 is executed again.

On the other hand, when it is the start time of the reference cycle, a determination of "YES" is made in S600, and the process proceeds to S700. In S700, the short-circuit determination processor 22 determines whether the regenerative current value, specifically, the regenerative current value immediately before switching from the regenerative state to the energized state is equal to or greater than the third threshold value It3. When the regenerative current value is less than the third threshold value It3, a determination of "NO" is made in S700, and the process proceeds to S800.

In S800, the short-circuit determination processor 22 determines that a short-circuit abnormality has occurred. After execution of S800, the process proceeds to S900. On the other hand, when the regenerative current value is equal to or greater than the third threshold value It3, a determination of "YES" is made in S700, and the process proceeds to S900. In S900, the operation of the H-bridge circuit 5 is controlled so as to switch from the regenerative state to the energized state. After execution of S900, the process ends.

Second Determination Method

In the second determination method, the short-circuit determination processor 22 determines a short-circuit abnormality as follows. That is, when the load current value does not reach the second threshold value It2 within the mask time, the short-circuit determination processor 22 extends the mask time by a predetermined time based on the regenerative current value in the regenerative state. As a specific processing procedure for realizing the second determination method, for example, the contents shown in FIG. 3 can be adopted.

Figure 3:
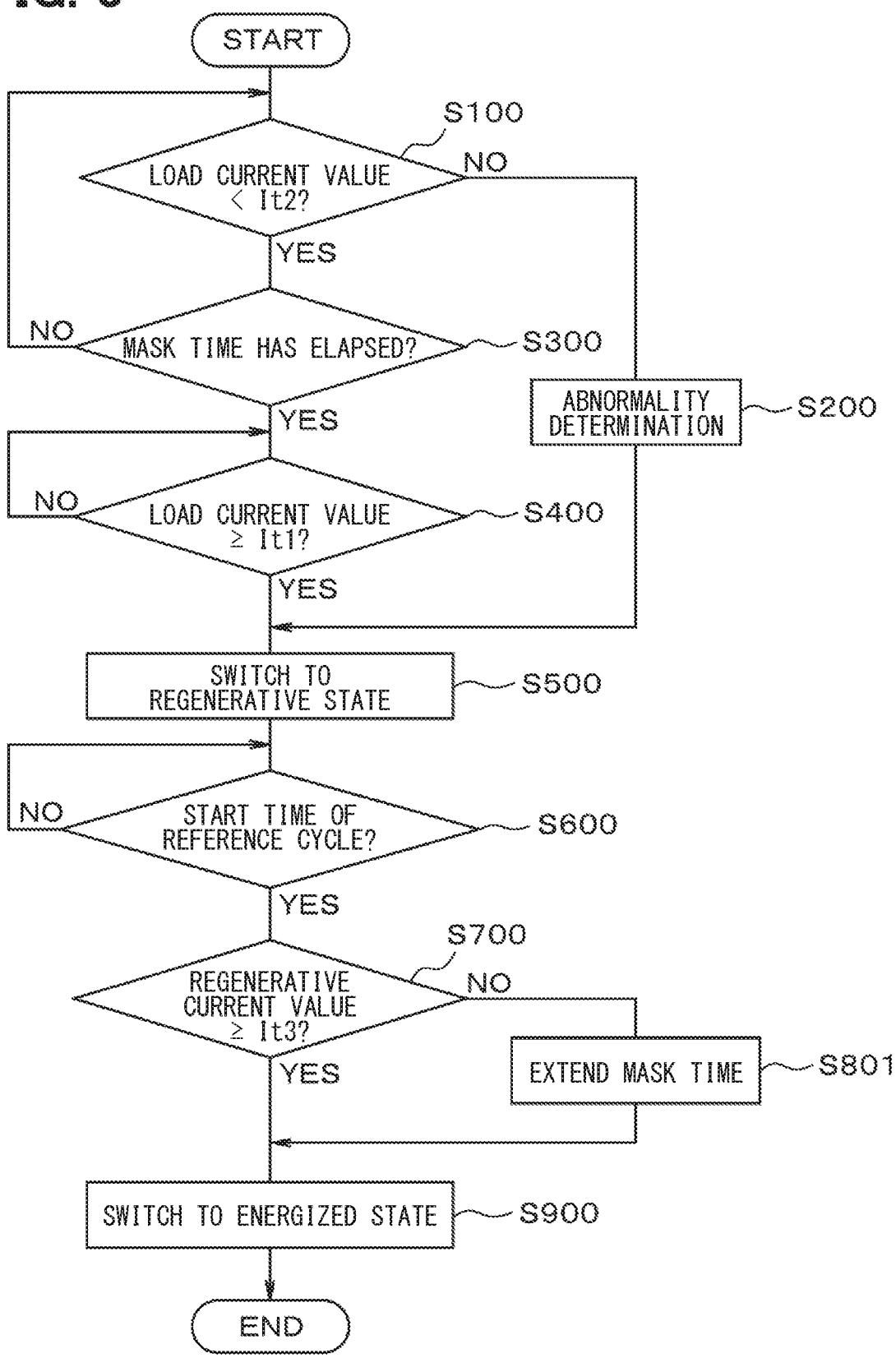
FIG. 3 is a diagram showing an example of a specific processing procedure of a second determination method according to the first embodiment.

The specific processing procedure of the second determination method shown in FIG. 3 is different from the specific processing procedure of the first determination method shown in FIG. 2 in that S801 is provided instead of S800. Also in this case, in S700, the short-circuit determination processor 22 determines whether the regenerative current value is equal to or greater than the third threshold value It3. When the regenerative current value is less than the third threshold value It3, a determination of "NO" is made in S700, and the process proceeds to S801.

In S801, the mask time is extended by the predetermined time. As a result, the mask time at the next determination becomes longer than the mask time at the current determination, and a short-circuit abnormality is more likely to be detected in the processing of S100 to S300. On the other hand, when the regenerative current value is equal to or greater than the third threshold value It3, a determination of "YES" is made in S700, and the process proceeds to S900.

Third Determination Method

In the third determination method, the short-circuit determination processor 22 determines a short-circuit abnormality as follows. That is, when the load current value does not reach the second threshold value It2 within the mask time, the short-circuit determination processor 22 reduces the second threshold value It2 by a predetermined value based on the regenerative current value in the regenerative state. As a specific processing procedure for realizing the third determination method, for example, the contents shown in FIG. 4 can be adopted.

Figure 4:
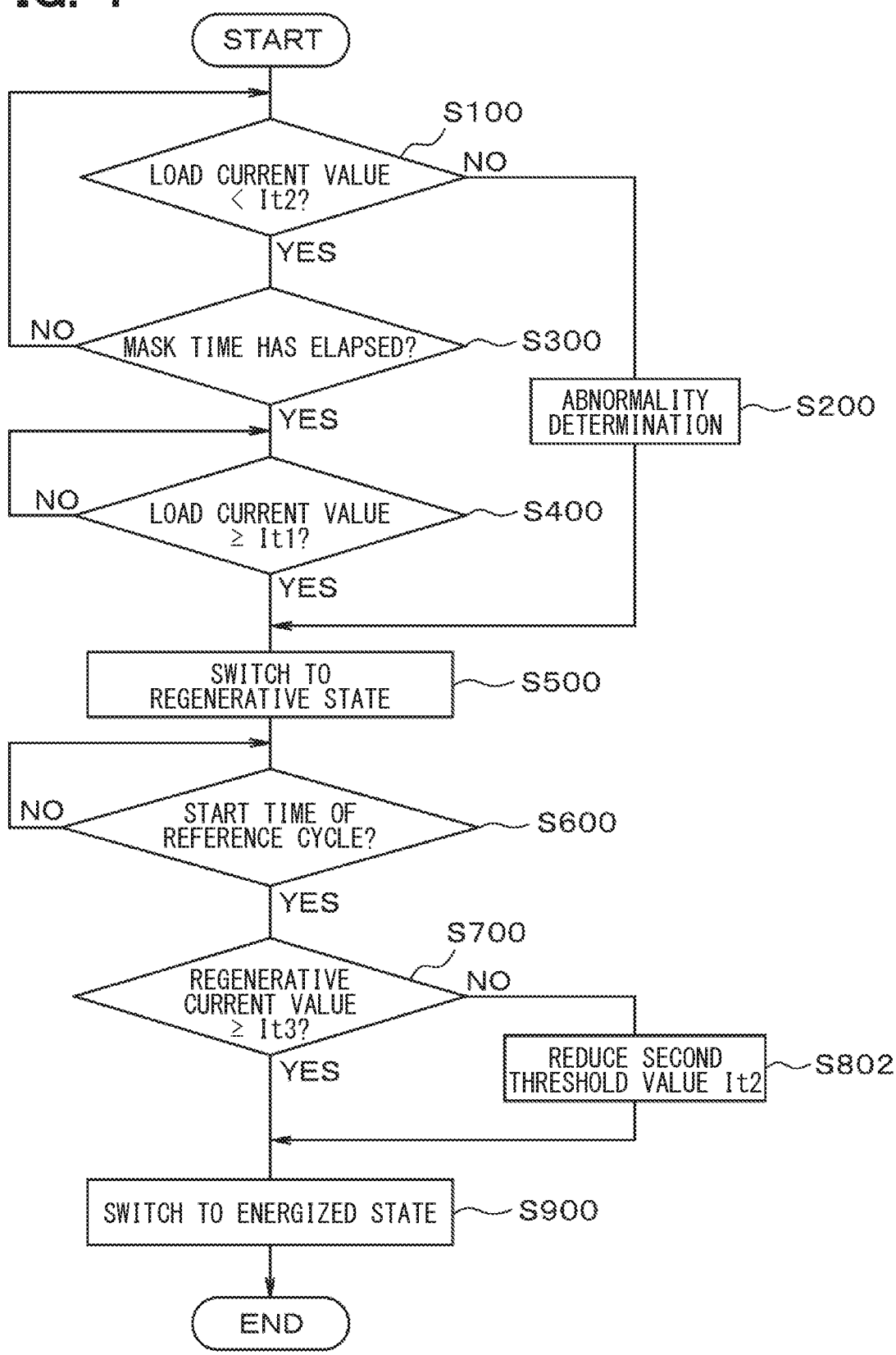
FIG. 4 is a diagram showing an example of a specific processing procedure of a third determination method according to the first embodiment.

The specific processing procedure of the third determination method shown in FIG. 4 is different from the specific processing procedure of the first determination method shown in FIG. 2 in that S802 is provided instead of S800.

Also in this case, in S700, the short-circuit determination processor 22 determines whether the regenerative current value is equal to or greater than the third threshold value It3. When the regenerative current value is less than the third threshold value It3, a determination of "NO" is made in S700, and the process proceeds to S802.

In S802, the second threshold value It2 is reduced by the predetermined value. As a result, the second threshold value It2 at the time of the next determination becomes lower than the second threshold value It2 at the time of the current determination, and a short-circuit abnormality is more likely to be detected in the processing of S100 to S300. On the other hand, when the regenerative current value is equal to or greater than the third threshold value It3, a determination of "YES" is made in S700, and the process proceeds to S900.

Fourth Determination Method

In the fourth determination method, the short-circuit determination processor 22 determines a short-circuit abnormality as follows. That is, when the load current value does not reach the second threshold value It2 within the mask time, the short-circuit determination processor 22 determines whether a short-circuit has occurred based on a difference between the load current value and the regenerative current value at the time of switching from the energized state to the regenerative state. As a specific processing procedure for realizing the fourth determination method, for example, the contents shown in FIG. 5 can be adopted.

Figure 5:
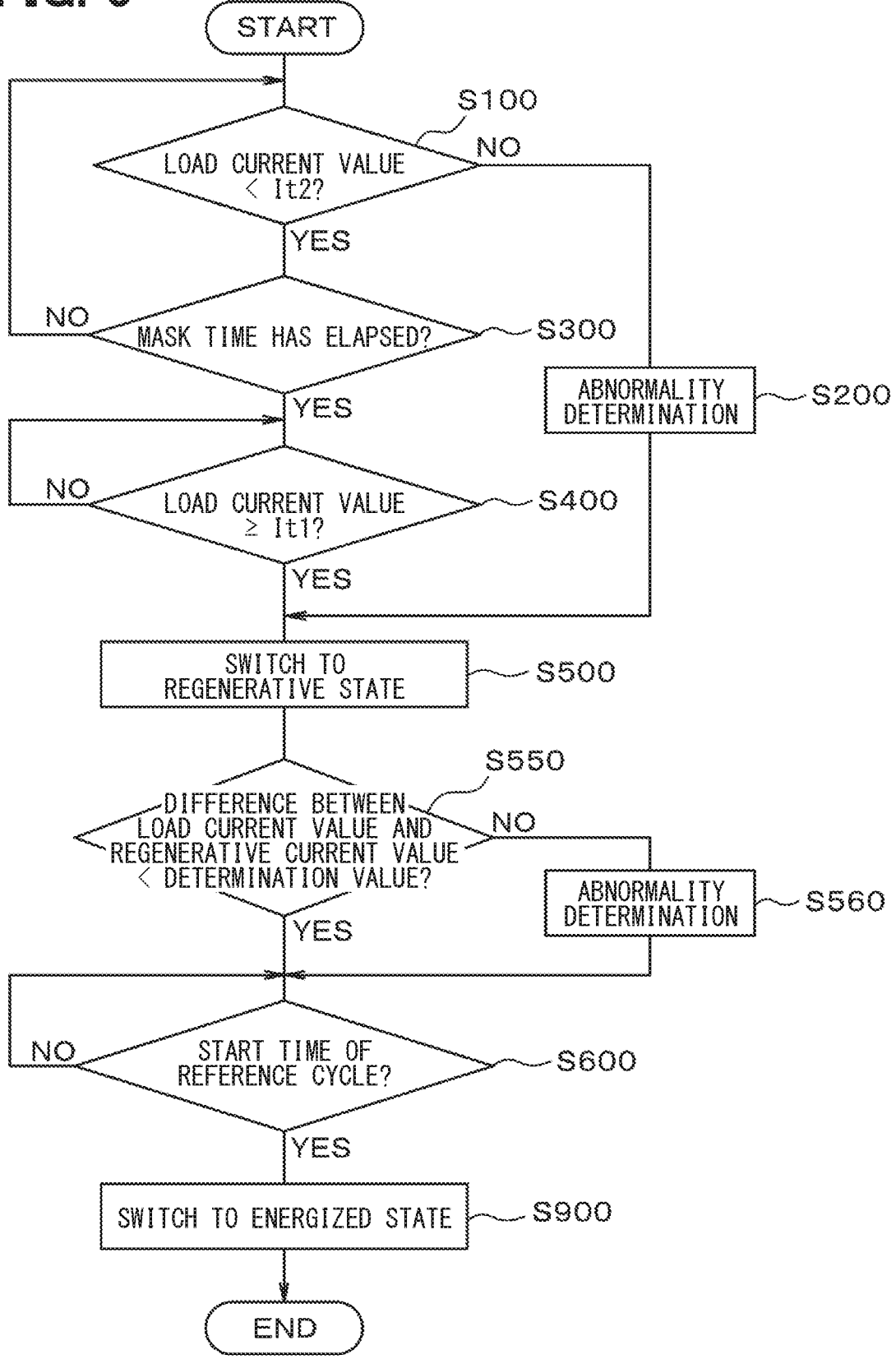
FIG. 5 is a diagram showing an example of a specific processing procedure of a fourth determination method according to the first embodiment.

The specific processing procedure of the fourth determination method shown in FIG. 5 is different from the specific processing procedure of the first determination method shown in FIG. 2 in that S550 and S560 are provided instead of S700 and S800. In this case, after execution of S500, the process proceeds to S550. In S550, the short-circuit determination processor 22 determines whether the difference between the load current value and the regenerative current value is less than a predetermined determination value. When the difference between the load current value and the regenerative current value is equal to or greater than the determination value, a determination of "NO" is made in S550, and the process proceeds to S560.

In S560, the short-circuit determination processor 22 determines that a short-circuit abnormality has occurred. After execution of S560, the process proceeds to S600. On the other hand, when the difference between the load current value and the regenerative current value is less than the determination value, a determination of "YES" is made in S550, and the process proceeds to S600. In this case, when a determination of "YES" is made in S600, that is, when the reference cycle starts, the process proceeds to S900.

The short-circuit determination processor 22 can perform each of the above-described first to fourth determination methods independently, or can perform a combination of at least two of the determination methods. When the short-circuit determination processor 22 determines that a short-circuit abnormality has occurred, the energization controller 21 control the operation of the H-bridge circuit 5 so as to be forcibly in the regenerative state regardless of the timing of switching described above, or turn off all of the switching elements 16 to 19 included in the H-bridge circuit 5. The control circuit 6 outputs a determination signal Sj representing the result of the determination by the short-circuit determination processor 22 to the microcomputer 3. When receiving the determination signal Sj indicating that a short-circuit abnormality has occurred, the microcomputer 3 executes various processing for coping with the generated short-circuit abnormality.

Figure 6:
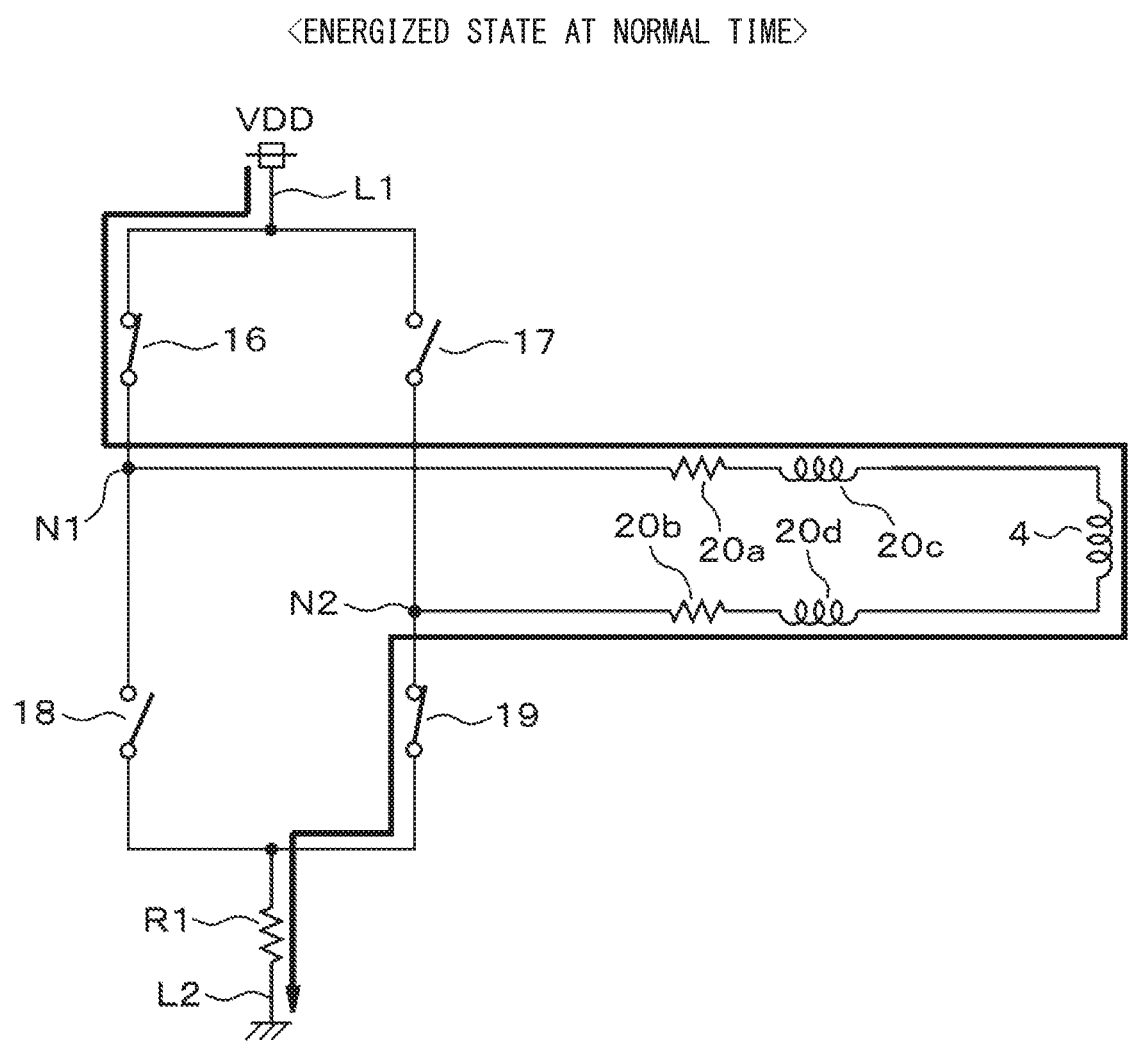
FIG. 6 is a diagram for explaining a path of a current flowing in an energized state at a normal time according to the first embodiment.
Figure 7:
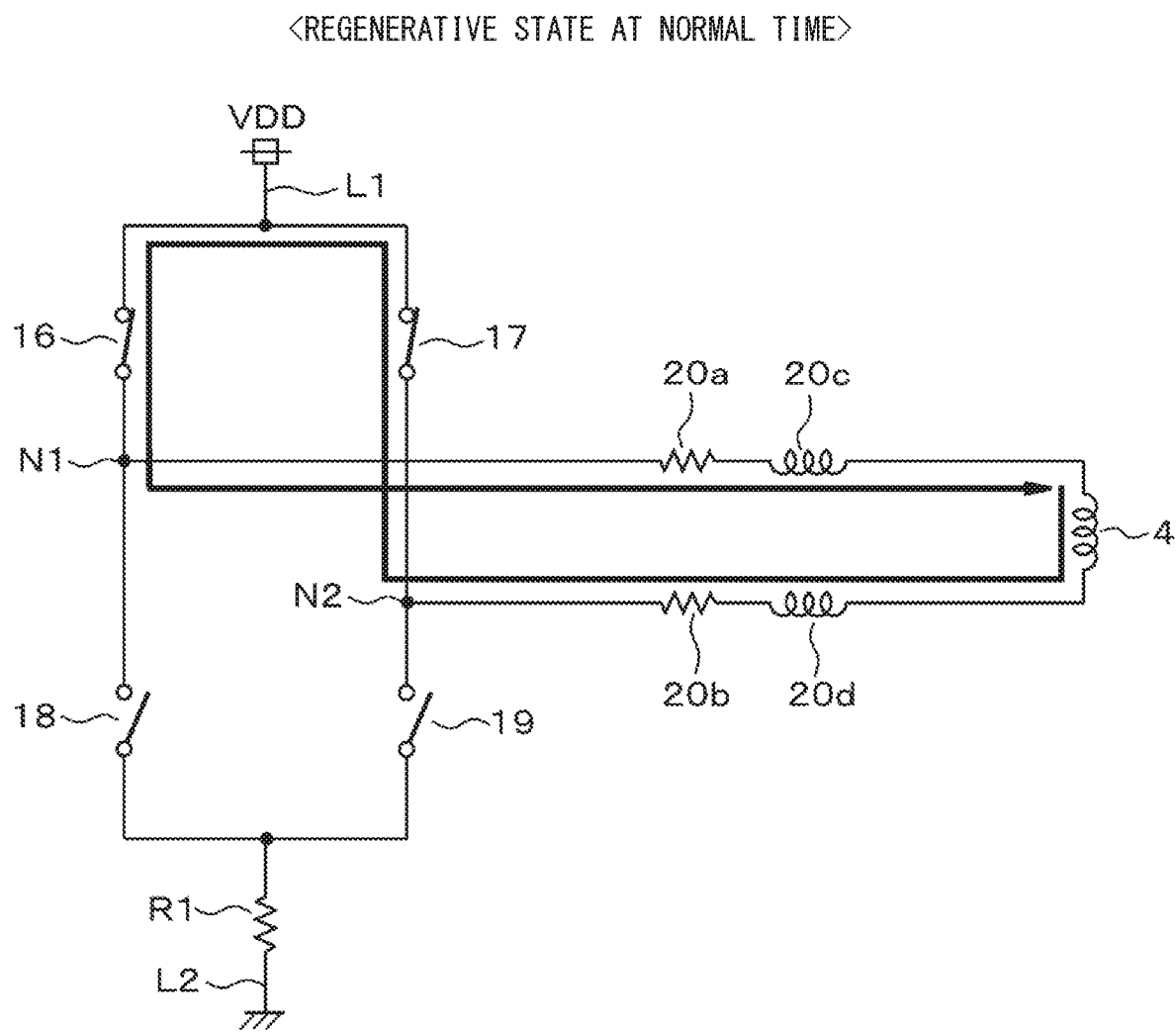
FIG. 7 is a diagram for explaining a path of a current flowing in a regenerative state at the normal time according to the first embodiment.

Next, the operation of the above configuration will be described with reference to FIG. 6 to FIG. 28. In FIGS. 6, 7 and the like for explaining the path through which the load current or the regenerative current flows, a state where each of the switching elements 16 to 19 is turned off is represented as a symbol of a switch with an open contact, and a state where each of the switching elements 16 to 19 is turned on is represented as a symbol of a switch with a closed contact.

Figure 8:
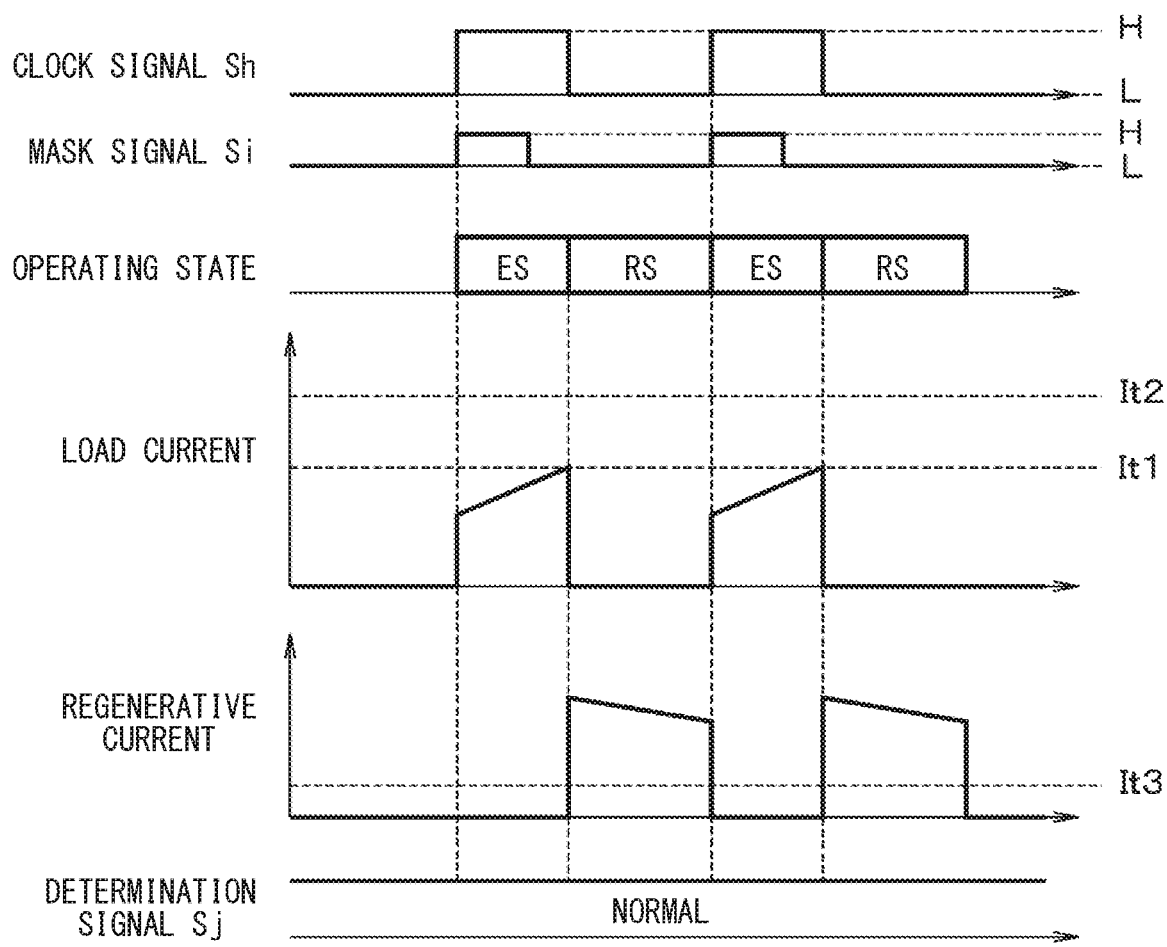
FIG. 8 is a timing chart for explaining an operation timing of each unit at the normal time according to the first embodiment.

In FIG. 8 and the like for explaining the operation timing of each unit, a low level is represented by "L" and a high level is represented by "H" for binary signals such as the clock signal Sh and the mask signal Si. Further, the load current and the regenerative current in FIG. 8 and the like represent the detected value by the load current detector 7 and the detected value by the regenerative current detector 8, respectively. In the following description, the description of the energized state is made using the first energized state as an example, but the same applies to the second energized state.

Normal Operation

When no short-circuit abnormality has occurred, that is, at a normal time, the operation of each unit is as follows. As shown in FIG. 6, in the energized state at the normal time, a current flows through the power supply line L1, the switching element 16 that is turned on, the node N1, the wiring resistance 20a, the wiring inductance 20c, the load 4, the wiring inductance 20d, the wiring resistance 20b, the node N2, the switching element 19 that is turned on, the resistor R1, and the ground line L2 in a stated order.

As shown in FIG. 7, in the regenerative state at the normal time, a current flows through the load 4, the wiring inductance 20d, the wiring resistance 20b, the node N2, the switching element 17 that is turned on, the power supply line L1, the switching element 16 that is turned on, the node N1, the wiring resistance 20a, the wiring inductance 20c, and the load 4 in a stated order.

The operation timing of each unit at the normal time is as shown in FIG. 8. That is, the operation of the H-bridge circuit 5 is controlled so as to switch to the energized state (ES) at a timing when the clock signal Sh changes from a low level to a high level, that is, at a timing when the clock signal Sh rises. As a result, at the start of the reference cycle, the load current increases sharply to a predetermined current value. The current value of the load current at the time is substantially the same as the current value of the regenerative current in the immediately preceding regenerative state. Thereafter, the load current increases at a predetermined gradient, that is, at a predetermined change rate. The change rate depends on the inductance value of the path through which the load current flows, that is, the inductance values of the wiring 20, the load 4, and the like.

When the load current value reaches the first threshold value It1 after the mask time elapses from the start time of the reference cycle, the operation of the H-bridge circuit 5 is controlled so as to switch from the energized state to the regenerative state (RS). As a result, the load current sharply decreases to zero, and the regenerative current sharply increases to a predetermined current value. The current value of the regenerative current at the time is substantially the same as the current value of the load current in the immediately preceding energized state. Thereafter, the regenerative current decreases at a predetermined gradient, that is, at a predetermined change rate. The change rate depends on the inductance value of the path through which the regenerative current flows, that is, the inductance values of the wiring 20, the load 4, and the like.

At the normal time, the load current value does not become equal to or greater than the second threshold value It2 within the mask time, the regenerative current value in the regenerative state does not become less than the third threshold value It3, and the difference between the load current value and the regenerative current value at the time of switching to the regenerative state does not exceed the determination value. Therefore, at the normal time, the short-circuit determination processor 22 does not determine that a short-circuit abnormality has occurred in any of the above-described determination methods. Therefore, at the normal time, the determination signal Sj output from the control circuit 6 to the microcomputer 3 is always a signal indicating that it is normal.

Operation when Power Supply Short-Circuit A Occurs

Figure 9:
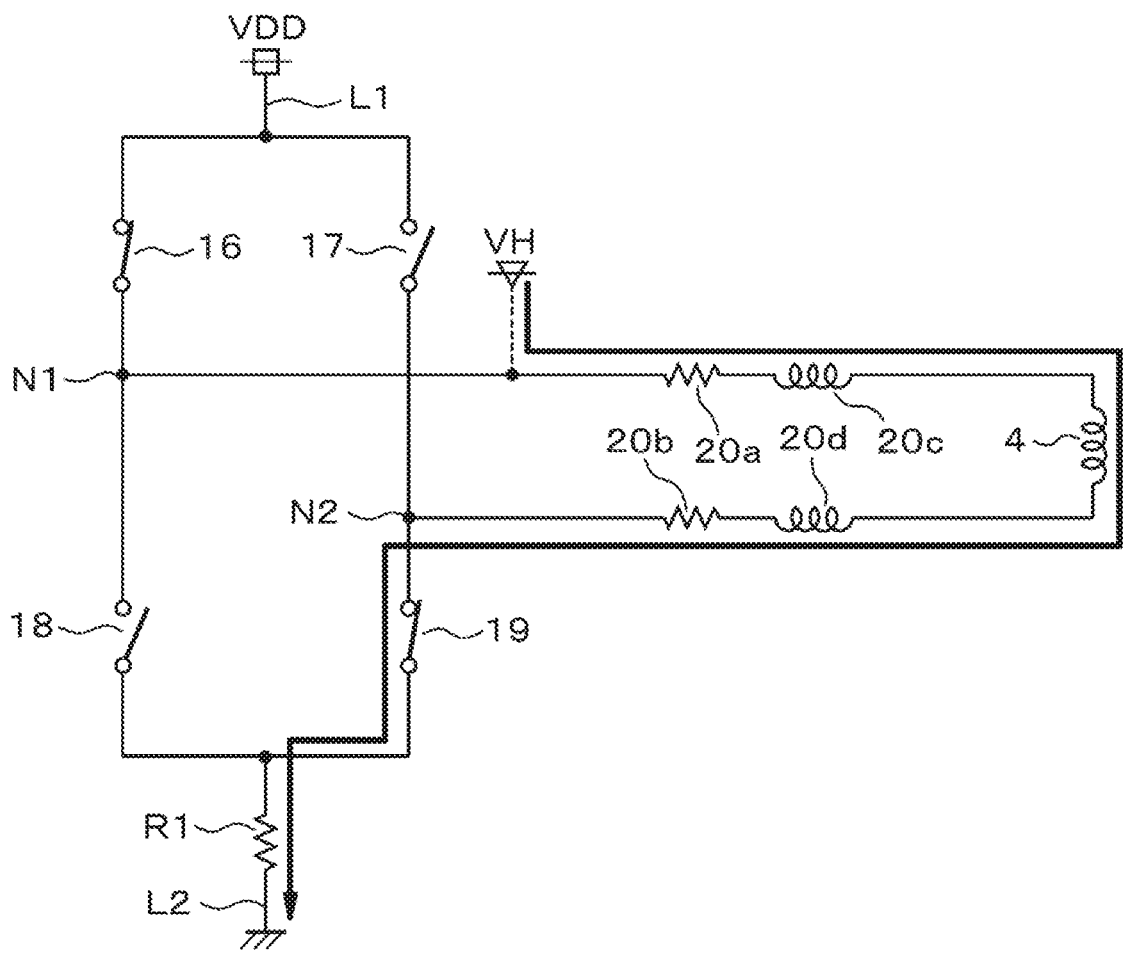
FIG. 9 is a diagram for explaining a path of a current flowing in the energized state when a power supply short-circuit A occurs in the first embodiment.
Figure 10:
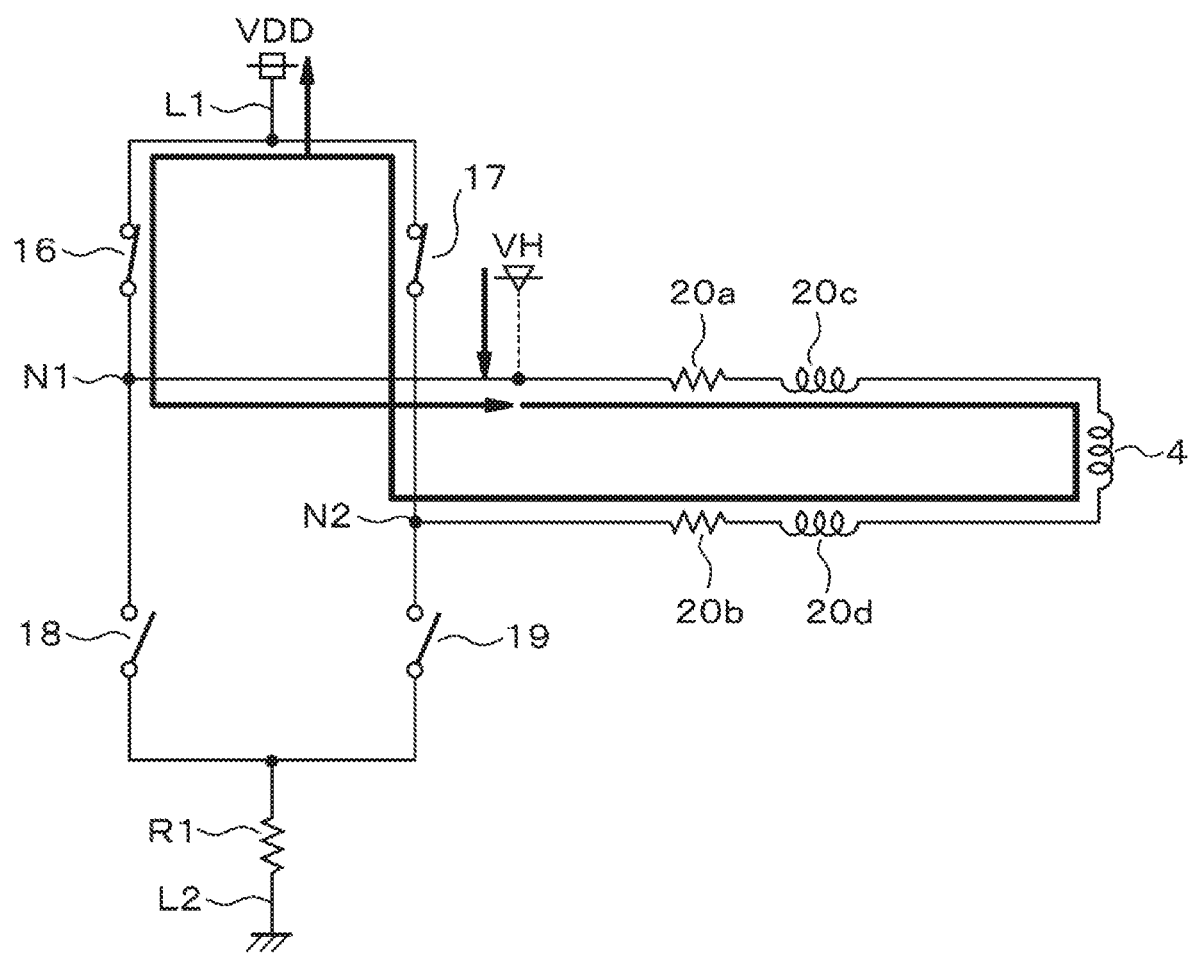
FIG. 10 is a diagram for explaining a path of a current flowing in the regenerative state when the power supply short-circuit A occurs in the first embodiment.

There may be a case in which a short circuit with a vehicle power supply system occurs at a portion between the node N1 and the wiring resistance 20a due to, for example, damage of the wiring 20. In the present disclosure, such a short-circuit abnormality is referred to as a power supply short-circuit A. In FIG. 9 and FIG. 10, the above-described vehicle power supply system is represented as a power supply symbol different from the power supply symbol applied to the H-bridge circuit 5. In this case, it is assumed that the power supply voltage VH of the vehicle power supply system is a voltage that is substantially the same as the power supply voltage VDD applied to the H-bridge circuit 5, or a voltage that is slightly greater than the power supply voltage VDD.

When the power supply short-circuit A occurs, each unit operates as follows. As shown in FIG. 9, in the energized state when the power supply short-circuit A occurs, a current flows from the vehicle power supply system through the wiring resistance 20a, the wiring inductance 20c, the load 4, the wiring inductance 20d, the wiring resistance 20b, the node N2, the switching element 19 that is turned on, the resistor R1, and the ground line L2 in a stated order.

As shown in FIG. 10, in the regenerative state when the power supply short-circuit A occurs, a current flows from the vehicle power supply system through the wiring resistance 20a, the wiring inductance 20c, the load 4, the wiring inductance 20d, the wiring resistance 20b, the node N2, the switching element 17 that is turned on, the power supply line L1, the switching element 16 that is turned on, the node N1, and the wiring resistance 20a in a stated order.

Figure 11:
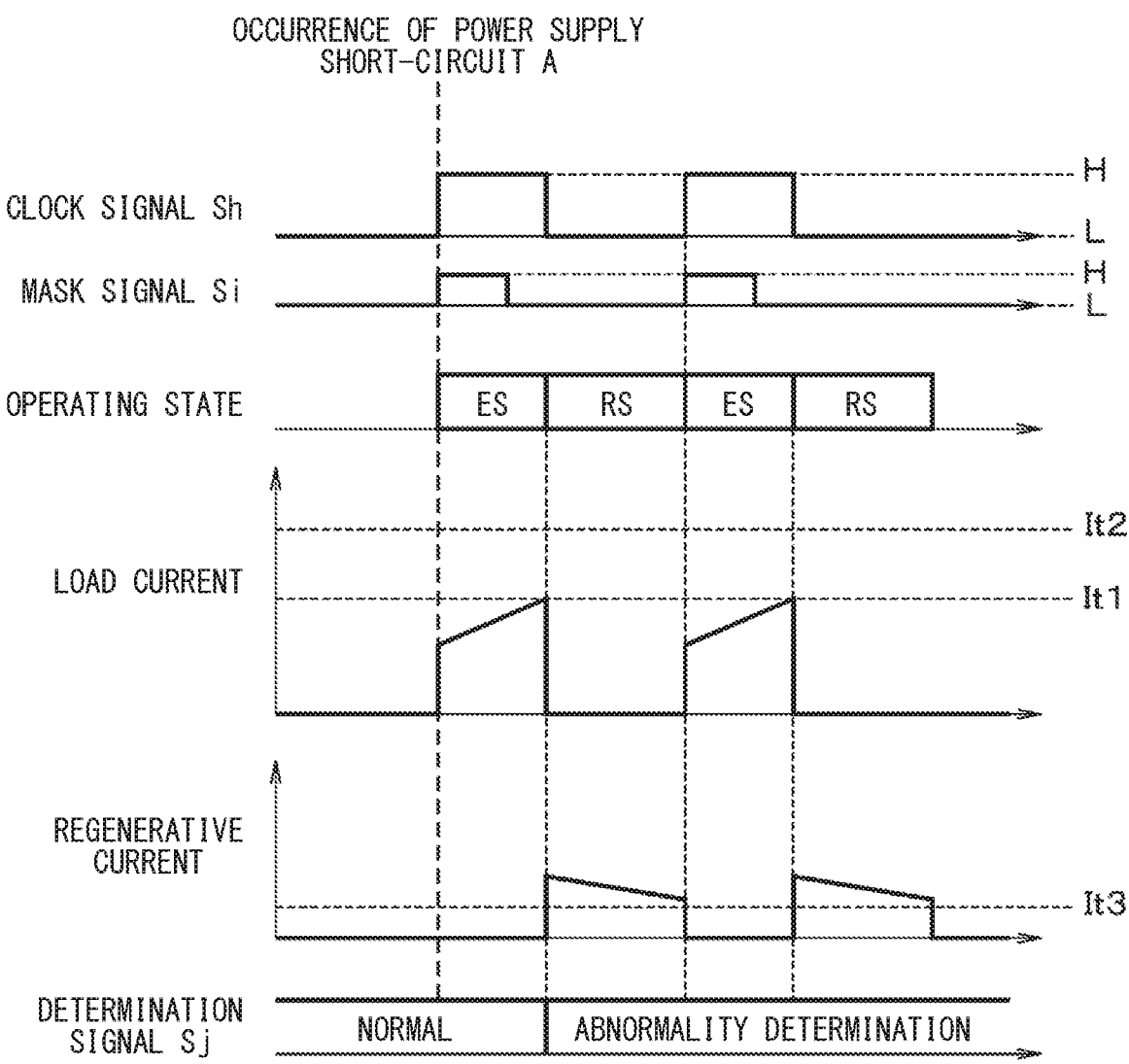
FIG. 11 is a timing chart for explaining an operation timing of each unit when the power supply short-circuit A occurs in the first embodiment.

The operation timing of each unit when the power supply short-circuit A occurs is as shown in FIG. 11. When the power supply short-circuit A occurs, the basic operation is similar to the normal time, but a mode of the regenerative current is different from the normal time. Note that when the power supply short-circuit A occurs, a mode of the load current is substantially similar to the normal time. In this case, when the operation of the H-bridge circuit 5 is controlled so as to switch from the energized state to the regenerative state after the occurrence of the power supply short-circuit, the load current sharply decreases to zero and the regenerative current sharply increases to a predetermined current value.

However, the current value of the regenerative current at this time is lower than the current value of the load current in the immediately preceding energized state. This is because, as shown in FIG. 10, a part of the regenerative current flows into the power supply line L1, and not all the regenerative current flows to the switching element 16 that has the sense cell 16b for detecting the regenerative current.

Therefore, the difference between the load current value and the regenerative current value at the switching from the energized state to the regenerative state becomes equal to or greater than the determination value, and it is determined that a short-circuit abnormality has occurred by the above-described fourth determination method. Therefore, if the power supply short-circuit A occurs, the determination signal Sj output from the control circuit 6 to the microcomputer 3 at the time of switching from the energized state to the regenerative state after the occurrence of the power supply short-circuit indicates that a short-circuit abnormality has occurred.

Operation when Power Supply Short-Circuit B Occurs

Figure 12:
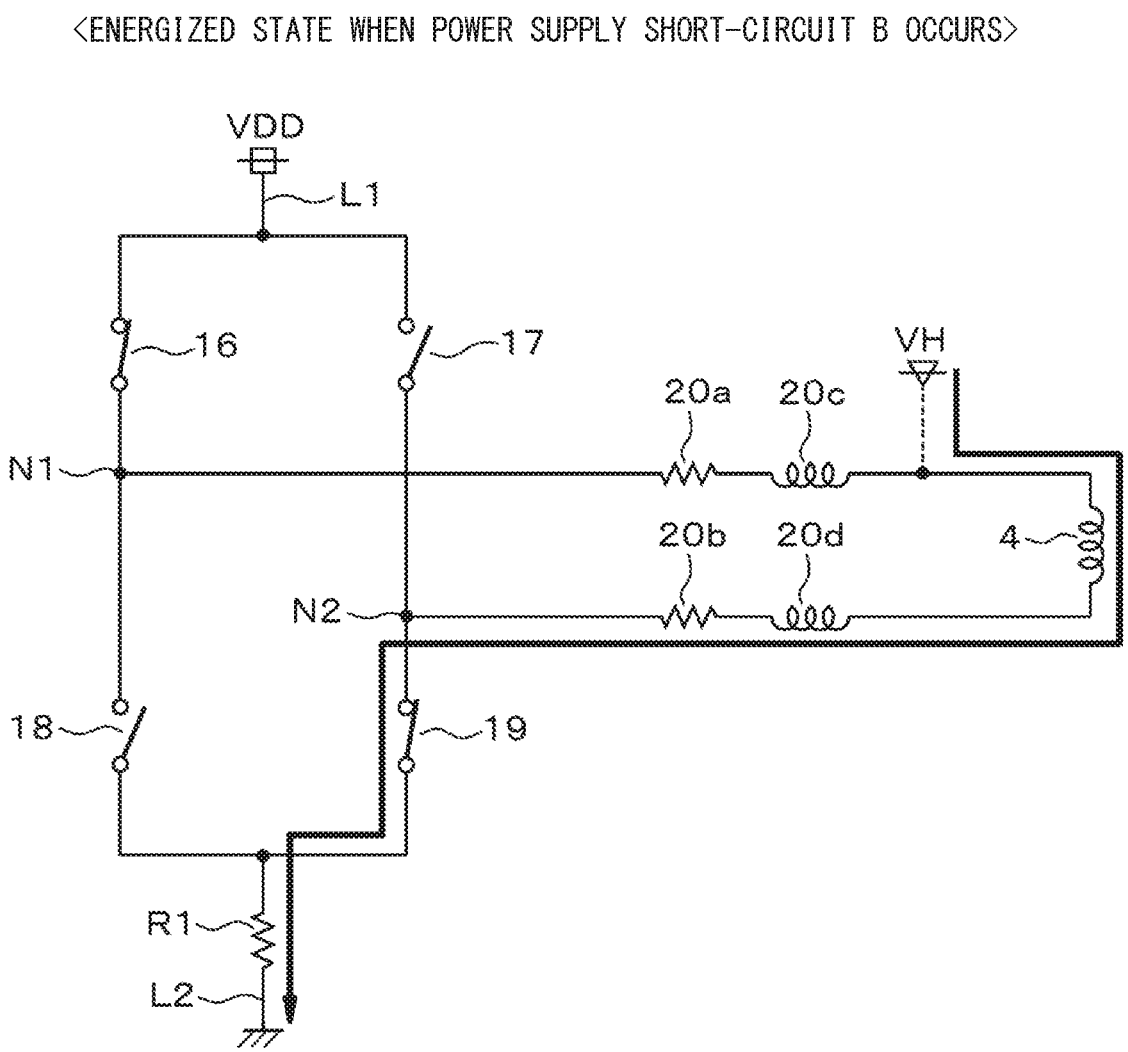
FIG. 12 is a diagram for explaining a path of a current flowing in the energized state when a power supply short-circuit B occurs in the first embodiment.

There may be a case in which a short circuit with the vehicle power supply system occurs at a portion between the wiring inductance 20c and the load 4 due to, for example, damage of the wiring 20. In the present disclosure, such a short-circuit abnormality is referred to as a power supply short-circuit B. When the power supply short-circuit B occurs, each unit operates as follows. As shown in FIG. 12, in the energized state when the power supply short-circuit B occurs, a current flows from the vehicle power supply system through the load 4, the wiring inductance 20d, the wiring resistance 20b, the node N2, the switching element 19 that is turned on, the resistance R1, and the ground line L2 in a stated order.

Figure 13:
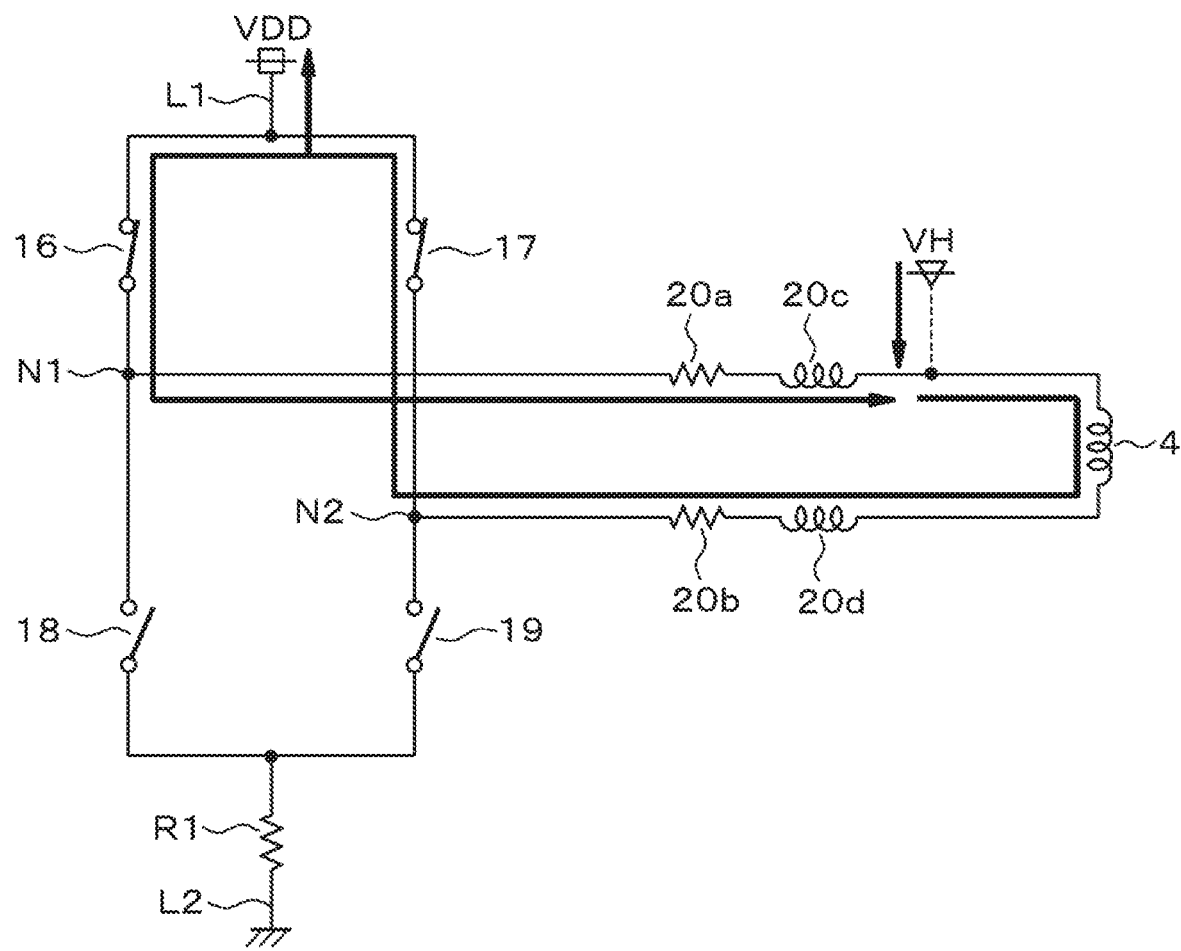
FIG. 13 is a diagram for explaining a path of a current flowing in the regenerative state when the power supply short-circuit B occurs in the first embodiment.

As shown in FIG. 13, in the regenerative state when the power supply short-circuit B occurs, a current flows from the vehicle power supply system through the load 4, the wiring inductance 20d, the wiring resistance 20b, the node N2, the switching element 17 that is turned on, the power supply line L1, the switching element 16 that is turned on, the node N1, the wiring resistance 20a, and the wiring inductance 20c in a stated order.

Figure 14:
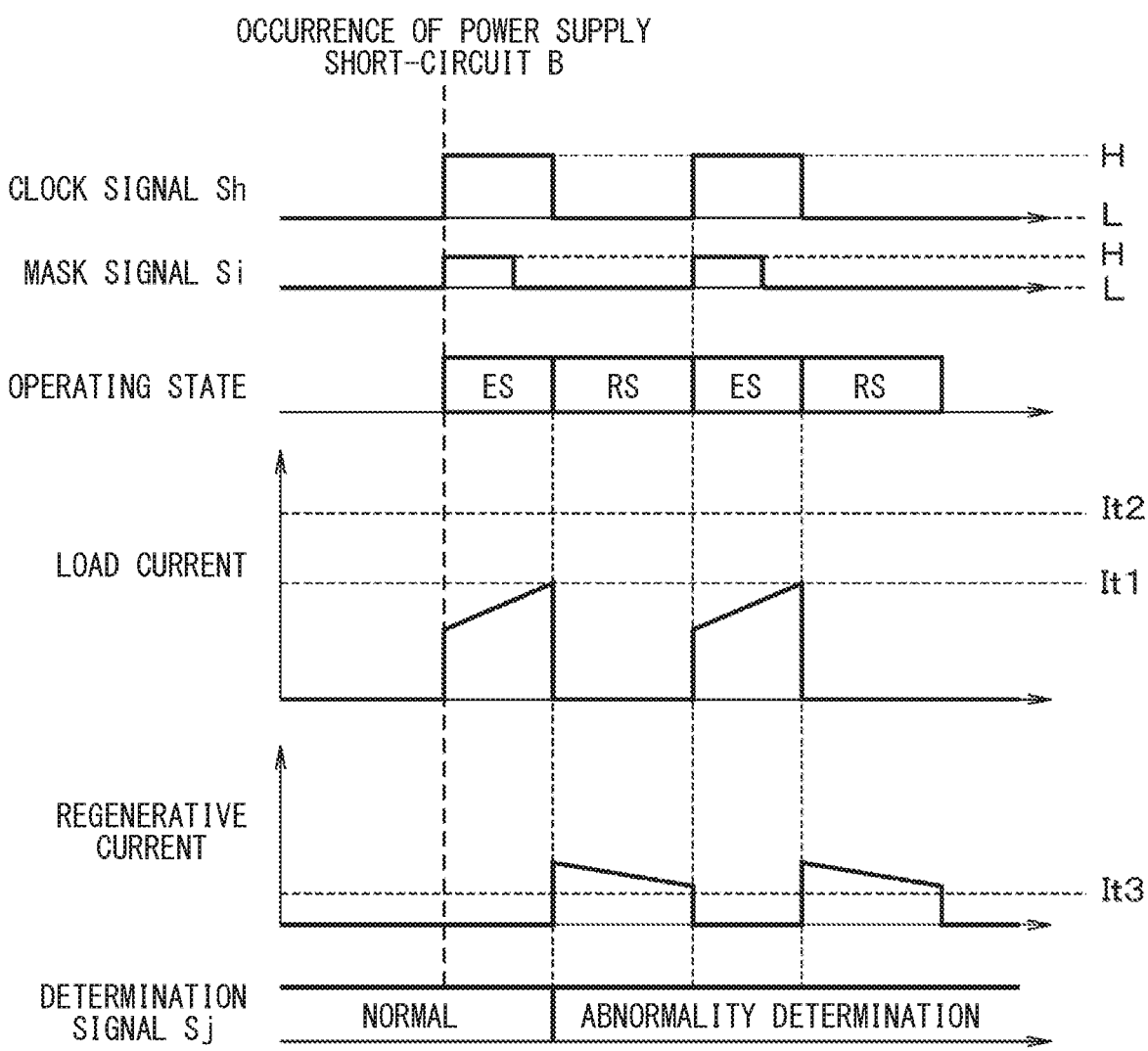
FIG. 14 is a timing chart for explaining an operation timing of each unit when the power supply short-circuit B occurs in the first embodiment.

The operation timing of each unit when the power supply short-circuit B occurs is as shown in FIG. 14. When the power supply short-circuit B occurs, the basic operation is similar to the normal time, but a mode of the regenerative current is different from the normal time. Note that when the power supply short-circuit B occurs, a mode of the load current is substantially similar to the normal time. In this case, when the operation of the H-bridge circuit 5 is controlled so as to switch from the energized state to the regenerative state after the occurrence of the power supply short-circuit, the load current sharply decreases to zero and the regenerative current sharply increases to a predetermined current value.

However, the current value of the regenerative current at this time is lower than the current value of the load current in the immediately preceding energized state. This is because, as shown in FIG. 13, a part of the regenerative current flows into the power supply line L1, and not all the regenerative current flows to the switching element 16 that has the sense cell 16b for detecting the regenerative current.

Therefore, the difference between the load current value and the regenerative current value at the switching from the energized state to the regenerative state becomes equal to or greater than the determination value, and it is determined that a short-circuit abnormality has occurred by the above-described fourth determination method. Therefore, if the power supply short-circuit B occurs, the determination signal Sj output from the control circuit 6 to the microcomputer 3 at the time of switching from the energized state to the regenerative state after the occurrence of the power supply short-circuit indicates that a short-circuit abnormality has occurred.

Operation when Power Supply Short-Circuit C Occurs

Figure 15:
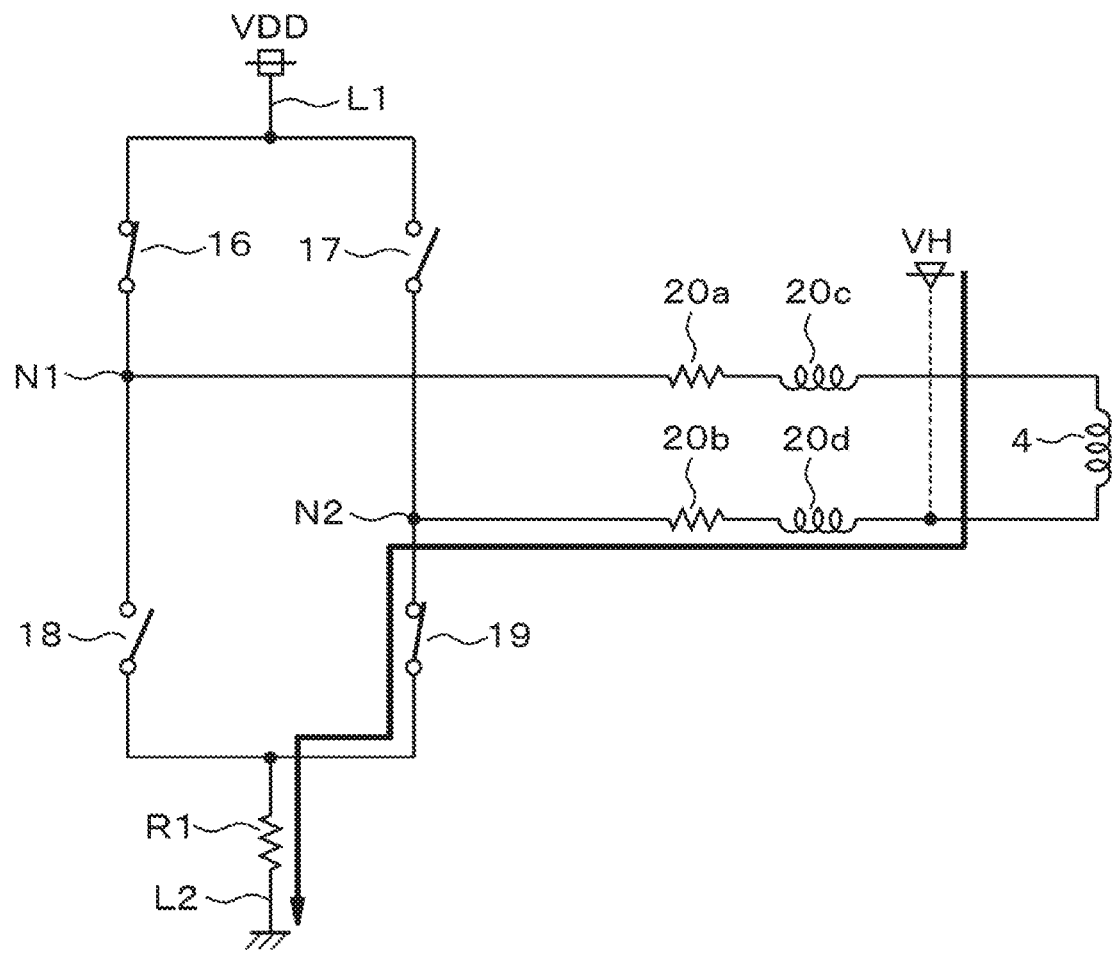
FIG. 15 is a diagram for explaining a path of a current flowing in the energized state when a power supply short-circuit C occurs in the first embodiment.

There may be a case in which a short circuit with the vehicle power supply system occurs at a portion between the load 4 and the wiring inductance 20d due to, for example, damage of the wiring 20. In the present disclosure, such a short-circuit abnormality is referred to as a power supply short-circuit C. When the power supply short-circuit C occurs, each unit operates as follows. As shown in FIG. 15, in the energized state when the power supply short-circuit C occurs, a current flows from the vehicle power supply system through the wiring inductance 20d, the wiring resistance 20b, the node N2, the switching element 19 that is turned on, the resistance R1, and the ground line L2 in a stated order.

Figure 16:
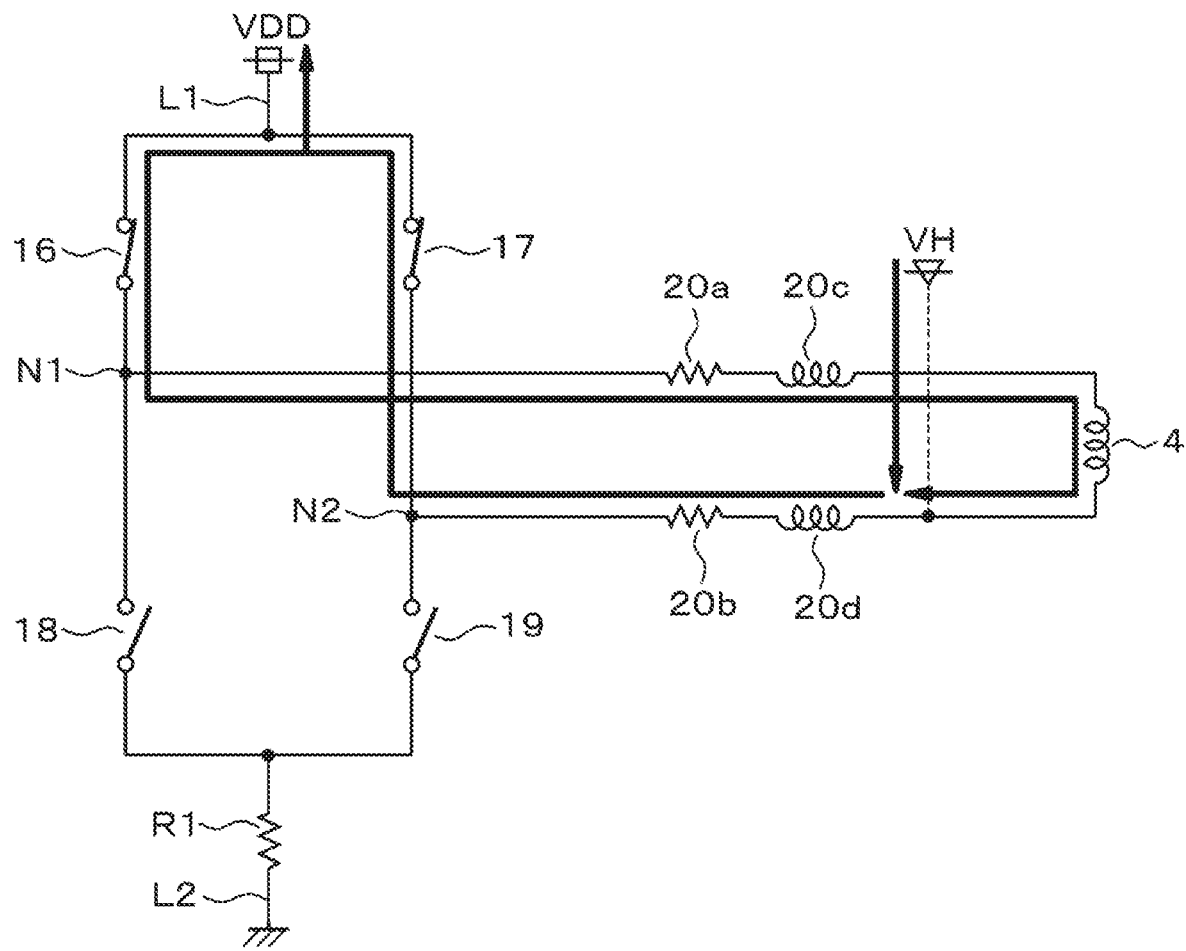
FIG. 16 is a diagram for explaining a path of a current flowing in the regenerative state when the power supply short-circuit C occurs in the first embodiment.

As shown in FIG. 16, in the regenerative state when the power supply short-circuit C occurs, a current flows through the power supply line L1, the switching element 16 that is turned on, the node N1, the wiring resistance 20a, the wiring inductance 20c, the load 4, and the wiring inductance 20d in a stated order, and also flows from the vehicle power supply system through the wiring inductance 20d, the wiring resistance 20b, the node N2, the switching element 17 that is turned on, and the power supply line L1 in a stated order.

Figure 17:
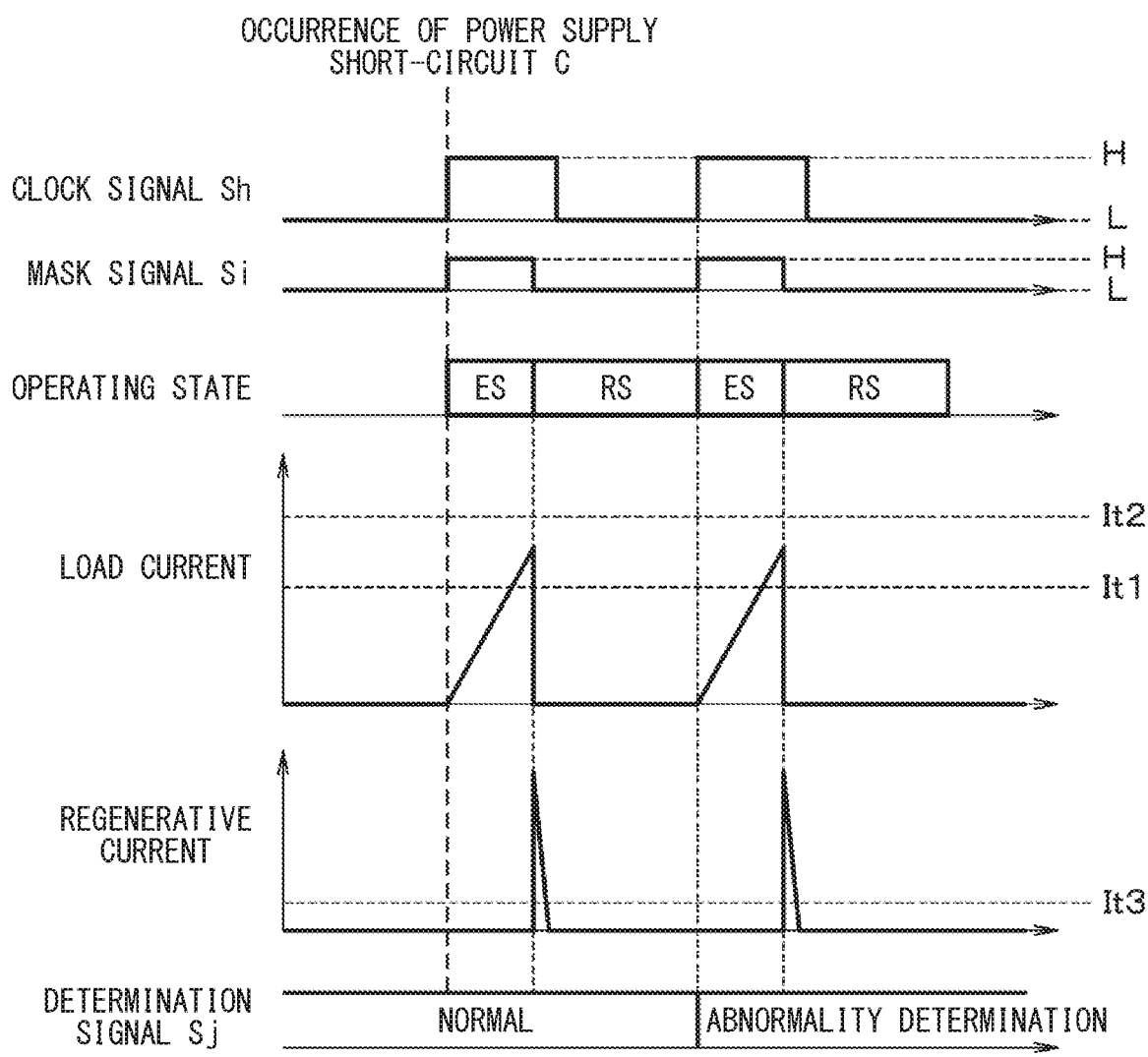
FIG. 17 is a timing chart for explaining an operation timing of each unit when the power supply short-circuit C occurs in the first embodiment.

The operation timing of each unit when the power supply short-circuit C occurs is as shown in FIG. 17. When the power supply short-circuit C occurs, the basic operation is similar to the normal time, but the modes of the load current and the regenerative current are different from the normal time. In this case, when the operation of the H-bridge circuit 5 is controlled so as to switch from the regenerative state to the energized state after the occurrence of the power supply short-circuit, the load current increases at a predetermined gradient from zero. At this time, the load 4 does not intervene in a path through which the load current flows. Thus, the gradient of increase of the load current at the occurrence of the power supply short-circuit C is steeper than at the normal time. However, due to the influence of the wiring inductance 20d and the wiring resistance 20b interposed in the path through which the load current flows, the gradient of increase of the load current is more gentle than when a power supply short-circuit D described below occurs. Therefore, when the power supply short-circuit C occurs, the load current value does not reach the second threshold value It2 within the mask time.

In this case, since the load current value is equal to or greater than the first threshold value It1 at a time point when the mask time has elapsed from the start time of the reference cycle, the operation of the H-bridge circuit 5 is controlled so as to switch from the energized state to the regenerative state. As a result, the load current sharply decreases to zero, and the regenerative current sharply increases to a predetermined current value. The current value of the regenerative current at the time is substantially the same as the current value of the load current in the immediately preceding energized state.

However, in this case, the regenerative current decreases sharply to zero. This is because, in the regenerative state when the power supply short-circuit C occurs, the current flows once through the switching element 16 having the sense cell 16b because the inductance value of the wiring 20 is smaller than the inductance value of the load 4, however, after that, the energy stored in the inductance of the wiring 20 is consumed in a short time, and the current decreases.

Therefore, in the regenerative state when the power supply short-circuit C occurs, the regenerative current value is zero and is less than the third threshold value It3 in most of the period. Therefore, it is determined that a short-circuit abnormality has occurred by the above-described first determination method. Therefore, if the power supply short-circuit C occurs, the determination signal Sj output from the control circuit 6 to the microcomputer 3 at the time of switching from the regenerative state to the energized state after the occurrence of the power supply short-circuit indicates that a short-circuit abnormality has occurred.

Figure 18:
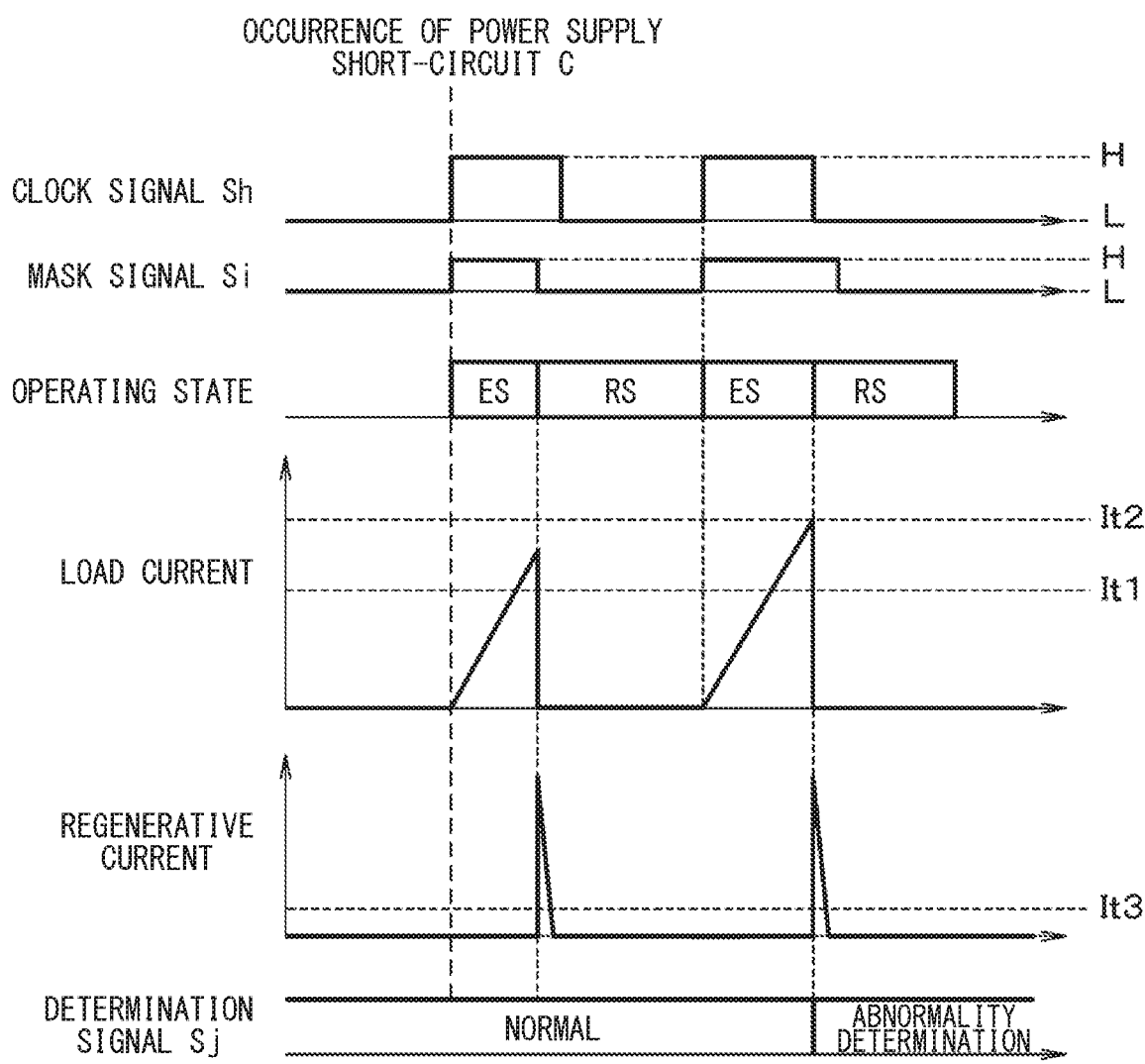
FIG. 18 is another timing chart for explaining the operation timing of each unit when the power supply short-circuit C occurs in the first embodiment.

When the power supply short-circuit C occurs, it is also determined that a short-circuit abnormality has occurred by the above-described second determination method and third determination method. That is, according to the second determination method, when the load current value does not reach the second threshold value It2 within the mask time and the regenerative current value in the regenerative state is less than the third threshold value It3, the mask time starting from the start time of the next reference cycle is extended by the predetermined time. As a result, as shown in FIG. 18, the load current value reaches the second threshold value It2 before the extended mask time elapses from the start time of the next reference cycle, and it is determined that a short-circuit abnormality has occurred.

Figure 19:
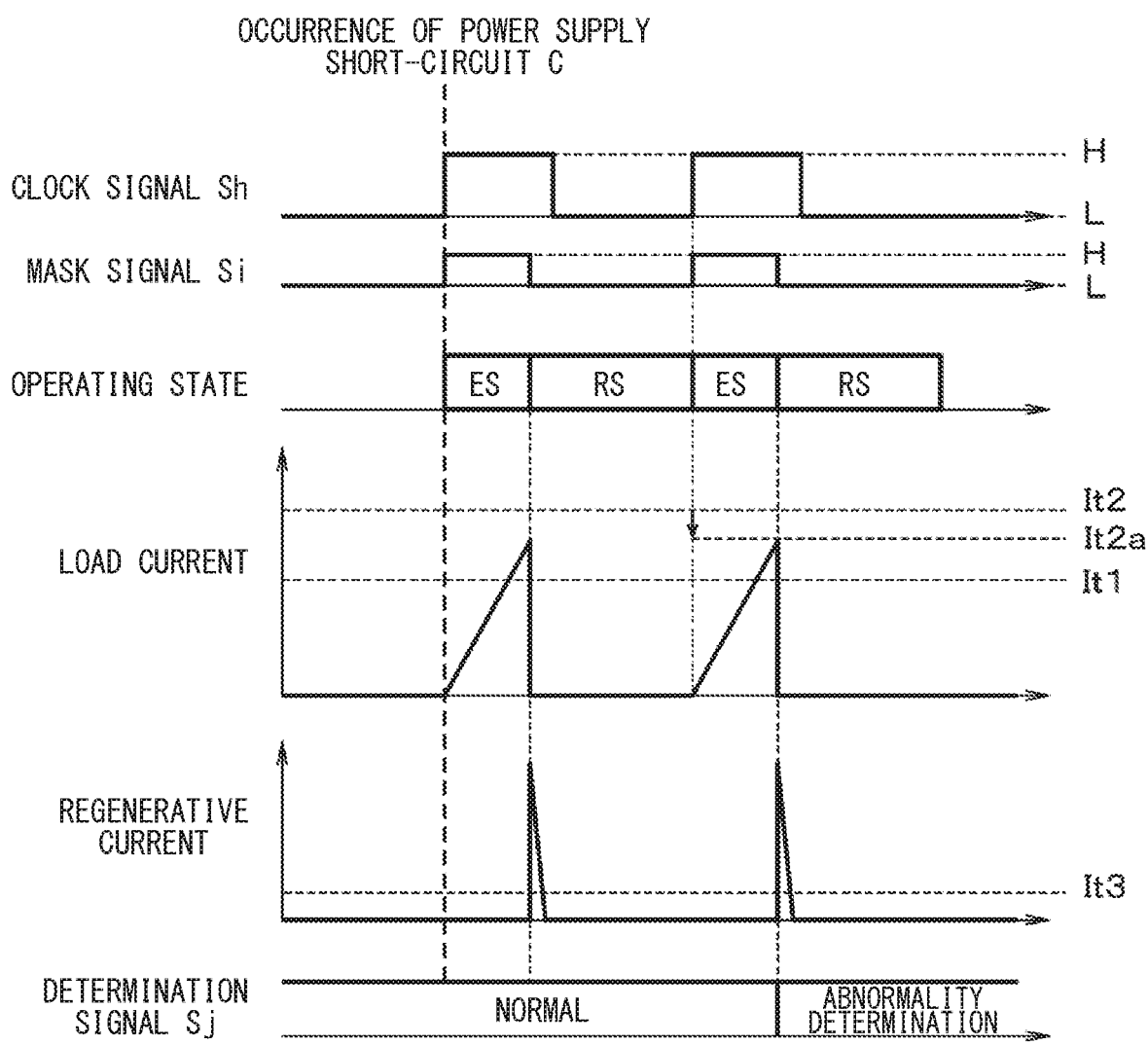
FIG. 19 is another timing chart for explaining the operation timing of each unit when the power supply short-circuit C occurs in the first embodiment.

Further, according to the third determination method, when the load current value does not reach the second threshold value It2 within the mask time, and the regenerative current value in the regenerative state is less than the third threshold value It3, the second threshold value It2 is reduced by the predetermined value from the start time of the next reference cycle. As a result, as shown in FIG. 19, the load current value reaches the reduced second threshold value It2a before the mask time elapses from the start time of the next reference cycle, and it is determined that a short-circuit abnormality has occurred.

Operation when Power Supply Short-Circuit D Occurs

Figure 20:
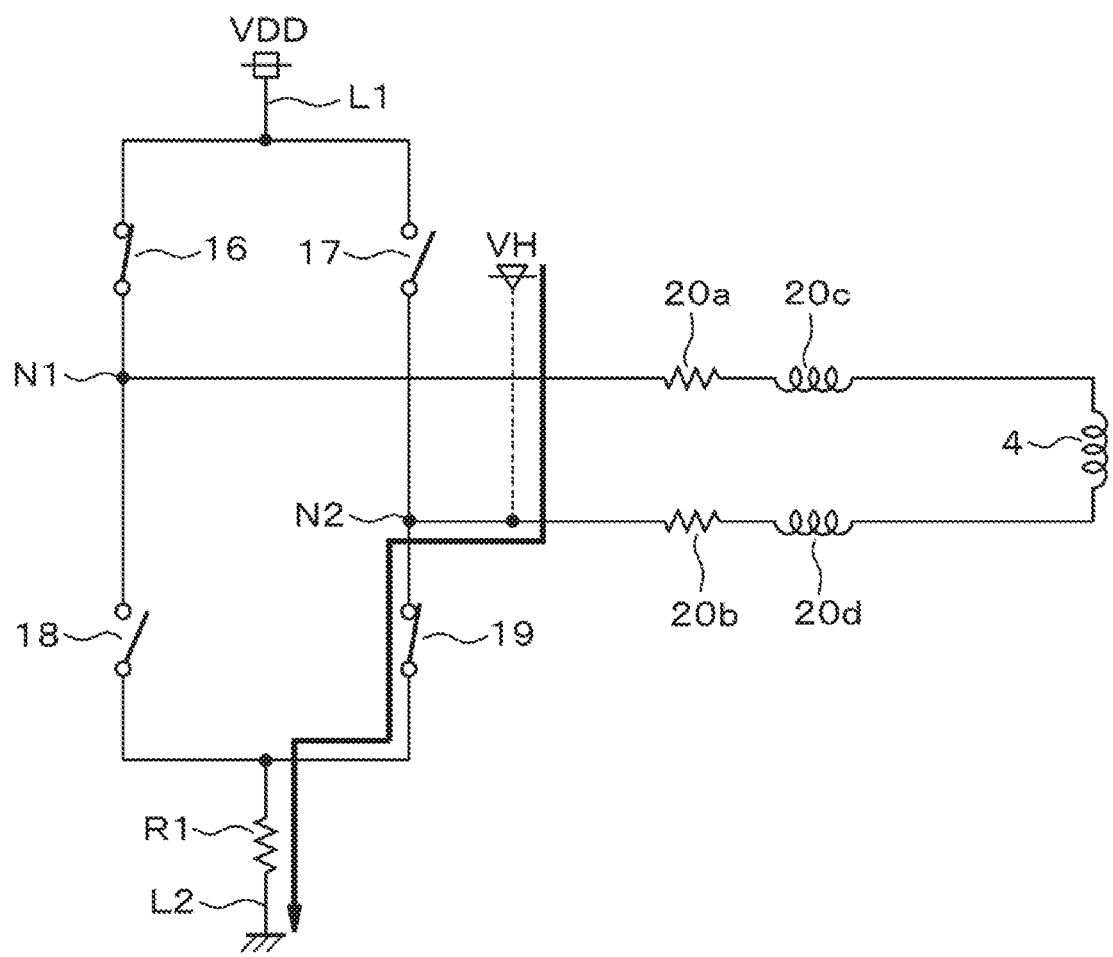
FIG. 20 is a diagram for explaining a path of a current flowing in the energized state when a power supply short-circuit D occurs in the first embodiment.

There may be a case in which a short circuit with the vehicle power supply system occurs at a portion between the wiring resistance 20b and the node N2 due to, for example, damage of the wiring 20. In the present disclosure, such a short-circuit abnormality is referred to as a power supply short-circuit D. When the power supply short-circuit D occurs, each unit operates as follows. As shown in FIG. 20, in the energized state when the power supply short-circuit D occurs, a current flows from the vehicle power supply system through the node N2, the switching element 19 that is turned on, the resistance R1, and the ground line L2 in a stated order.

Figure 21:
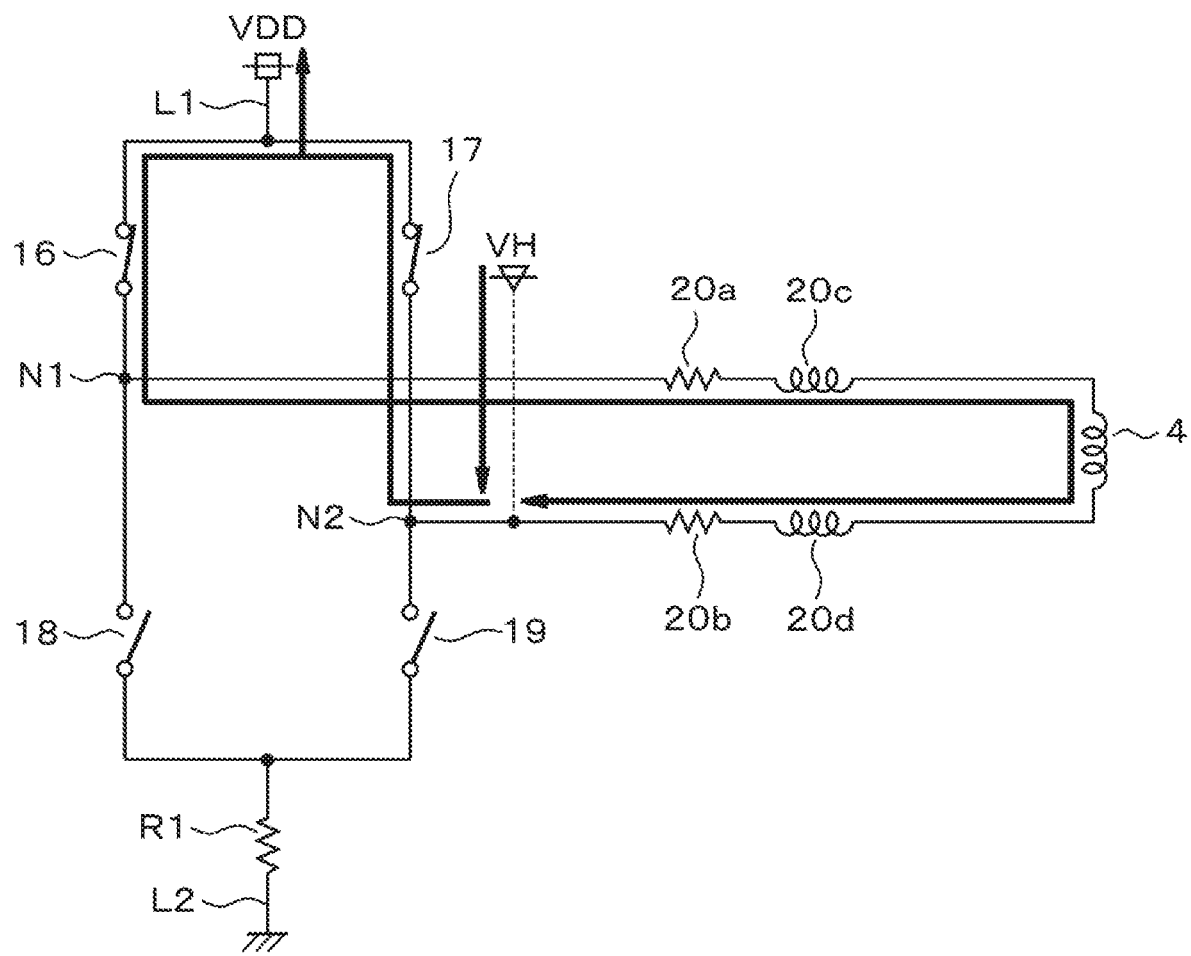
FIG. 21 is a diagram for explaining a path of a current flowing in the regenerative state when the power supply short-circuit D occurs in the first embodiment.

As shown in FIG. 21, in the regenerative state when the power supply short-circuit D occurs, a current flows through the power supply line L1, the switching element 16 that is turned on, the node N1, the wiring resistance 20a, the wiring inductance 20c, the load 4, the wiring inductance 20d, and the wiring resistance 20b in a stated order, and also flows from the vehicle power supply system through the node N2, the switching element 17 that is turned on, and the power supply line L1 in a stated order.

Figure 22:
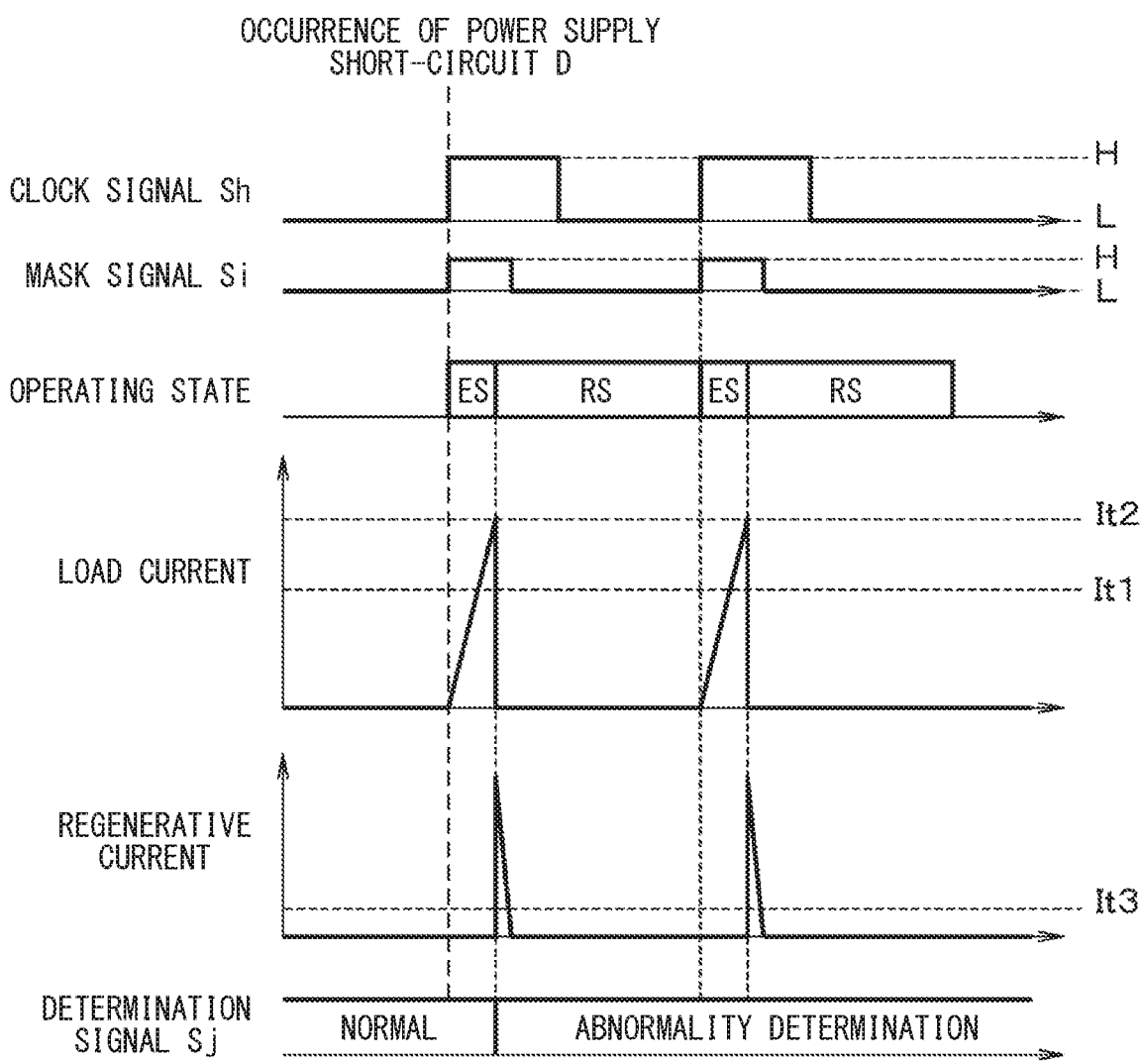
FIG. 22 is a timing chart for explaining an operation timing of each unit when the power supply short-circuit D occurs in the first embodiment.

The operation timing of each unit when the power supply short-circuit D occurs is as shown in FIG. 22. When the power supply short-circuit D occurs, the basic operation is similar to the normal time, but the modes of the load current and the regenerative current are different from the normal time. In this case, when the operation of the H-bridge circuit 5 is controlled so as to switch from the regenerative state to the energized state after the occurrence of the power supply short-circuit, the load current increases at a predetermined gradient from zero. At this time, the resistances, the inductances, and the like of the load 4 and the wiring 20 are not interposed in the path through which the load current flows. Therefore, the gradient of increase of the load current when the power supply short-circuit D occurs is steeper than at the normal time and is steeper than when the power supply short-circuit C occurs.

For this reason, when the power supply short-circuit D occurs, the load current value reaches the second threshold value It2 within the mask time, and it is determined that a short-circuit abnormality has occurred by each of the above-described determination methods. Therefore, when the power supply short-circuit D occurs, the determination signal Sj output from the control circuit 6 to the microcomputer 3 at a predetermined time within the mask time after the occurrence of the power supply short-circuit indicates that a short-circuit abnormality has occurred. Note that the mode of the regenerative current when the power supply short-circuit D occurs is similar to the mode of the regenerative current when the power supply short-circuit C occurs.

Operation when ECU Terminal Short-Circuit Occurs

Figure 23:
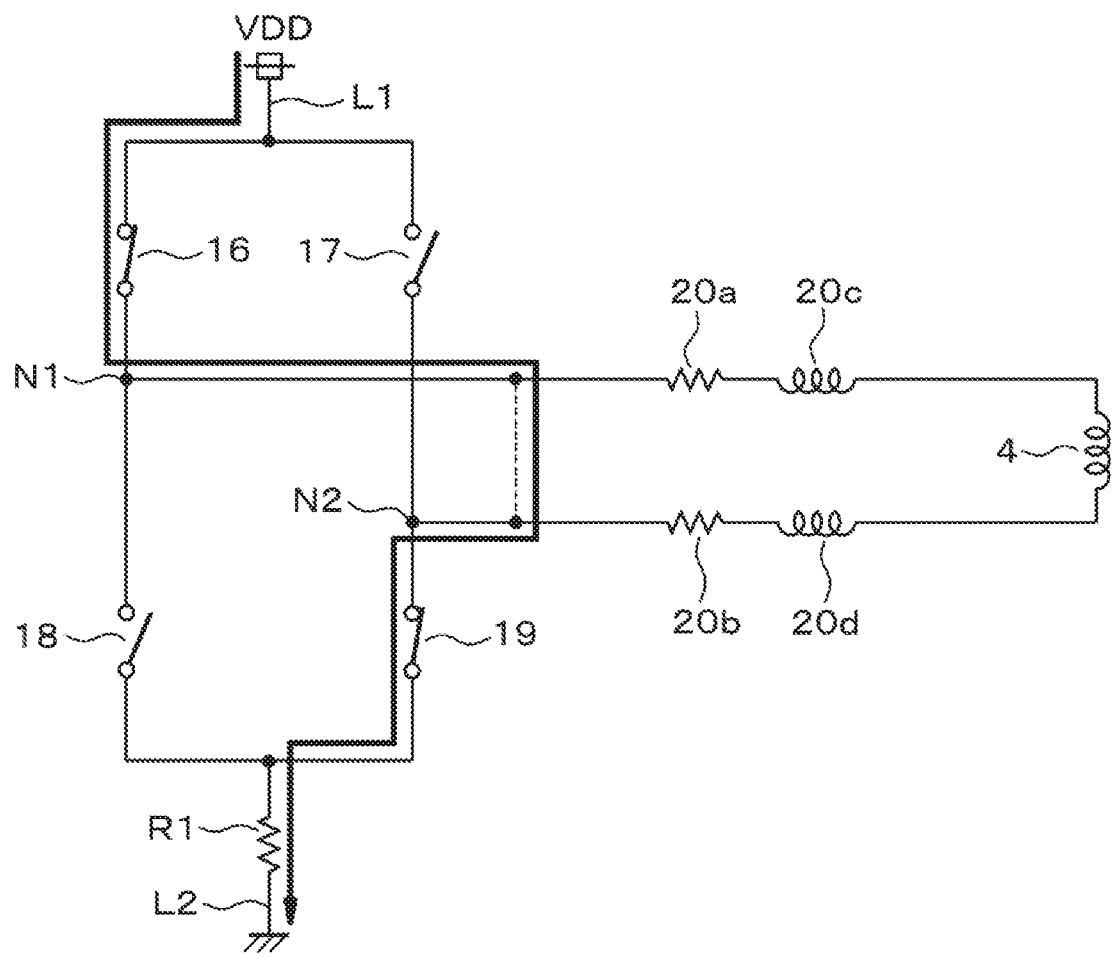
FIG. 23 is a diagram for explaining a path of a current flowing in the energized state when an ECU terminal short-circuit occurs in the first embodiment.

There may be a case in which a short-circuit abnormality occurs between two terminals connected to the nodes N1 and N2 among the terminals of the ECU. In the present disclosure, such a short-circuit abnormality is referred to as an ECU terminal short-circuit. When the ECU terminal short-circuit occurs, the operation of each unit is as follows. As shown in FIG. 23, in the energized state when the ECU terminal short-circuit occurs, a current flows through the power supply line L1, the switching element 16 that is turned on, the node N1, between short-circuited terminals of the ECU, the node N2, the switching element 19 that is turned on, the resistor R1, and the ground line L2 in a stated order.

Figure 24:
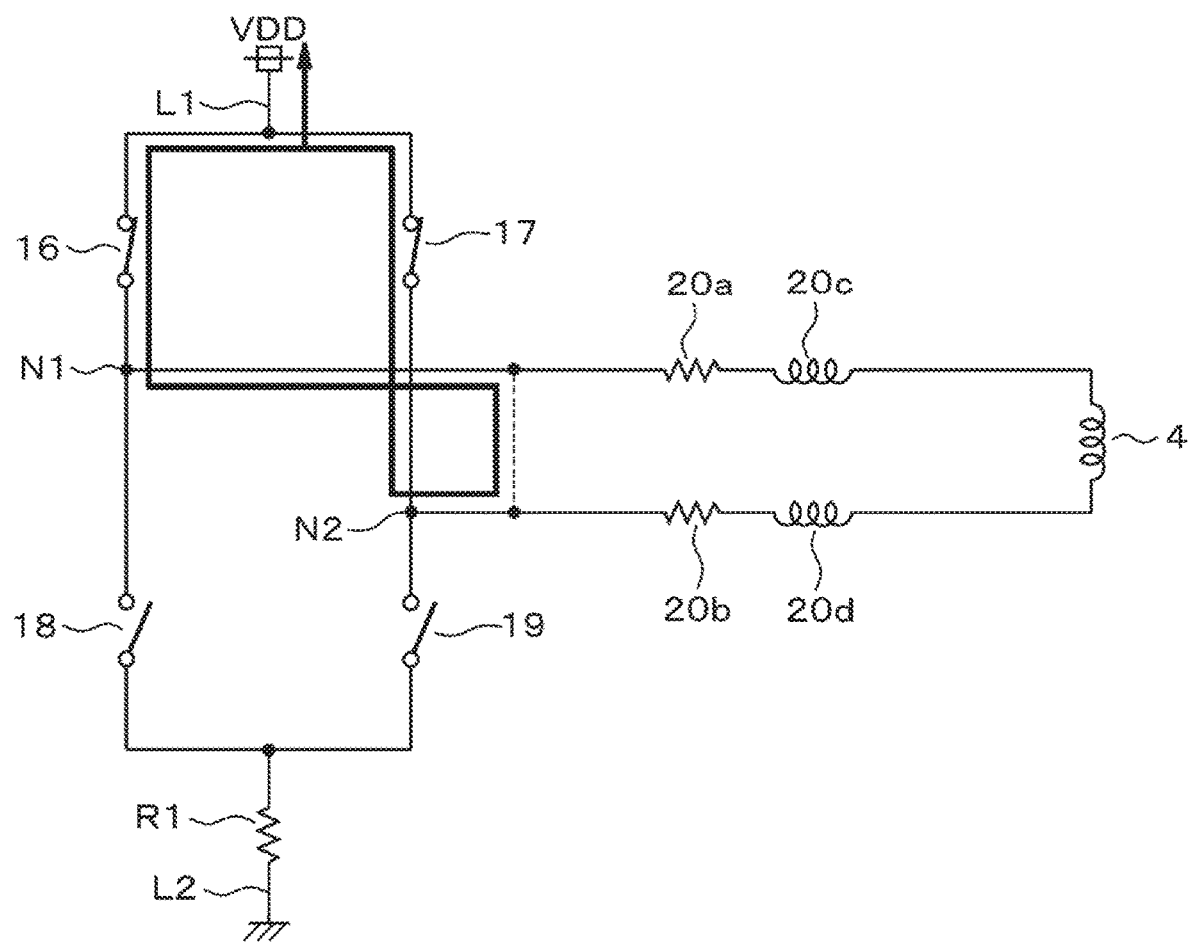
FIG. 24 is a diagram for explaining a path of a current flowing in the regenerative state when the ECU terminal short-circuit occurs in the first embodiment.

As shown in FIG. 24, in the regenerative state when the ECU terminal short-circuit occurs, a current flows through the power supply line L1, the switching element 16 that is turned on, the node N1, between the short-circuited terminals of the ECU, the node N2, the switching element 17 that is turned on, and the power supply line L1 in a stated order. The operation timing of each unit when the ECU terminal short-circuit occurs is similar to the operation timing when the power supply short-circuit D occurs, which is shown in FIG. 22, and the modes of the load current and the regenerative current are also similar to those when the power supply short-circuit D occurs. Therefore, when the ECU terminal short-circuit occurs, the load current value reaches the second threshold value It2 within the mask time, and it is determined that a short-circuit abnormality has occurred by each of the above-described determination methods.

Operation when Load Terminal Short-Circuit Occurs

Figure 25:
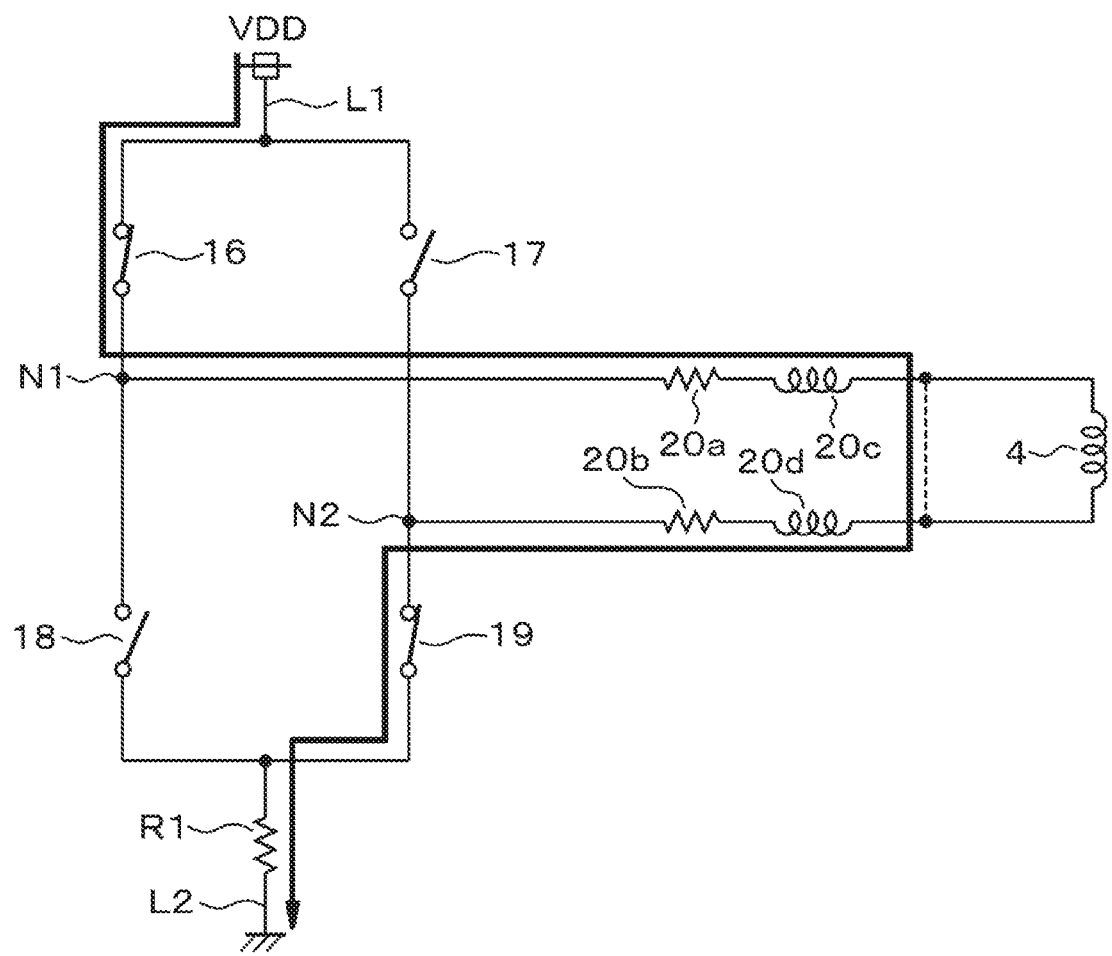
FIG. 25 is a diagram for explaining a path of a current flowing in the energized state when a load terminal short-circuit occurs in the first embodiment.

There may be a case in which two terminals of the load 4 are short circuited. In the present disclosure, such a short-circuit abnormality is referred to as a load terminal short-circuit. When the load terminal short-circuit occurs, the operation of each unit is as follows. As shown in FIG. 25, in the energized state when the load terminal short-circuit occurs, a current flows through the power supply line L1, the switching element 16 that is turned on, the node N1, the wiring resistance 20a, the wiring inductance 20c, between the short-circuited terminals of the load 4, the wiring inductance 20d, the wiring resistance 20b, the node N2, the switching element 19 that is turned on, the resistor R1, and the ground line L2 in a stated order.

Figure 26:
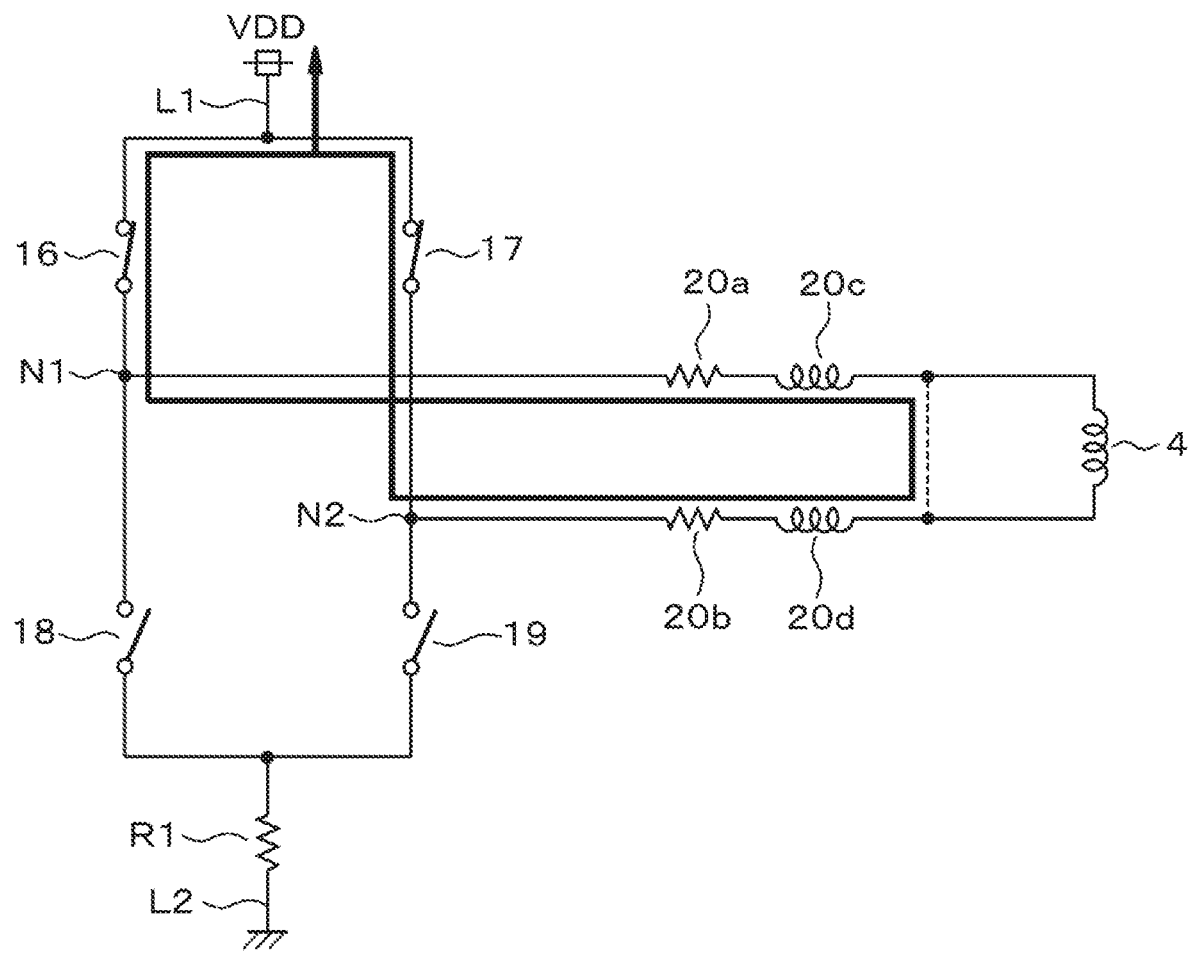
FIG. 26 is a diagram for explaining a path of a current flowing in the regenerative state when the load terminal short-circuit occurs in the first embodiment.

As shown in FIG. 26, in the regenerative state when the load terminal short-circuit occurs, a current flows through the power supply line L1, the switching element 16 that is turned on, the node N1, the wiring resistance 20a, the wiring inductance 20c, between the short-circuited terminals of the load 4, the wiring inductance 20d, the wiring resistance 20b, the node N2, the switching element 17 that is turned on, and the power supply line L1 in a stated order. The operation timing of each unit when the load terminal short-circuit is similar to operation timing when the power supply short-circuit C occurs, which is shown in FIG. 21, and the modes of the load current and the regenerative current are also similar to those when the power supply short-circuit C occurs, Therefore, in the regenerative state when the load terminal short-circuit occurs, the regenerative current value is zero and is less than the third threshold value It3 in most of the period. Therefore, when the load terminal short-circuit occurs, it is determined that a short-circuit abnormality has occurred by the above-described first to third determination methods.

According to the present embodiment described above, the following effects can be obtained. When the load current value becomes equal to or greater than the first threshold value It1 after the mask time has elapsed from the start of the reference cycle, the energization controller 21 of the present embodiment switches the H-bridge circuit 5 from the energized state to the regenerative state. Then, the short-circuit determination processor 22 determines whether a short-circuit abnormality has occurred based on whether the load current value is equal to or greater than the second threshold value It2 that is set to a value greater than the first threshold value It1. Further, when the load current value does not reach the second threshold value It2 within the mask time, the short-circuit determination processor 22 determines whether a short-circuit abnormality has occurred based on the regenerative current value in the regenerative state.

When the wiring 20 in the above configuration is short-circuited to the vehicle power supply system or the like, the current path when the short circuit occurs varies depending on the short-circuited location. Therefore, when a short-circuit abnormality occurs, the resistance value, the inductance value, and the like of the path may have various values, and the current flowing through the path may have various modes. The short-circuit determination processor 22 is configured to determine a short-circuit abnormality based on not only the load current value but also the regenerative current value. Therefore, when a short-circuit abnormality occurs, regardless of the mode of current flowing through the path, the occurrence of the short-circuit abnormality can be detected. Therefore, according to the present embodiment, a short-circuit abnormality of the wiring 20 from the ECU to the load 4 can be accurately detected.

In a configuration in which a short-circuit abnormality is determined based only on whether the load current value is equal to or greater than the second threshold value It2, the occurrences of the power supply short-circuit A, the power supply short-circuit B, the power supply short-circuit C cannot be detected although the occurrence of the power supply short-circuit D can be detected. Hereinafter, such a configuration is referred to as a first comparative example. As described above, when the power supply short-circuit A or the power supply short-circuit B occurs, the mode of the load current is substantially similar to the mode at the normal time. Therefore, when the power supply short-circuit A or the power supply short-circuit B occurs, the load current value does not exceed the second threshold value It2 within the mask time. Therefore, in the first comparative example, the occurrences of the power supply short-circuit A and the power supply short-circuit B cannot be detected.

Further, as described above, when the power supply short-circuit C occurs, the gradient of increase of the load current is steeper than the gradient at the normal time, but is more gentle than the gradient of increase of the load current when the power supply short-circuit D occurs. Therefore, when the power supply short-circuit C occurs, the load current value does not exceed the second threshold value It2 within the mask time. Therefore, in the first comparative example, the occurrence of the power supply short-circuit C cannot be detected. On the other hand, according to the present embodiment, the occurrence of any of the power supply short-circuits A, B, C, and can be detected.

As shown in FIG. 8 and the like, the mask time in the present embodiment is set to a time shorter than the time required for the load current value to reach the first threshold value It1 at the normal time when no short-circuit abnormality has occurred. Such setting can be possible by performing a simulation, an experiment, or the like in advance. Hereinafter, effects obtained by setting the mask time based on the above-described concept will be described.

Figure 27:
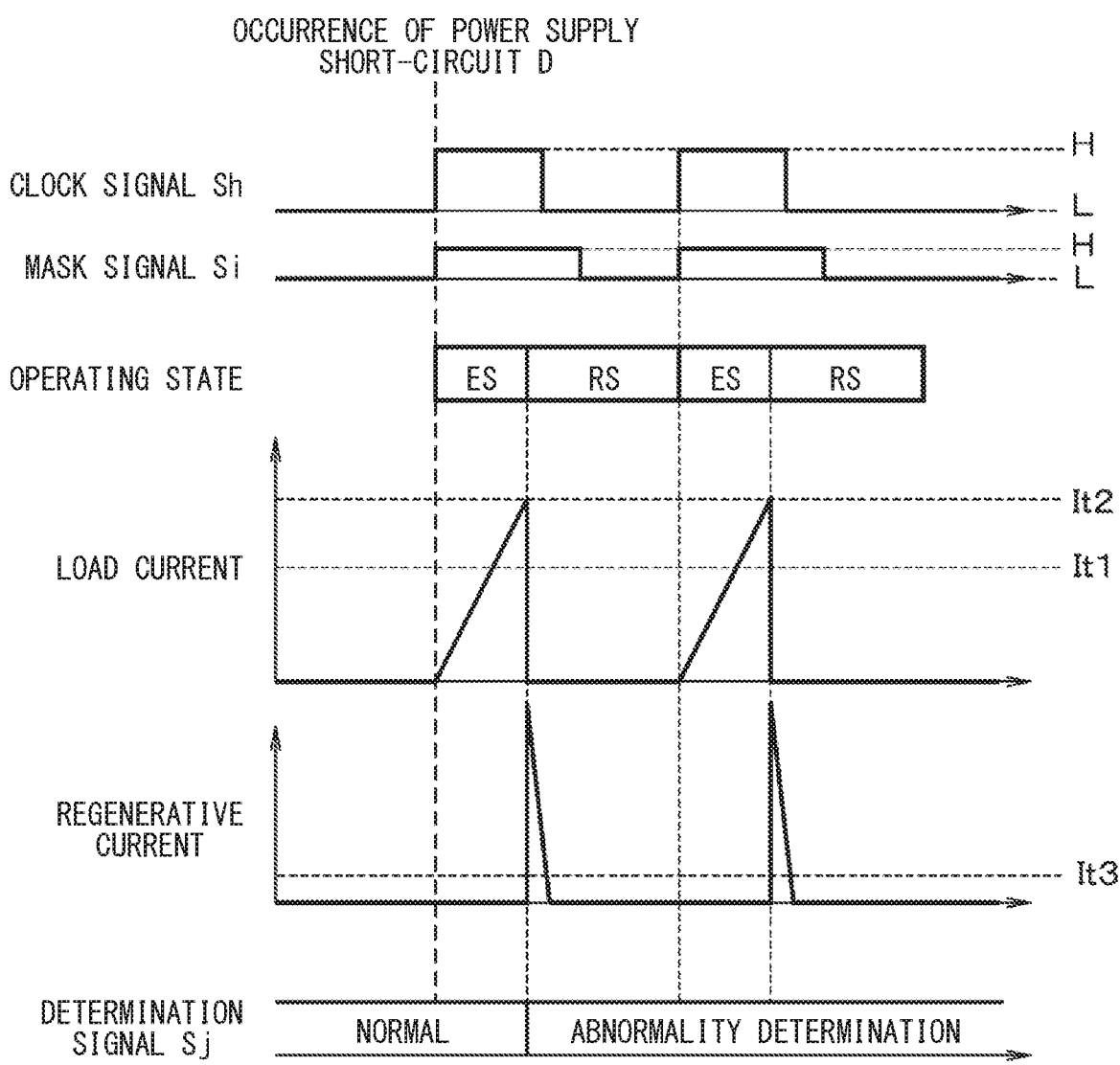
FIG. 27 is a timing chart for explaining an operation timing of each unit when the power supply short-circuit D occurs in the second comparative example.
Figure 28:
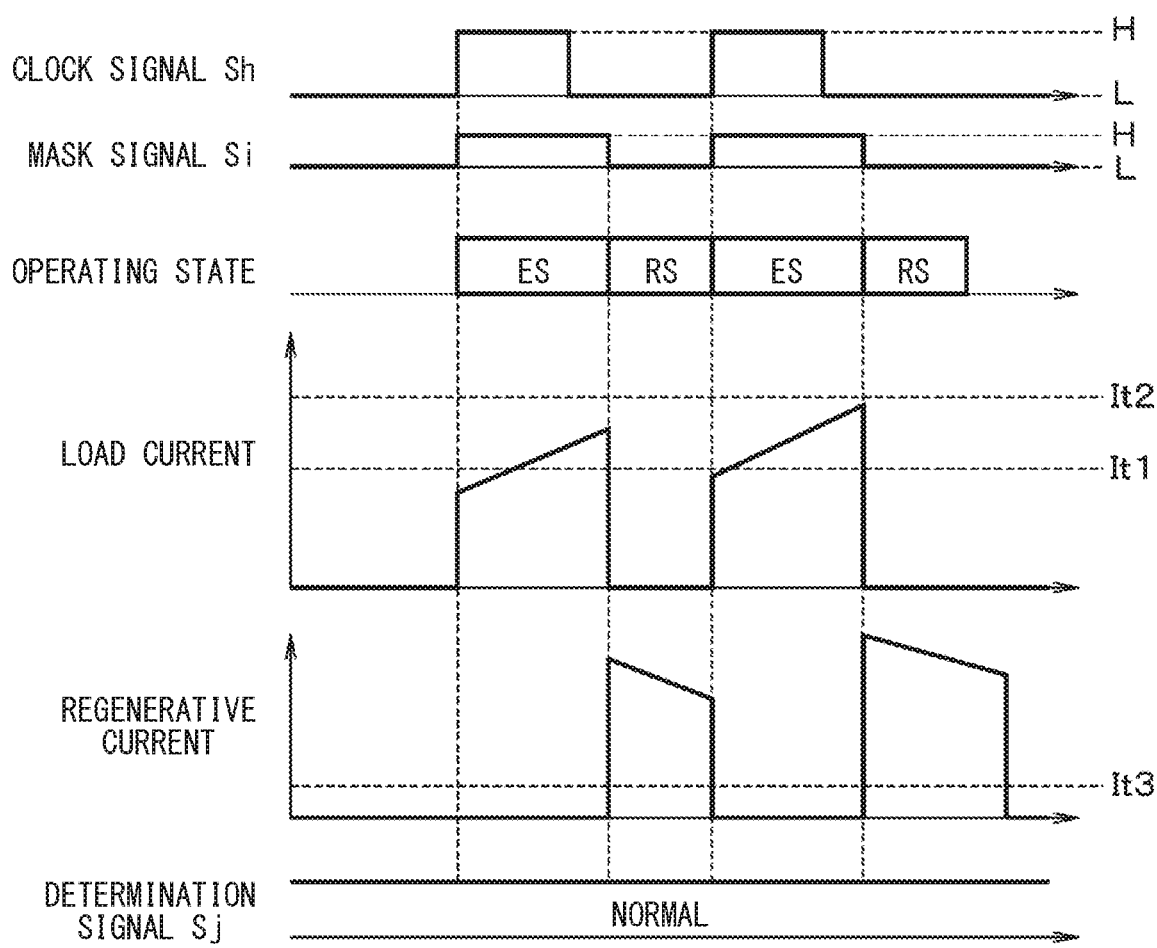
FIG. 28 is a timing chart for explaining an operation timing of each unit at the normal time according to the second comparative example.

As shown in FIG. 27 and FIG. 28, when the mask time is set to be longer than the time required for the load current value to reach the first threshold value It1 at the normal time, there may be the following issue. Hereinafter, a case in which the mask time is set in this manner is referred to as a second comparative example. As shown in FIG. 27, also in the second comparative example, an occurrence of the power supply short-circuit D can be detected in a manner similar to the present embodiment because the load current value reaches the second threshold value It2 within the mask time.

However, in the second comparative example, at the normal time, the maximum value of the load current may increase every time the reference cycle elapses as shown in FIG. 28. Therefore, in the second comparative example, the load current cannot be controlled to a desired value, and the accuracy of the current feedback control may be reduced. On the other hand, according to the present embodiment, it is possible to detect the occurrence of the power supply short-circuit D and to control the load current to a desired value with high accuracy at the normal time, that is, to maintain the accuracy of the current feedback control satisfactorily.

Among the above-described short-circuit abnormalities, even when the power supply short-circuit A or the power supply short-circuit B occurs, the energization to the load 4 can be performed in a manner similar to the normal time. However, when the power supply short-circuit C or the power supply short-circuit D occurs, not only the energization to the load 4 cannot be performed in a manner similar to the normal time, but also an overcurrent may flow to the inductive load control device 1. That is, it can be said that the power supply short-circuit C and the power supply short-circuit D are short-circuit abnormalities that are more important than the power supply short-circuit A and the power supply short-circuit B. The short-circuit determination processor 22 of the present embodiment can also detect the occurrence of the power supply short-circuit C and the power supply short-circuit D, which are short-circuit abnormalities with high importance, by at least one of the first to third determination methods.

Second Embodiment

Hereinafter, a second embodiment will be described with reference to FIG. 29 to FIG. 31. In the present embodiment, a fifth determination method in which the first determination method described in the first embodiment is changed will be described. In the fifth determination method, when determining that a short-circuit abnormality has occurred, the short-circuit determination processor 22 shortens the mask time by a predetermined time. Further, in this case, when the short-circuit determination processor 22 determines that a short-circuit abnormality has occurred, the energization controller 21 interrupts the energization to the load 4 and re-energizes the load 4 after the elapse of a predetermined time.

Figure 29:
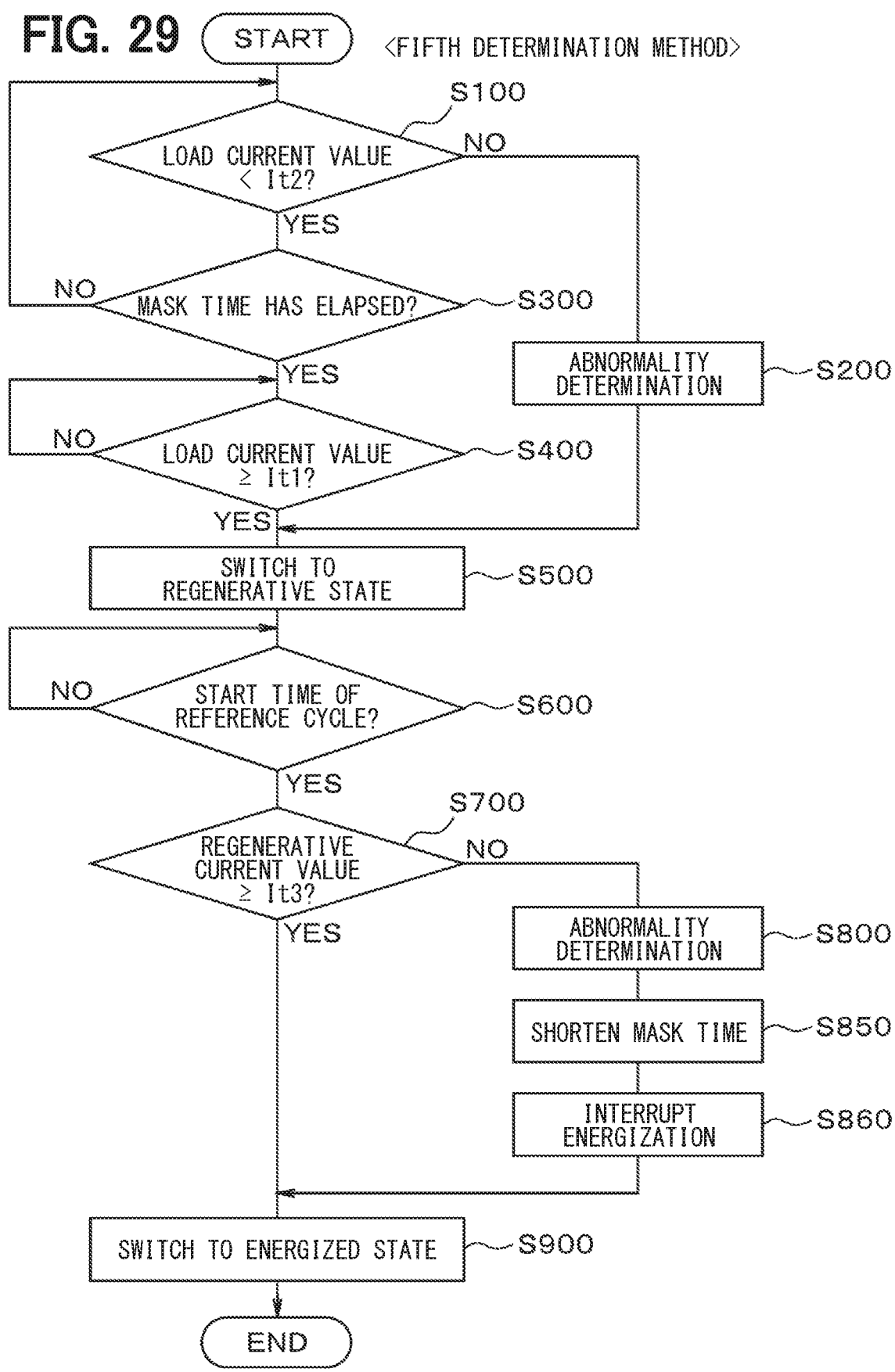
FIG. 29 is a diagram showing an example of a specific processing procedure of a fifth determination method according to a second embodiment.

As a specific processing procedure for realizing the fifth determination method, for example, the contents shown in FIG. 29 can be adopted. The specific processing procedure of the fifth determination method shown in FIG. 29 is different from the specific processing procedure of the first determination method shown in FIG. 2 in that S850 and S860 are added. In this case, after execution of S800, the process proceeds to S850.

In S850, the mask time is shortened by the predetermined time. After execution of S850, the process proceeds to S860. In S860, the energization to the load 4 is interrupted. After a predetermined time has elapsed after execution of S860, the process proceeds to S900. In S900, the operation of the H-bridge circuit 5 is controlled so as to switch to the energized state.

Subsequently, a specific operation according to the second embodiment that implements the fifth determination method will be described with an example of an operation when the power supply short-circuit C occurs. As shown in FIG. 30 and FIG. 31, also in the present embodiment, similarly to the first embodiment, at a time point of switching from the regenerative state to the energized state after the occurrence of the power supply short-circuit C, the determination signal Sj output from the control circuit 6 to the microcomputer 3 is a signal indicating that a short-circuit abnormality has occurred.

Figure 30:
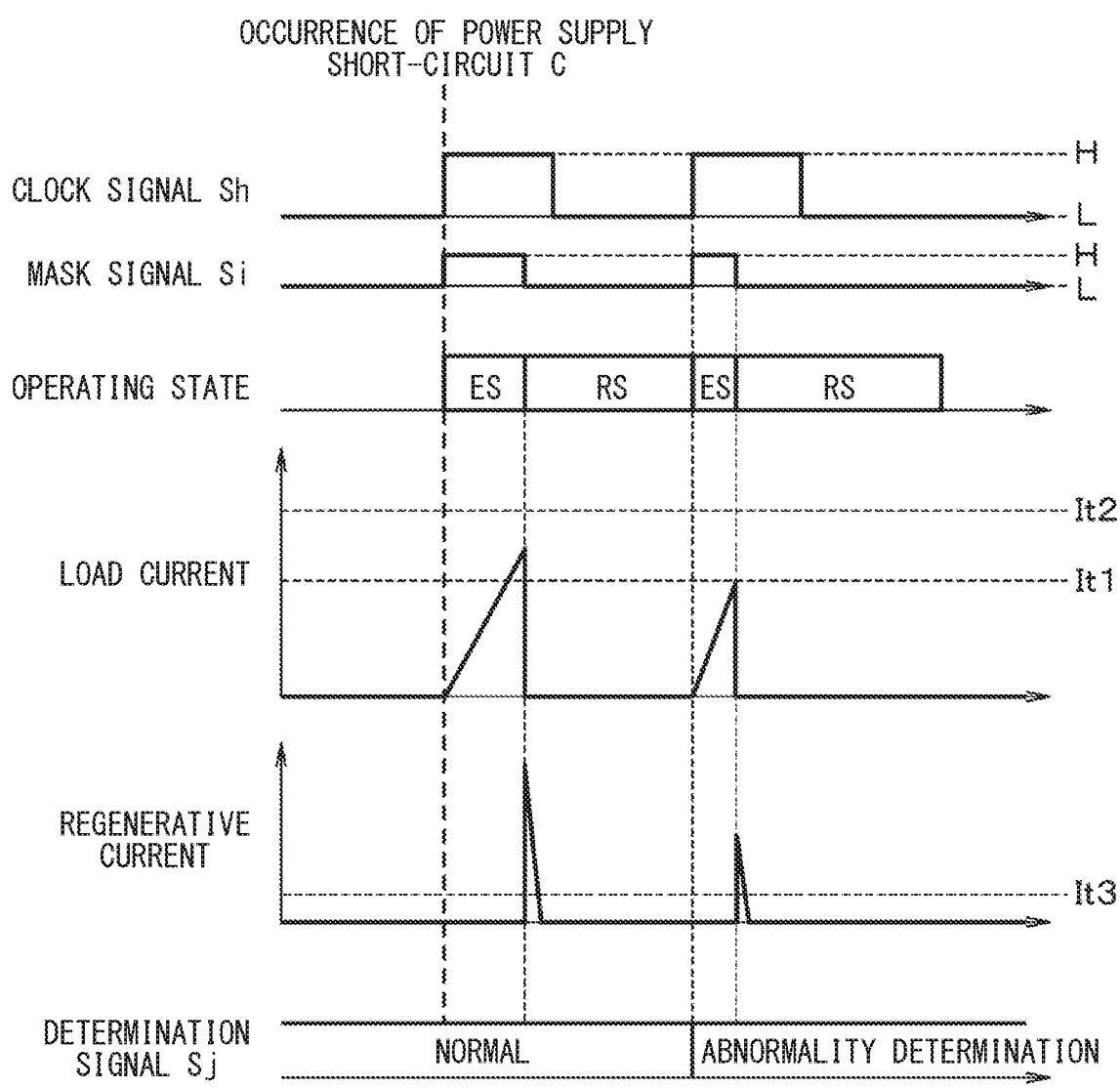
FIG. 30 is a timing chart for explaining an operation timing of each unit when the power supply short-circuit C occurs in the second embodiment.
Figure 31:
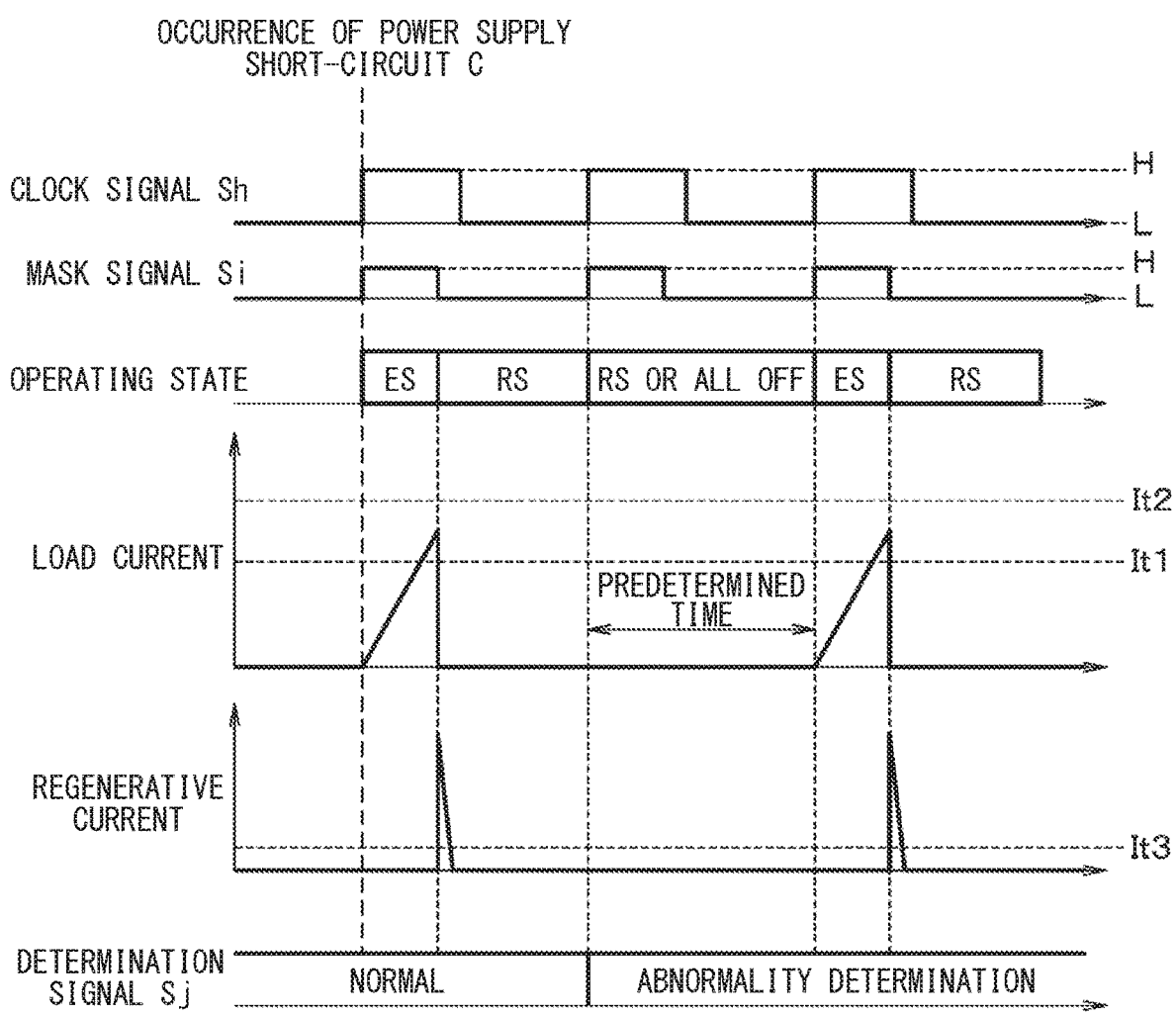
FIG. 31 is another timing chart for explaining the operation timing of each unit when the power supply short-circuit C occurs in the second embodiment.

In this case, as shown in FIG. 30, the mask time starting from the start point of the next reference cycle is shortened by the predetermined time. Furthermore, as shown in FIG. 31, the energization to the load 4 is interrupted during a period from the start of the next reference cycle until the predetermined time elapses. The interruption of the energization to the load 4 is performed by switching to a regenerative state, or by turning off all the switching elements 16 to 19, for example. After the elapse of the predetermined time, specifically, at the start of the next reference cycle, the energization of the load 4 is performed again.

According to the present embodiment described above, the following effects can be obtained. In the present embodiment, when determining that a short-circuit abnormality has occurred, the short-circuit determination processor 22 shortens the mask time by the predetermined time. This makes it possible to reduce a time from when the regenerative state is switched to the energized state to when the energized state is switched to the regenerative state, that is, a time during which the energization to the load 4, after a short-circuit abnormality such as the power supply short-circuit C is detected. Therefore, according to the present embodiment, it is possible to protect the circuit after an occurrence of a short-circuit abnormality.

Further, in the present embodiment, when the short-circuit determination processor 22 determines that a short-circuit abnormality has occurred, the energization controller 21 interrupts the energization to the load 4 and re-energizes the load 4 after the elapse of the predetermined time. This makes it possible to reduce the time during which the energization to the load 4 is performed after a short-circuit abnormality such as the power supply short-circuit C is detected. Therefore, according to the present embodiment, it is possible to protect the circuit after an occurrence of a short-circuit abnormality.

Third Embodiment

Figure 32:
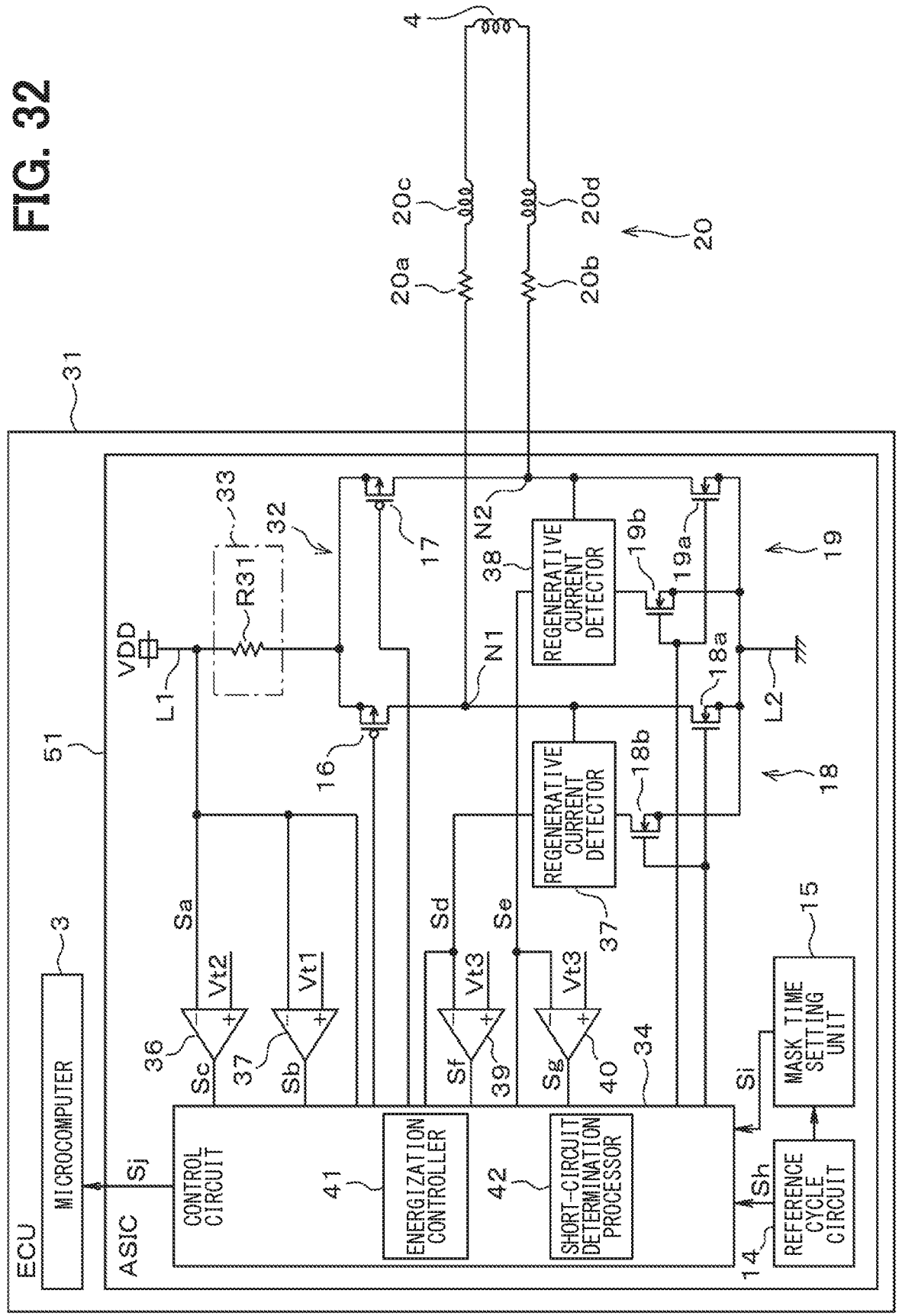
FIG. 32 is a diagram schematically showing a configuration of an inductive load control device according to a third embodiment.

Hereinafter, a third embodiment will be described with reference to FIG. 32 to FIG. 44. As shown in FIG. 32, an inductive load control device 31 of the present embodiment is configured as an ECU similarly to the inductive load control device 1 of the first embodiment, and includes an ASIC 51 and the microcomputer 3. The ASIC 51 has a basic configuration similar to the ASIC 2 but is different in that the load current is detected on the high side, the two low-side switching elements are turned on in the regenerative state, and the regenerative current is detected on the low side, for example.

An H-bridge circuit 32 includes four switching elements 16 to 19, similarly to the H-bridge circuit 5. However, in this case, the switching elements 18 and 19 are provided with sense cells instead of the switching elements 16 and 17. That is, the switching element 18 includes a main cell 18a and a sense cell 18b. The switching element 19 includes a main cell 19a and a sense cell 19b.

Sources of the main cells 18a and 19a are commonly connected and connected to the ground line L2. Drains of the main cells 18a and 19a are connected to the nodes N1 and N2, respectively. A source of the sense cell 18b is commonly connected to the source of the main cell 18a, and a gate of the sense cell 18b is commonly connected to a gate of the main cell 18a. A source of the sense cell 19b is commonly connected to a source of the main cell 19a, and a gate of the sense cell 19b is commonly connected to a gate of the main cell 19a.

In this case, sources of the switching elements 16 and 17 are commonly connected and connected to the power supply line L1 via a load current detector 33. The H-bridge circuit 32 is controlled so as to be in one of a regenerative state and an energized state, similarly to the H-bridge circuit 5. However, in the regenerative state, both the switching elements 16 and 17 on the high side are turned off, and both the switching elements 18 and 19 on the low side are turned on, so that a regenerative current flows through a path formed thereby.

The load current detector 33 detects a load current that is a current flowing through a switching element that is turned on when the switching element 16 to 19 of the H-bridge circuit 32 is in the energized state, similarly to the load current detector 7. The load current detector 33 includes a resistor R31 provided in series with the path through which the load current flows. A detection signal Sa output from the load current detector 33 is applied to a control circuit 34 and is input to each inverting input terminal of comparators 35 and 36.

A non-inverting input terminal of the comparator 35 is applied with a first threshold voltage Vt1. A non-inverting input terminal of the comparator 36 is applied with a second threshold voltage Vt2. In this case, the first threshold voltage Vt1 and the second threshold voltage Vt2 are voltages generated based on a potential of a low potential terminal of the resistor R31. Output signals Sb and Sc of the comparators 35 and 36 are applied to the control circuit 34.

Regenerative current detectors 37 and 38 detect the regenerative current similarly to the regenerative current detectors 8 and 9. The drains of the main cell 18a and the sense cell 18b are connected to an input terminal of the regenerative current detector 37. The drains of the main cell 19a and the sense cell 19b are connected to an input terminal of the regenerative current detector 38. Although not shown, the regenerative current detectors 37 and 38 are configured by resistors provided so as to be interposed in series in paths of currents flowing through the sense cells 18b and 19b, respectively and convert the currents into voltage signals.

A detection signal Sd output from the regenerative current detector 37 is applied to the control circuit 34 and is input to an inverting input terminal of a comparator 39. A detection signal Se output from the regenerative current detector 38 is applied to the control circuit 34 and is input to an inverting input terminal of a comparator 40. Each non-inverting input terminal of the comparators 12, 13 is applied with a third threshold voltage Vt3. In this case, the third threshold voltage Vt3 is a voltage generated based on the potentials of the drains of the sense cells 18b and 19b. Output signals Sf and Sg of the comparators 39 and 40 are applied to the control circuit 34.

The control circuit 34 is configured as a logic circuit, and includes an energization controller 41 and a short-circuit determination processor 42 as functional blocks, similarly to the control circuit 6. The energization controller 41 controls the operation of the H-bridge circuit 32, similarly to the energization controller 21. The short-circuit determination processor 42 determines whether a short-circuit abnormality has occurred in the wiring 20 from the H-bridge circuit 32 to the load 4 based on the load current value and the regenerative current value, similarly to the short-circuit determination processor 22.

Next, the operation of the above configuration at an occurrence of a short-circuit abnormality will be described with reference to FIG. 33 to FIG. 44. Note that since the operation of the above configuration at the normal time is substantially similar to the operation of the configuration of the first embodiment and the like at the normal time, a description thereof will be omitted.

Operation when Ground Short-Circuit A Occurs

Figure 33:
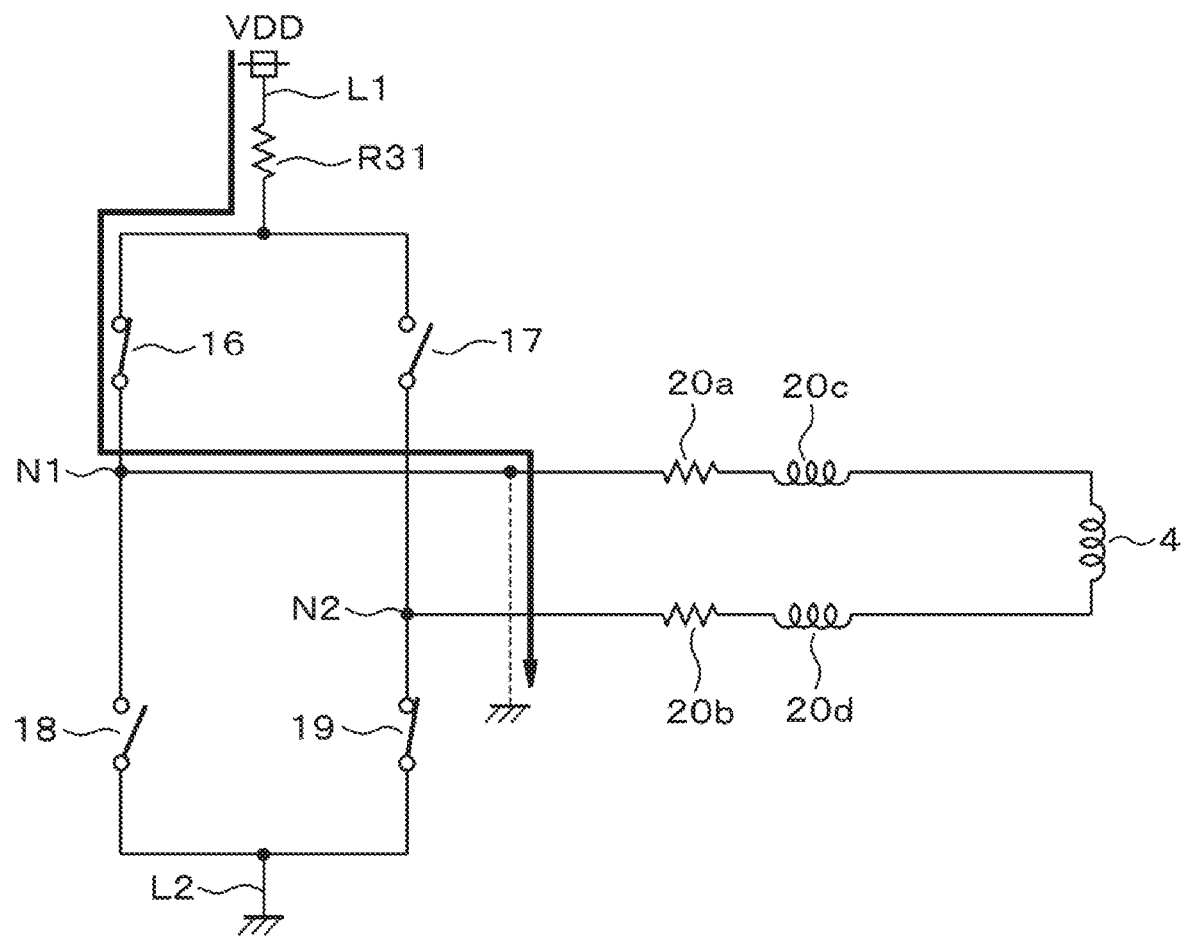
FIG. 33 is a diagram for explaining a path of a current flowing in the energized state when a ground short-circuit A occurs in the third embodiment.
Figure 34:
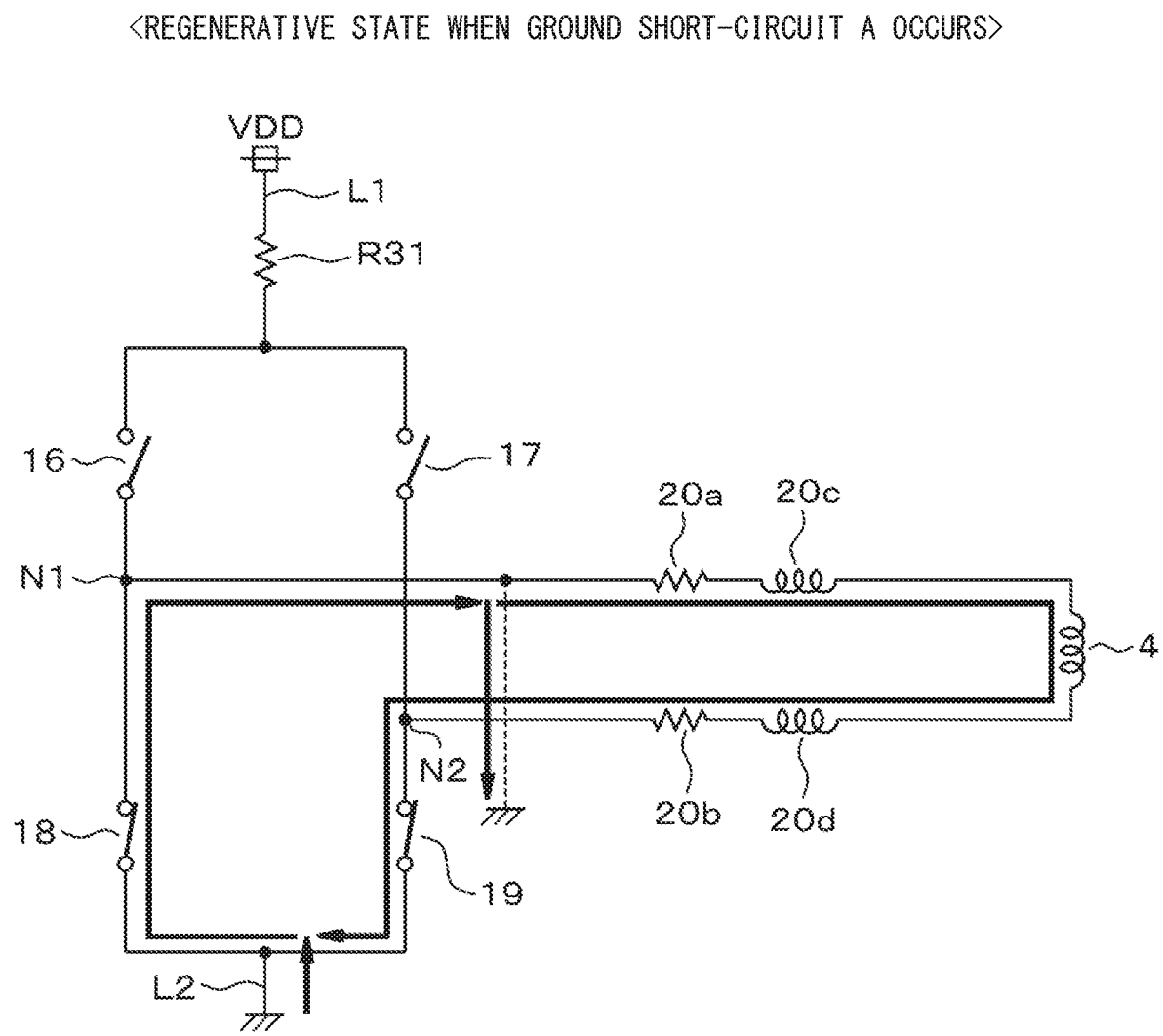
FIG. 34 is a diagram for explaining a path of a current flowing in the regenerative state when the ground short-circuit A occurs in the third embodiment.

There may be a case in which a short circuit with a vehicle ground occurs at a portion between the node N1 and the wiring resistance 20a due to, for example, damage of the wiring 20. In the present disclosure, such a short-circuit abnormality is referred to as a ground short-circuit A. In FIG. 33, FIG. 34 and the like, the vehicle ground is represented as a symbol of the ground. When the ground short-circuit A occurs, each unit operates as follows.

As shown in FIG. 33, in the energized state when the ground short-circuit A occurs, a current flows through the power supply line L1, the resistance R31, the switching element 16 that is turned on, and the node N1 to the vehicle ground in a stated order. As shown in FIG. 34, in the regenerative state when the ground short-circuit A occurs, a current flows through the ground line L2, the switching element 18 that is turned on, and the node N1 to the vehicle ground in a stated order and also flows through the wiring resistance 20a, the wiring inductance 20c, the load 4, the wiring inductance 20d, the wiring resistance 20b, the node N2, the switching element 19 that is turned on, and the ground line L2 in a stated order.

Figure 35:
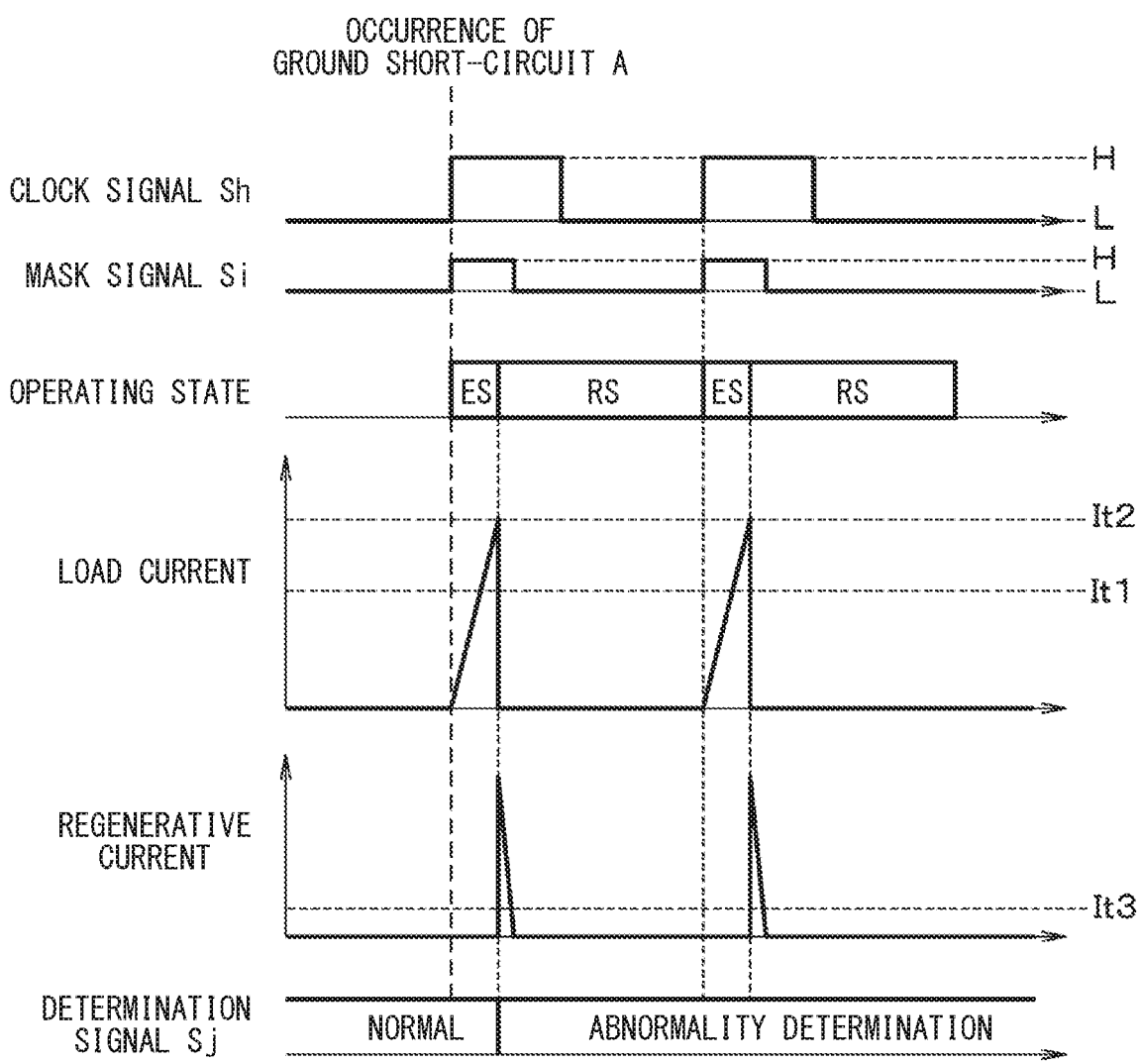
FIG. 35 is a timing chart for explaining an operation timing of each unit when the ground short-circuit A occurs in the third embodiment.

As shown in FIG. 35, when the ground short-circuit A occurs, the operation timing of each unit, the mode of the load current, the mode of the regenerative current, and the like are similar to those when the power supply short-circuit D occurs. Therefore, when the ground short-circuit A occurs, the load current value reaches the second threshold value It2 within the mask time, and it is determined that a short-circuit abnormality has occurred by each of the above-described determination methods.

Operation when Ground Short-Circuit B Occurs

Figure 36:
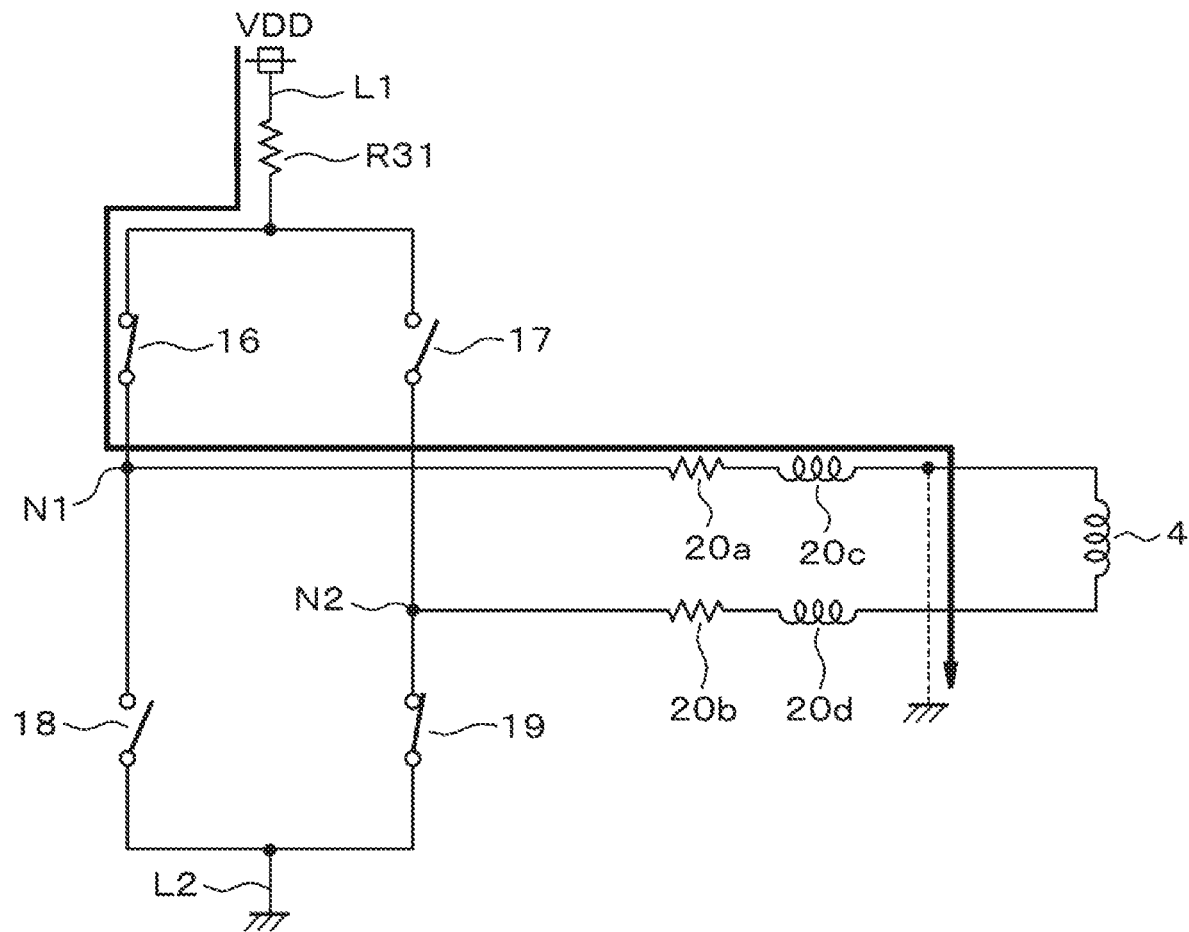
FIG. 36 is a diagram for explaining a path of a current flowing in the energized state when a ground short-circuit B occurs in the third embodiment.

There may be a case in which a short circuit with the vehicle ground occurs at a portion between the load 4 and the wiring inductance 20c due to, for example, damage of the wiring 20. In the present disclosure, such a short-circuit abnormality is referred to as a ground short-circuit B. When the ground short-circuit B occurs, each unit operates as follows. As shown in FIG. 36, in the energized state when the ground short-circuit B occurs, a current flows through the power supply line L1, the resistance R31, the switching element 16 that is turned on, the node N1, the wiring resistance 20a, and the wiring inductance 20c to the vehicle ground in a stated order.

Figure 37:
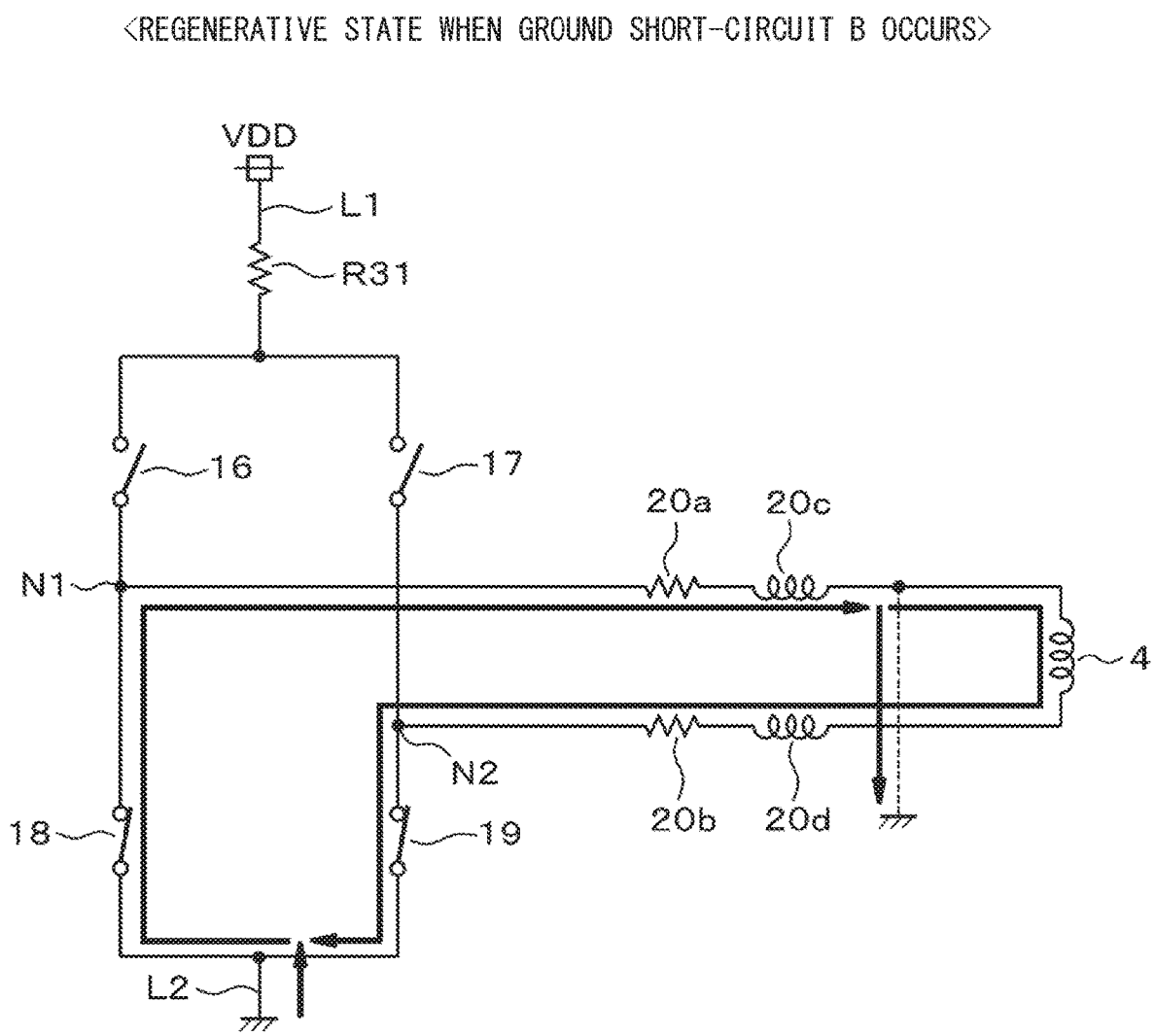
FIG. 37 is a diagram for explaining a path of a current flowing in the regenerative state when the ground short-circuit B occurs in the third embodiment.

As shown in FIG. 37, in the regenerative state when the ground short-circuit B occurs, a current flows through the ground line L2, the switching element 18 that is turned on, the node N1, the wiring resistance 20a, and the wiring inductance 20c to the vehicle ground in a stated order, and also flows through the wiring inductance 20c, the load 4, the wiring inductance 20d, the wiring resistance 20b, the node N2, the switching element 19 that is turned on, and the ground line L2 in a stated order.

Figure 38:
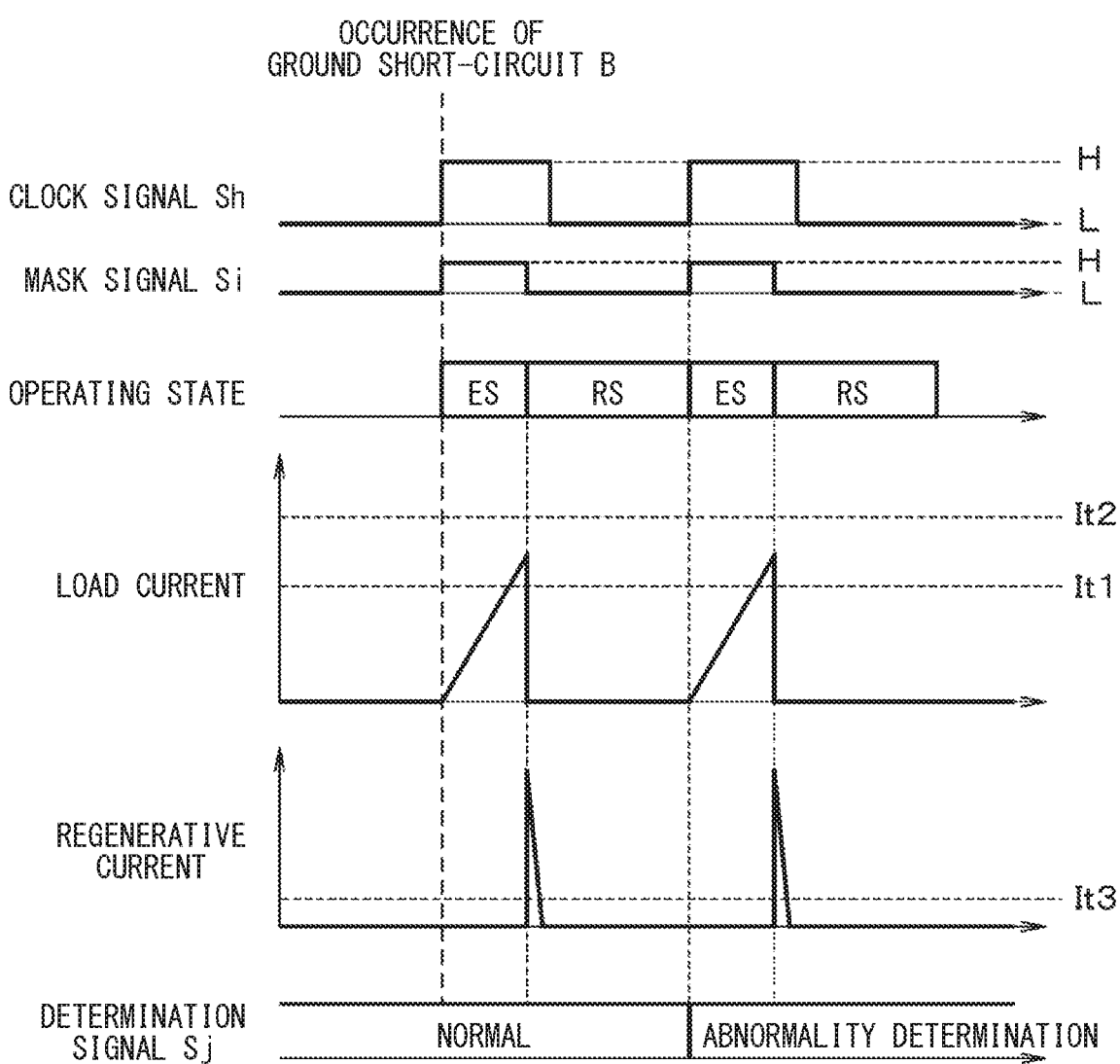
FIG. 38 is a timing chart for explaining an operation timing of each when the ground short-circuit B occurs in the third embodiment.

As shown in FIG. 38, when the ground short-circuit B occurs, the operation timing of each unit, the mode of the load current, the mode of the regenerative current, and the like are similar to those when the power supply short-circuit C occurs. Therefore, in the regenerative state when the ground short-circuit B occurs, the regenerative current value is zero and is less than the third threshold value It3 in most of the period. Therefore, when the ground short-circuit B occurs, it is determined that a short circuit abnormality has occurred by any of the first to third determination methods described above.

Operation when Ground Short-Circuit C Occurs

There may be a case in which a short circuit with the vehicle ground occurs at a portion between the wiring inductance 40d and the load 4 due to, for example, damage of the wiring 20. In the present disclosure, such a short-circuit abnormality is referred to as a ground short-circuit C. When the ground short-circuit C occurs, each unit operates as follows.

Figure 39:
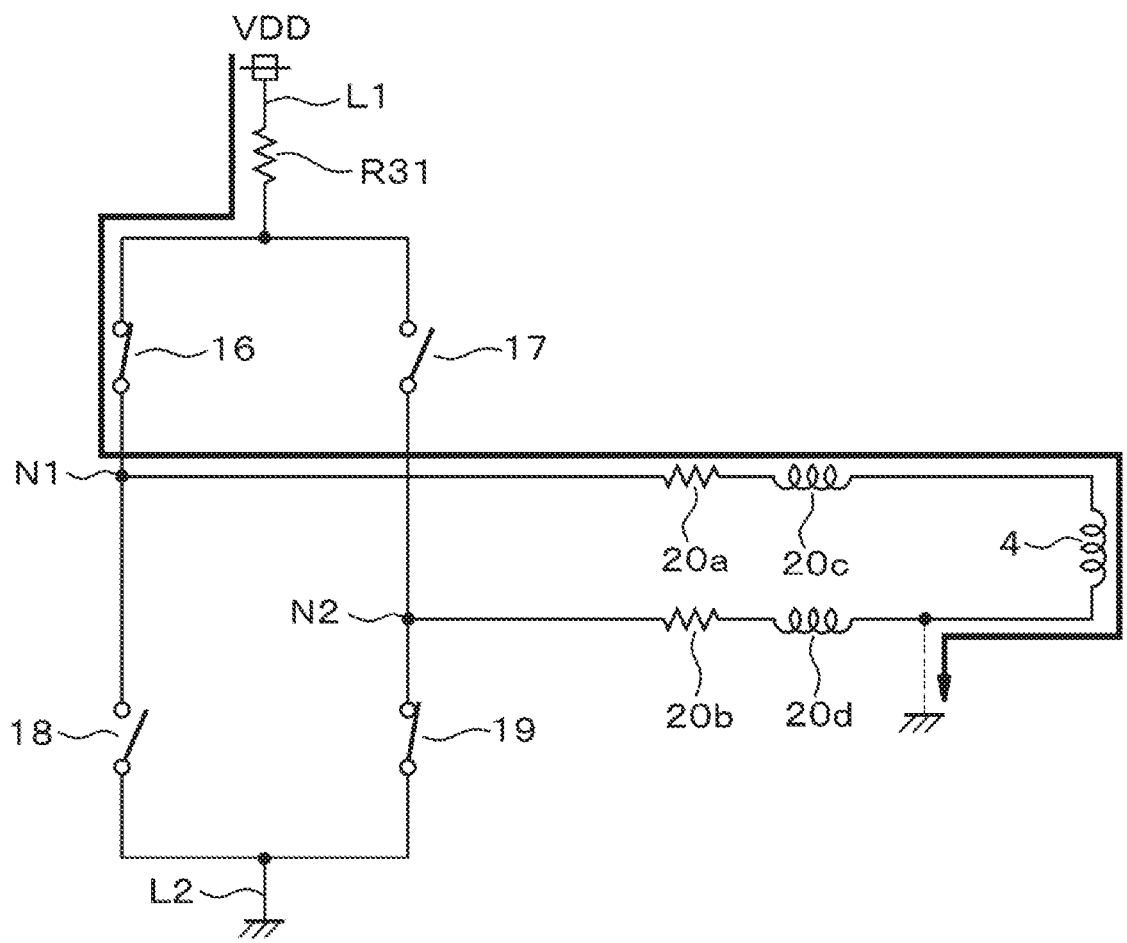
FIG. 39 is a diagram for explaining a path of a current flowing in the energized state when a ground short-circuit C occurs in the third embodiment.
Figure 40:
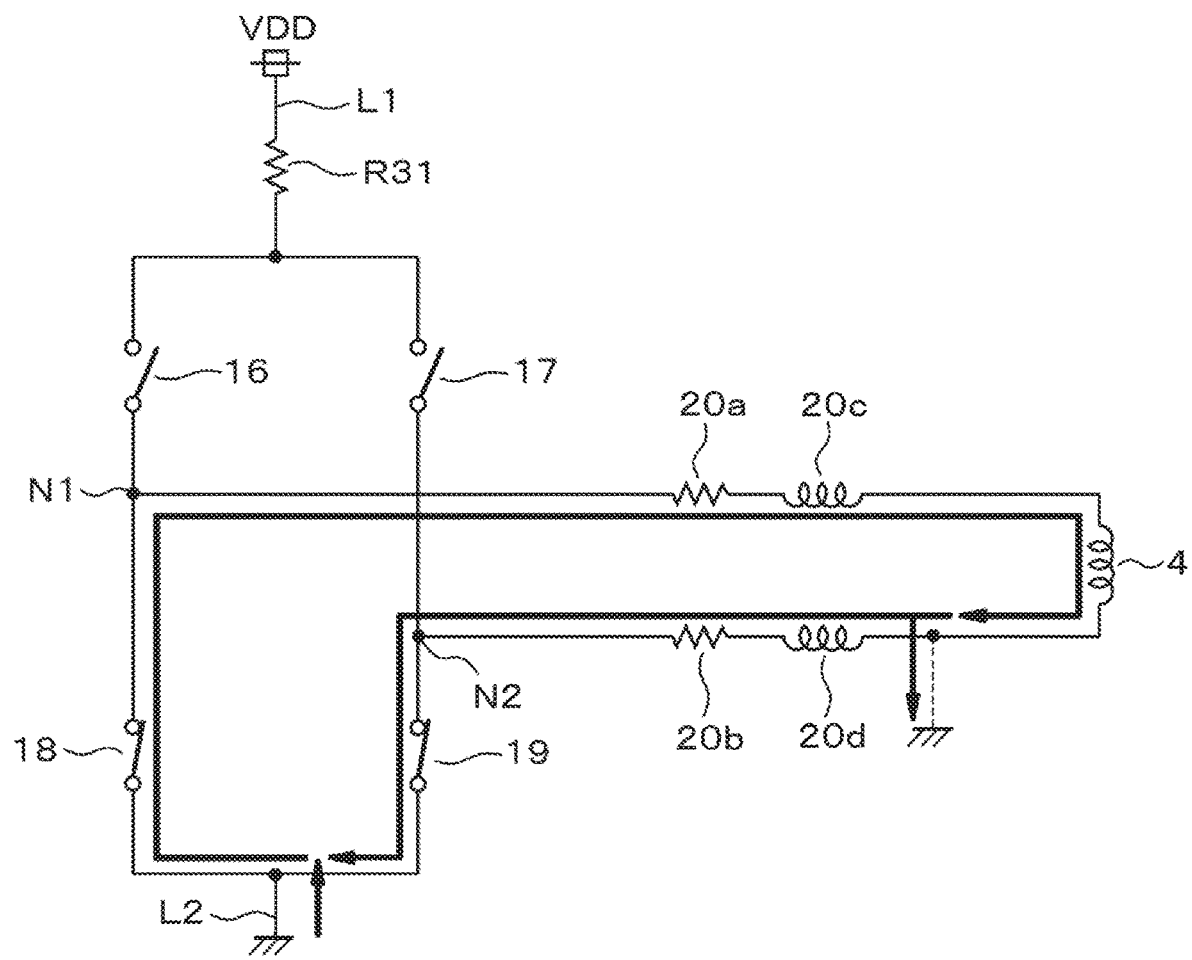
FIG. 40 is a diagram for explaining a path of a current flowing in the regenerative state when the ground short-circuit C occurs in the third embodiment.

As shown in FIG. 39, in the energized state when the ground short-circuit C occurs, a current flows through the power supply line L1, the resistor R31, the switching element 16 that is turned on, the node N1, the wiring resistance 20a, the wiring inductance 20c, and the load 4 to the vehicle ground in a stated order. As shown in FIG. 40, in the regenerative state when the ground short-circuit C occurs, a current flows through the load 4, the wiring inductance 20d, the wiring resistance 20b, the node N2, the switching element 19 that is turned on, the ground line L2, the switching element 18 that is turned on, the node N1, the wiring resistance 20a, the wiring inductance 20c, and the load 4 to the vehicle ground in a stated order.

Figure 41:
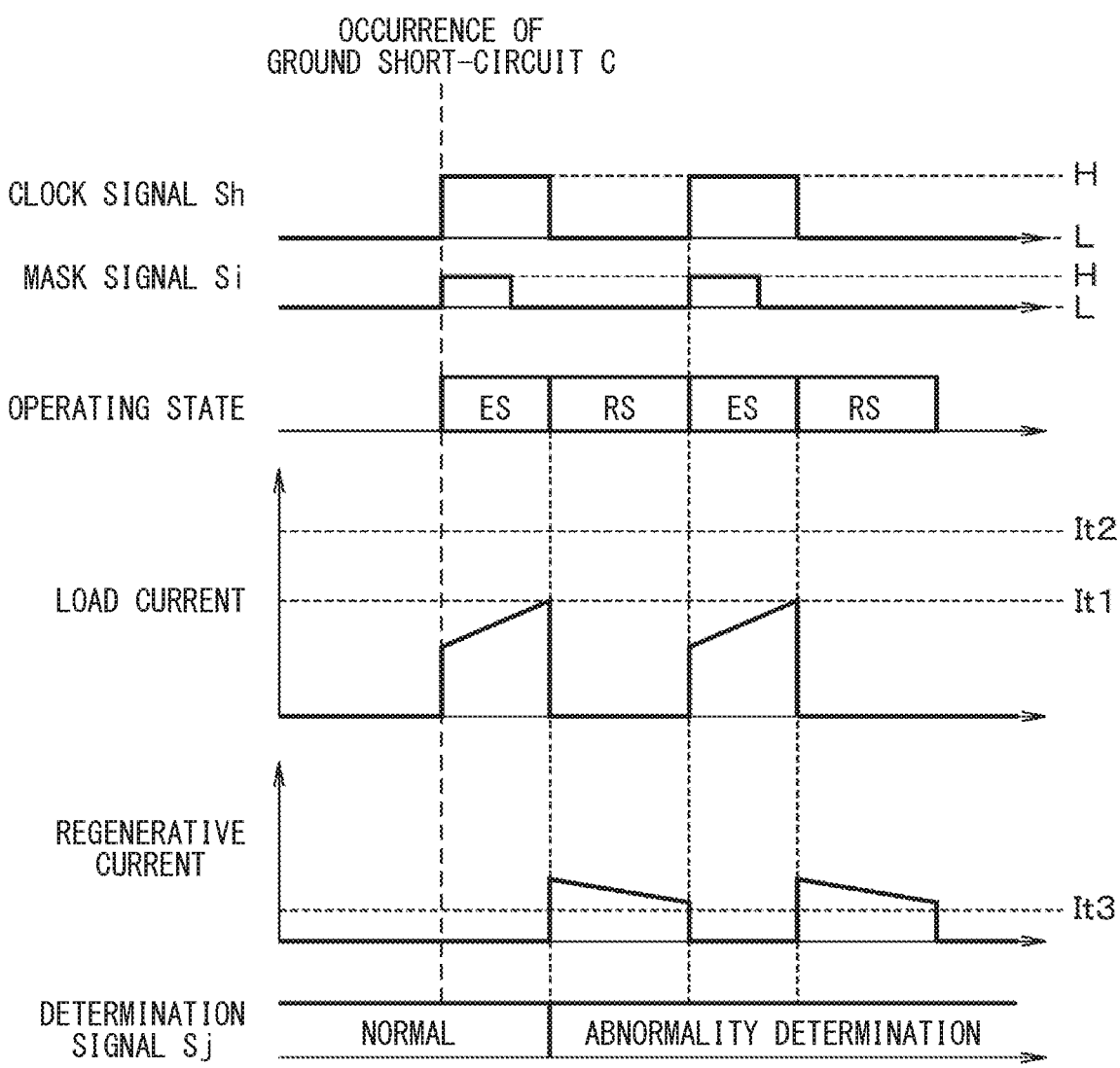
FIG. 41 is a timing chart for explaining an operation timing of each unit when the ground short-circuit C occurs in the third embodiment.

As shown in FIG. 41, when the ground short-circuit C occurs, the operation timing of each unit, the mode of the load current, the mode of the regenerative current, and the like are similar to those when the power supply short-circuit B occurs. Therefore, when the ground short-circuit C occurs, the difference between the load current value and the regenerative current value at the switching from the energized state to the regenerative state becomes equal to or greater than the determination value, and it is determined that a short-circuit abnormality has occurred by the above-described fourth determination method.

Operation when Ground Short-Circuit D Occurs

There may be a case in which a short circuit with the vehicle ground occurs at a portion between the node N2 and the wiring resistance 20b due to, for example, damage of the wiring 20. In the present disclosure, such a short-circuit abnormality is referred to as a ground short-circuit D. When the ground short-circuit D occurs, each unit operates as follows.

Figure 42:
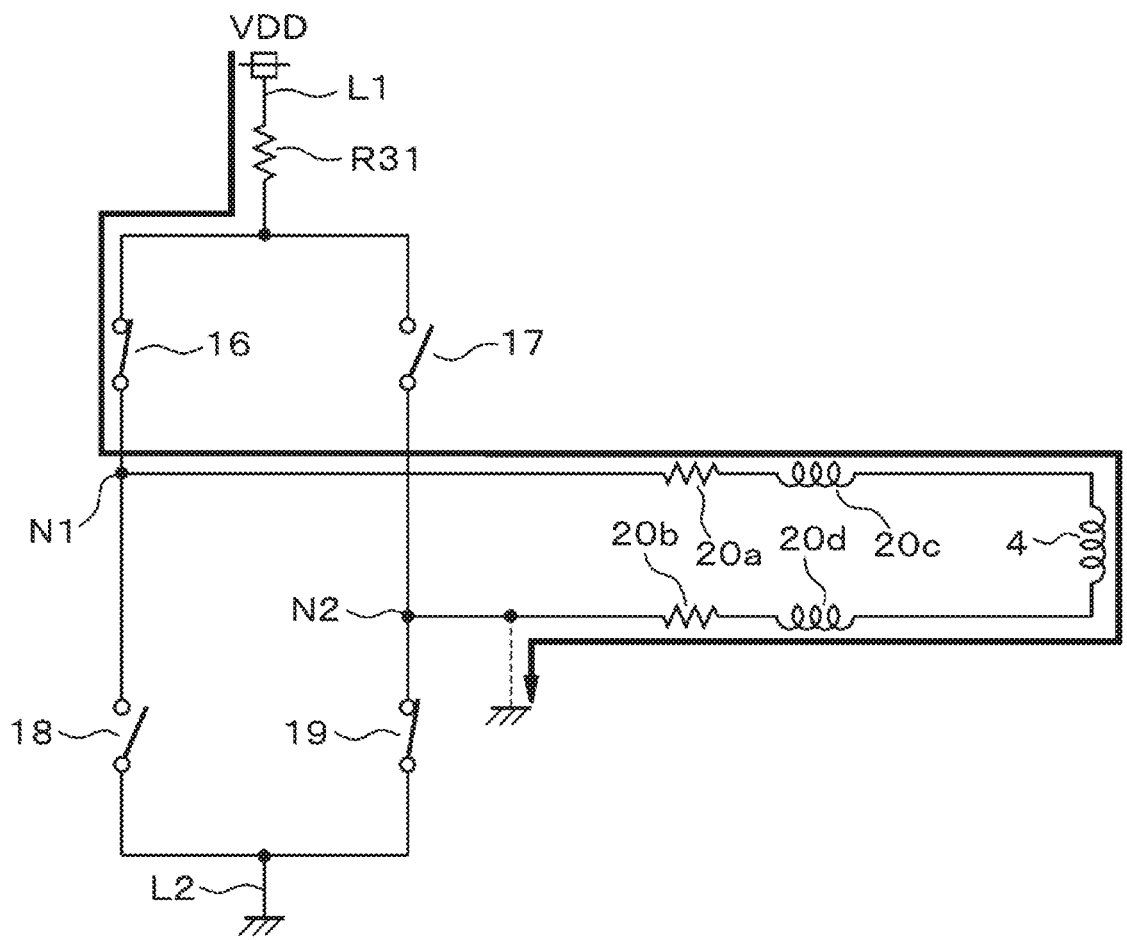
FIG. 42 is a diagram for explaining a path of a current flowing in the energized state when a ground short-circuit D occurs in the third embodiment.
Figure 43:
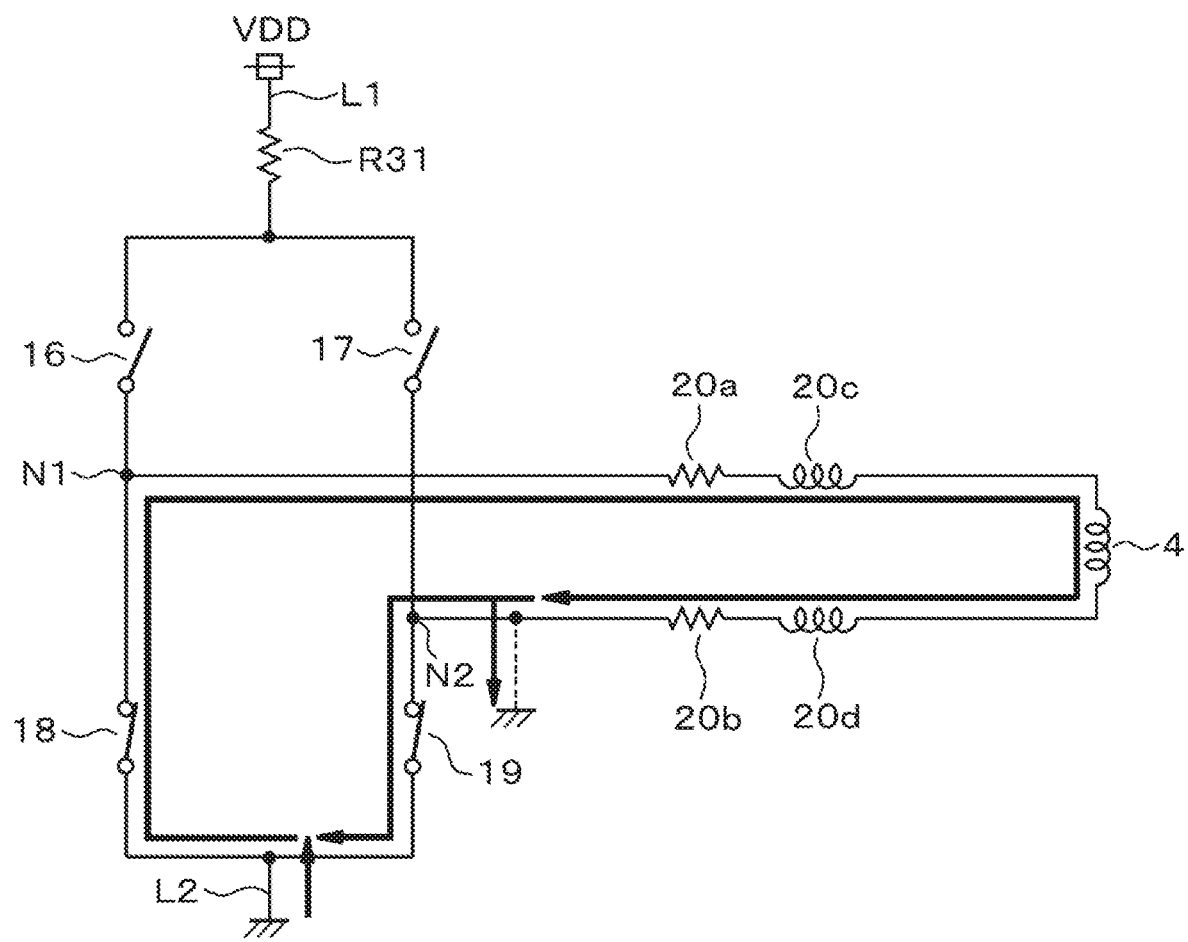
FIG. 43 is a diagram for explaining a path of a current flowing in the regenerative state when the ground short-circuit D occurs in the third embodiment.

As shown in FIG. 42, in the energized state when the ground short-circuit D occurs, a current flows through the power supply line L1, the resistance R31, the switching element 16 that is turned on, the node N1, the wiring resistance 20a, the wiring inductance 20c, the load 4, the wiring inductance 20d, and the wiring resistance 20b to the vehicle ground in a stated order. As shown in FIG. 43, in the regenerative state when the ground short-circuit D occurs, a current flows through the wiring resistance 20b, the node N2, the switching element 19 that is turned on, the ground line L2, the switching element 18 that is turned on, the node N1, the wiring resistance 20a, the wiring inductance 20c, the load 4, the wiring inductance 20d, and the wiring resistance 20b to the vehicle ground.

Figure 44:
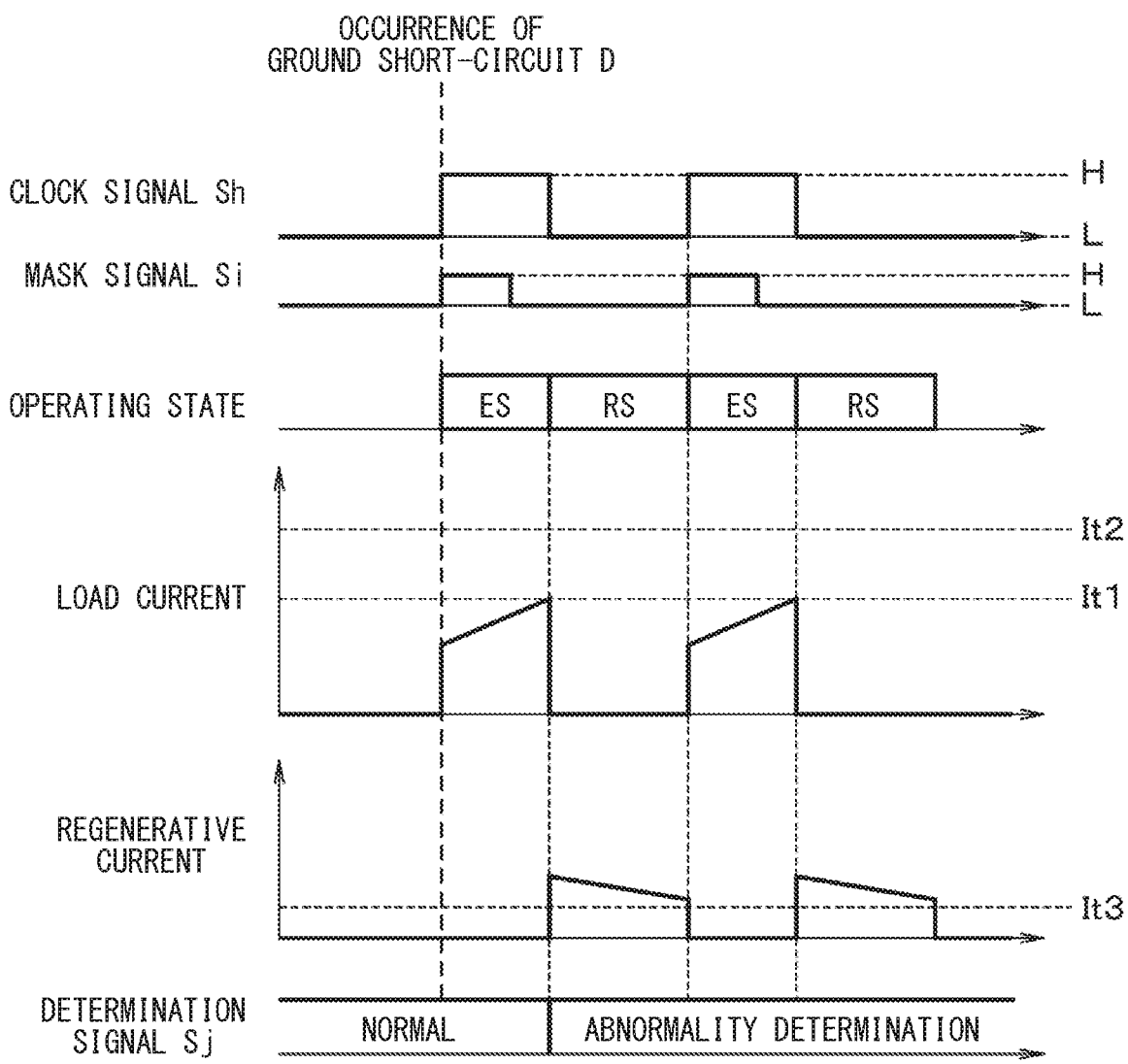
FIG. 44 is a timing chart for explaining an operation timing of each unit when the ground short-circuit D occurs in the third embodiment.

As shown in FIG. 44, when the ground short-circuit D occurs, the operation timing of each unit, the mode of the load current, the mode of the regenerative current, and the like are similar to those when the power supply short-circuit A occurs. Therefore, when the ground short-circuit D occurs, the difference between the load current value and the regenerative current value at the switching from the energized state to the regenerative state becomes equal to or greater than the determination value, and it is determined that a short-circuit abnormality has occurred by the above-described fourth determination method.

In each of the above embodiments, the occurrence of power supply short-circuits which are short-circuit abnormalities caused by short-circuiting to the vehicle power supply system due to damage to the wiring 20 or the like, specifically, the power supply short-circuits A to D, can be detected with high accuracy. On the other hand, according to the present embodiment, based on the same concept as the above embodiments, the ground short-circuits which are short-circuit abnormalities caused by short-circuiting to the vehicle ground due to damage of the wiring 20 or the like, specifically, the ground short-circuits A to D, can be detected with high accuracy.

Other Embodiments

The present disclosure is not limited to the embodiments that have been described above and illustrated in the drawings, but can arbitrarily be modified, combined, or expanded without departing from the gist of the present disclosure. The numerical values and the like shown in each of the above embodiments are merely examples, and the present disclosure is not limited thereto.

The switching elements constituting the H-bridge circuits 5 and 32 are not limited to MOSFETs, and can be employed in combination with various types of semiconductor switching elements such as bipolar transistors and IGBTs, and freewheeling diodes. The specific configuration of the load current detector that detects the load current is not limited to the configuration described in each of the above embodiments, and the specific configuration can be appropriately changed as long as the configuration has a similar function. The specific configuration of the regenerative current detector that detects the regenerative current is not limited to the configuration described in each of the above-described embodiments, and a specific configuration may be appropriately changed as long as the configuration has a similar function.

Although the present disclosure has been made in accordance with the embodiments, it is understood that the present disclosure is not limited to such embodiments and structures. The present disclosure encompasses various modifications and variations within the scope of equivalents. Furthermore, various combination and formation, and other combination and formation including one, more than one or less than one element may be made in the present disclosure.

What is claimed is:

1. An inductive load control device comprising:
an H-bridge circuit including a plurality of switching elements and configured to drive a load that is an inductive load;
an energization controller configured to control an operation of the H-bridge circuit to switch from a regenerative state to an energized state at every predetermined reference cycle, the regenerative state being a state during which energization from a direct-current (DC) power supply to the load is stopped, and the energized state being a state during which energization from the DC power supply to the load is performed;
a load current detector configured to detect a load current flowing through a switching element that is turned on in the energized state among the plurality of switching elements included in the H-bridge circuit;
a regenerative current detector configured to detect a regenerative current flowing through a switching element that is turned on in the regenerative state among the plurality of switching elements included in the H-bridge circuit; and
a short-circuit determination processor configured to detect whether a short-circuit abnormality has occurred in a wiring from the H-bridge circuit to the load based on a load current value that is a detection value by the load current detector and a regenerative current value that is a detection value by the regenerative current detector, wherein
the energization controller controls the operation of the H-bridge circuit from the energized state to the regenerative state when the load current value is equal to or greater than a predetermined first threshold value at a time point after a predetermined mask time has elapsed from a start time of the reference cycle, the short-circuit determination processor determines whether the short-circuit abnormality has occurred based on whether the load current value is equal to or greater than a second threshold value that is set to be greater than the first threshold value, and the short-circuit determination processor determines whether the short-circuit abnormality has occurred based on the regenerative current value in the regenerative state when the load current value does not reach the second threshold value within the mask time.

2. The inductive load control device according to claim 1, wherein the short-circuit determination processor determines that the short-circuit abnormality has occurred in a case where the regenerative current value in the regenerative state is less than a predetermined third threshold value when the load current value does not reach the second threshold value within the mask time.

3. The inductive load control device according to claim 2, wherein the short-circuit determination processor determines that the short-circuit abnormality has occurred in a case where the regenerative current value at a time of switching from the regenerative state to the energized state is less than the third threshold value when the load current value does not reach the second threshold value within the mask time.

4. The inductive load control device according to claim 1, wherein the short-circuit determination processor extends the mask time by a predetermined time based on the regenerative current value in the regenerative state when the load current value does not reach the second threshold value within the mask time.

5. The inductive load control device according to claim 1, wherein the short-circuit determination processor reduces the threshold value by a predetermined value based on the regenerative current value in the regenerative state when the load current value does not reach the second threshold value within the mask time.

6. The inductive load control device according to claim 1, wherein the short-circuit determination processor determines whether the short-circuit abnormality has occurred based on a difference between the load current value and the regenerative current value at a time of switching from the energized state to the regenerative state when the load current value does not reach the second threshold value within the mask time.

7. The inductive load control device according to claim 1, wherein the mask time is set to be shorter than a time required for the load current value to reach the first threshold value at a normal time when the short-circuit abnormality does not occur.

8. The inductive load control device according to claim 1, wherein the short-circuit determination processor shortens the mask time by a predetermined time when determining that the short-circuit abnormality has occurred.

9. The inductive load control device according to claim 1, wherein the energization controller interrupts energization to the load when the short-circuit determination processor determines that the short-circuit abnormality occurs, and restarts energization to the load after a predetermined time has elapsed.

* * * * *